(12) United States Patent
Hadani

(10) Patent No.: US 11,190,379 B2
(45) Date of Patent: Nov. 30, 2021

(54) DATA MODULATION SCHEMES BASED ON THE ZAK TRANSFORM

(71) Applicant: Cohere Technologies, Inc., Santa Clara, CA (US)

(72) Inventor: Ronny Hadani, Santa Clara, CA (US)

(73) Assignee: Cohere Technologies, Inc., Santa Clara, CA (US)

(*) Notice: Subject to any disclaimer, the term of this patent is extended or adjusted under 35 U.S.C. 154(b) by 31 days.

(21) Appl. No.: 16/726,639

(22) Filed: Dec. 24, 2019

(65) Prior Publication Data

US 2020/0204410 A1 Jun. 25, 2020

Related U.S. Application Data

(63) Continuation of application No. PCT/US2018/041616, filed on Jul. 11, 2018.
(Continued)

(51) Int. Cl.
*H04L 25/03* (2006.01)
*H04L 5/00* (2006.01)
(Continued)

(52) U.S. Cl.
CPC ...... *H04L 25/03834* (2013.01); *H04L 5/0007* (2013.01); *H04L 27/148* (2013.01);
(Continued)

(58) Field of Classification Search
CPC ............. H04L 25/03834; H04L 5/0007; H04L 27/148; H04L 27/2602; H04L 27/2639; H04L 27/2647
See application file for complete search history.

(56) References Cited

U.S. PATENT DOCUMENTS

| | | | |
|---|---|---|---|
| 4,754,493 | A | 6/1988 | Coates |
| 5,083,135 | A | 1/1992 | Nagy et al. |

(Continued)

FOREIGN PATENT DOCUMENTS

| | | |
|---|---|---|
| CN | 1235720 A | 11/1999 |
| CN | 101682316 A | 3/2010 |

(Continued)

OTHER PUBLICATIONS

Office Action for U.S. Appl. No. 13/117,119, dated Aug. 5, 2013, 5 pages.

(Continued)

*Primary Examiner* — Janice N Tieu
(74) *Attorney, Agent, or Firm* — Perkins Coie LLP

(57) ABSTRACT

One example wireless communication method includes transforming an information signal to a discrete sequence, where the discrete sequence is a Zak transformed version of the information signal, generating a first ambiguity function corresponding to the discrete sequence, generating a second ambiguity function by pulse shaping the first ambiguity function, generating a waveform corresponding to the second ambiguity function, and transmitting the waveform over a wireless communication channel. Another communication method includes transforming an information signal to a discrete lattice domain signal, shaping bandwidth and duration of the discrete lattice domain signal by a two-dimensional filtering procedure to generate a filtered information signal, generating, using a Zak transform, a time domain signal from the filtered information signal, and transmitting the time domain signal over a wireless communication channel.

13 Claims, 15 Drawing Sheets

Related U.S. Application Data

(60) Provisional application No. 62/531,808, filed on Jul. 12, 2017.

(51) Int. Cl.
  *H04L 27/148* (2006.01)
  *H04L 27/26* (2006.01)

(52) U.S. Cl.
  CPC ...... *H04L 27/2602* (2013.01); *H04L 27/2639* (2013.01); *H04L 27/2647* (2013.01)

(56) References Cited

U.S. PATENT DOCUMENTS

| | | | |
|---|---|---|---|
| 5,182,642 | A | 1/1993 | Gersdorff et al. |
| 5,623,511 | A | 4/1997 | Bar-David et al. |
| 5,831,977 | A | 11/1998 | Dent |
| 5,872,542 | A | 2/1999 | Simons et al. |
| 5,956,624 | A | 9/1999 | Hunsinger et al. |
| 6,212,246 | B1 | 4/2001 | Hendrickson |
| 6,289,063 | B1 | 9/2001 | Duxbury |
| 6,356,555 | B1 | 3/2002 | Rakib et al. |
| 6,388,621 | B1 | 5/2002 | Lynch |
| 6,426,983 | B1 | 7/2002 | Rakib et al. |
| 6,608,864 | B1 | 8/2003 | Strait |
| 6,631,168 | B2 | 10/2003 | Izumi |
| 6,704,366 | B1 | 3/2004 | Combes et al. |
| 6,956,814 | B1 | 10/2005 | Campanella |
| 7,010,048 | B1 | 3/2006 | Shattil |
| 7,327,812 | B2 | 2/2008 | Auer |
| 7,392,018 | B1 | 6/2008 | Ebert et al. |
| 7,394,876 | B2 * | 7/2008 | Sestok, IV .......... H04L 25/0232 370/203 |
| 7,689,049 | B2 | 3/2010 | Monro |
| 7,773,685 | B2 | 8/2010 | Tirkkonen et al. |
| 7,864,877 | B2 | 1/2011 | Hottinen |
| 8,229,017 | B1 | 7/2012 | Lee et al. |
| 8,259,845 | B2 | 9/2012 | Dent |
| 8,265,203 | B2 * | 9/2012 | Xu ...................... H04L 27/2653 375/340 |
| 8,401,131 | B2 | 3/2013 | Fety et al. |
| 8,547,988 | B2 | 10/2013 | Hadani et al. |
| 8,619,892 | B2 | 12/2013 | Vetter et al. |
| 8,717,210 | B2 | 5/2014 | Eldar et al. |
| 8,879,378 | B2 | 11/2014 | Rakib et al. |
| 8,892,048 | B1 | 11/2014 | Turner |
| 8,976,851 | B2 | 3/2015 | Hadani et al. |
| 9,031,141 | B2 | 5/2015 | Hadani et al. |
| 9,071,285 | B2 | 6/2015 | Hadani et al. |
| 9,071,286 | B2 | 6/2015 | Hadani et al. |
| 9,083,483 | B1 | 7/2015 | Rakib et al. |
| 9,083,595 | B2 | 7/2015 | Rakib et al. |
| 9,130,638 | B2 | 9/2015 | Hadani et al. |
| 9,282,528 | B2 | 3/2016 | Hashimoto |
| 9,294,315 | B2 | 3/2016 | Hadani et al. |
| 9,444,514 | B2 | 9/2016 | Hadani et al. |
| 9,548,840 | B2 | 1/2017 | Hadani et al. |
| 9,553,984 | B2 | 1/2017 | Krause et al. |
| 9,590,779 | B2 | 3/2017 | Hadani et al. |
| 9,634,719 | B2 | 4/2017 | Rakib et al. |
| 9,660,851 | B2 | 5/2017 | Hadani et al. |
| 9,668,148 | B2 | 5/2017 | Hadani et al. |
| 9,712,354 | B2 | 7/2017 | Hadani et al. |
| 9,729,281 | B2 | 8/2017 | Hadani et al. |
| 2001/0031022 | A1 | 10/2001 | Petrus et al. |
| 2001/0033614 | A1 | 10/2001 | Hudson |
| 2001/0046205 | A1 | 11/2001 | Easton et al. |
| 2002/0001308 | A1 | 1/2002 | Heuer |
| 2002/0034191 | A1 | 3/2002 | Shattil |
| 2002/0181388 | A1 | 12/2002 | Jain et al. |
| 2002/0181390 | A1 | 12/2002 | Mody et al. |
| 2002/0181607 | A1 | 12/2002 | Izumi |
| 2003/0073464 | A1 | 4/2003 | Giannakis et al. |
| 2003/0185295 | A1 | 10/2003 | Yousef |
| 2003/0235147 | A1 | 12/2003 | Walton et al. |
| 2004/0044715 | A1 | 3/2004 | Aldroubi et al. |
| 2004/0174812 | A1 | 9/2004 | Murakami et al. |
| 2004/0189581 | A1 | 9/2004 | Sako et al. |
| 2004/0218523 | A1 | 11/2004 | Varshney et al. |
| 2005/0157778 | A1 | 7/2005 | Trachewsky et al. |
| 2005/0157820 | A1 | 7/2005 | Wongwirawat et al. |
| 2005/0180517 | A1 | 8/2005 | Abe |
| 2005/0207334 | A1 | 9/2005 | Hadad |
| 2005/0251844 | A1 | 11/2005 | Martone et al. |
| 2006/0008021 | A1 | 1/2006 | Bonnet |
| 2006/0039270 | A1 | 2/2006 | Strohmer et al. |
| 2007/0014272 | A1 | 1/2007 | Palanki et al. |
| 2007/0038691 | A1 | 2/2007 | Candes et al. |
| 2007/0078661 | A1 | 4/2007 | Sriram et al. |
| 2007/0104283 | A1 | 5/2007 | Han et al. |
| 2007/0110131 | A1 | 5/2007 | Guess et al. |
| 2007/0211952 | A1 | 9/2007 | Faber et al. |
| 2007/0237181 | A1 | 10/2007 | Cho et al. |
| 2007/0253465 | A1 | 11/2007 | Muharemovic et al. |
| 2007/0253504 | A1 | 11/2007 | Hasegawa |
| 2007/0263752 | A1 * | 11/2007 | Guey .................. H04L 25/0212 375/340 |
| 2008/0043857 | A1 | 2/2008 | Dias et al. |
| 2008/0117999 | A1 | 5/2008 | Kadous et al. |
| 2008/0186843 | A1 | 8/2008 | Ma et al. |
| 2008/0187062 | A1 | 8/2008 | Pan et al. |
| 2008/0232504 | A1 | 9/2008 | Ma et al. |
| 2008/0310383 | A1 | 12/2008 | Kowalski |
| 2009/0080403 | A1 | 3/2009 | Hamdi |
| 2009/0092259 | A1 | 4/2009 | Jot et al. |
| 2009/0103593 | A1 | 4/2009 | Bergamo |
| 2009/0122854 | A1 | 5/2009 | Zhu et al. |
| 2009/0161804 | A1 | 6/2009 | Chrabieh et al. |
| 2009/0204627 | A1 | 8/2009 | Hadani |
| 2009/0222226 | A1 | 9/2009 | Baraniuk et al. |
| 2009/0303961 | A1 | 12/2009 | Popovic et al. |
| 2010/0001901 | A1 | 1/2010 | Baraniuk et al. |
| 2010/0008432 | A1 | 1/2010 | Kim et al. |
| 2010/0027608 | A1 | 2/2010 | Priotti |
| 2010/0111138 | A1 | 5/2010 | Hosur et al. |
| 2010/0142476 | A1 | 6/2010 | Jiang et al. |
| 2010/0187914 | A1 | 7/2010 | Rada et al. |
| 2010/0238787 | A1 | 9/2010 | Guey |
| 2010/0277308 | A1 | 11/2010 | Potkonjak |
| 2010/0303136 | A1 | 12/2010 | Ashikhmin et al. |
| 2010/0322349 | A1 | 12/2010 | Lee et al. |
| 2011/0007789 | A1 | 1/2011 | Garmany |
| 2011/0013716 | A1 | 1/2011 | Brodzik et al. |
| 2011/0110532 | A1 | 5/2011 | Svendsen |
| 2011/0116489 | A1 | 5/2011 | Grandhi |
| 2011/0116516 | A1 | 5/2011 | Hwang et al. |
| 2011/0126071 | A1 | 5/2011 | Han et al. |
| 2011/0131463 | A1 | 6/2011 | Gunnam |
| 2011/0216808 | A1 | 9/2011 | Tong et al. |
| 2011/0286502 | A1 | 11/2011 | Adachi et al. |
| 2011/0287778 | A1 | 11/2011 | Levin et al. |
| 2011/0292971 | A1 | 12/2011 | Hadani et al. |
| 2011/0293030 | A1 | 12/2011 | Rakib et al. |
| 2011/0299379 | A1 | 12/2011 | Sesia et al. |
| 2011/0305267 | A1 | 12/2011 | Riu et al. |
| 2012/0021769 | A1 | 1/2012 | Lindoff et al. |
| 2012/0051457 | A1 | 3/2012 | Ma et al. |
| 2012/0140716 | A1 | 6/2012 | Baldemair et al. |
| 2012/0170684 | A1 | 7/2012 | Yim et al. |
| 2012/0201322 | A1 | 8/2012 | Rakib et al. |
| 2012/0213098 | A1 | 8/2012 | Sun |
| 2012/0235795 | A1 | 9/2012 | Liao et al. |
| 2012/0269201 | A1 | 10/2012 | Atungsiri et al. |
| 2012/0272117 | A1 | 10/2012 | Stadelmeier et al. |
| 2012/0320994 | A1 | 12/2012 | Loghin et al. |
| 2013/0021977 | A1 | 1/2013 | Yang et al. |
| 2013/0058390 | A1 | 3/2013 | Haas et al. |
| 2013/0077579 | A1 | 3/2013 | Cho et al. |
| 2013/0083661 | A1 | 4/2013 | Gupta et al. |
| 2013/0121497 | A1 | 5/2013 | Smaragdis et al. |
| 2013/0230010 | A1 | 9/2013 | Kim et al. |
| 2013/0260787 | A1 | 10/2013 | Hashimoto |
| 2013/0279627 | A1 | 10/2013 | Wu et al. |
| 2013/0315133 | A1 | 11/2013 | Wang et al. |

(56) References Cited

U.S. PATENT DOCUMENTS

| | | | |
|---|---|---|---|
| 2014/0143639 | A1 | 5/2014 | Loghin et al. |
| 2014/0161154 | A1 | 6/2014 | Hadani et al. |
| 2014/0169385 | A1 | 6/2014 | Hadani et al. |
| 2014/0169406 | A1 | 6/2014 | Hadani et al. |
| 2014/0169433 | A1 | 6/2014 | Hadani et al. |
| 2014/0169436 | A1 | 6/2014 | Hadani et al. |
| 2014/0169437 | A1 | 6/2014 | Hadani et al. |
| 2014/0169441 | A1 | 6/2014 | Hadani et al. |
| 2014/0247803 | A1 | 9/2014 | Arambepola et al. |
| 2014/0348252 | A1 | 11/2014 | Siohan et al. |
| 2014/0364128 | A1 | 12/2014 | Lee et al. |
| 2015/0117395 | A1 | 4/2015 | Hadani et al. |
| 2015/0326273 | A1 | 11/2015 | Rakib et al. |
| 2015/0327085 | A1 | 11/2015 | Hadani et al. |
| 2015/0382231 | A1 | 12/2015 | Jabbar et al. |
| 2016/0043835 | A1 | 2/2016 | Hadani et al. |
| 2016/0135132 | A1 | 5/2016 | Donepudi et al. |
| 2016/0182269 | A1 | 6/2016 | Hadani et al. |
| 2016/0191217 | A1 | 6/2016 | Hadani et al. |
| 2016/0191280 | A1 | 6/2016 | Hadani et al. |
| 2016/0254889 | A1 | 9/2016 | Shattil |
| 2016/0277225 | A1 | 9/2016 | Frenne et al. |
| 2016/0309345 | A1 | 10/2016 | Tehrani et al. |
| 2016/0380743 | A1 | 12/2016 | Rakib |
| 2016/0381576 | A1 | 12/2016 | Hadani et al. |
| 2017/0012749 | A1 | 1/2017 | Rakib et al. |
| 2017/0012810 | A1 | 1/2017 | Rakib et al. |
| 2017/0019297 | A1 | 1/2017 | Rakib |
| 2017/0033899 | A1 | 2/2017 | Rakib et al. |
| 2017/0040711 | A1 | 2/2017 | Rakib et al. |
| 2017/0078054 | A1 | 3/2017 | Hadani et al. |
| 2017/0099122 | A1 | 4/2017 | Hadani et al. |
| 2017/0099607 | A1 | 4/2017 | Hadani et al. |
| 2017/0149594 | A1 | 5/2017 | Rakib et al. |
| 2017/0149595 | A1 | 5/2017 | Rakib et al. |
| 2017/0201354 | A1 | 7/2017 | Hadani et al. |
| 2017/0207817 | A1 | 7/2017 | Hadani et al. |
| 2017/0222700 | A1 | 8/2017 | Hadani et al. |
| 2017/0230215 | A1 | 8/2017 | Rakib et al. |
| 2017/0244524 | A1 | 8/2017 | Hadani et al. |
| 2020/0081111 | A1* | 3/2020 | Hoshuyama .......... G01S 13/584 |

FOREIGN PATENT DOCUMENTS

| | | |
|---|---|---|
| CN | 101939935 A | 1/2011 |
| EP | 1432168 A1 | 6/2004 |
| JP | 2011127910 A | 6/2011 |
| WO | 2007004297 | 1/2007 |
| WO | 2011137699 A1 | 11/2011 |
| WO | 2011150315 | 12/2011 |
| WO | 2013148546 | 10/2013 |
| WO | 2014004585 | 1/2014 |
| WO | 2016014596 | 1/2016 |
| WO | 2016014598 | 1/2016 |
| WO | 2016176642 | 11/2016 |
| WO | 2016183230 | 11/2016 |
| WO | 2016183240 | 11/2016 |
| WO | 2016209848 | 12/2016 |
| WO | 2017003952 | 1/2017 |
| WO | 2017011478 | 1/2017 |
| WO | 2018/200577 A1 | 11/2018 |

OTHER PUBLICATIONS

Notice of Allowance for U.S. Appl. No. 13/117,119, dated Feb. 28, 2014, 13 pages.

Banelli, P. et al., "Modulation Formats and Waveforms for 5G Networks: Who Will Be the Heir of OFDM?," IEEE Signal Processing Magazine, vol. 81, pp. 80-93, Nov. 2014.

El Hattachi, R. et al., "NGMN 5G Initiative White Paper," NGMN Alliance, Feb. 17, 2015. [Online]. Available: https://www.ngmn.org/uploads/media/NGMN_5G_White_Paper_V1_0.pdf, 125 pages.

Rusek, F. et al., "Scaling Up MIMO, Opportunities and Challenges with Very Large Arrays," IEEE Signal Processing Magazine, pp. 40-60 (2013).

Vodafone, "Cellular Internet of Things: Architectural Aspects," RP-150869, 3GPP RAN#68, Malmo, Sweden (Jun. 9, 2015), 19 pages.

Supplementary European Search Report for European Application No. 11787483.4, dated Sep. 9, 2014, 6 pages.

International Search Report and Written Opinion for International Application No. PCT/US2011/038302, dated Nov. 15, 2011, 8 pages.

International Preliminary Report on Patentability for International Application No. PCT/US2011/038302, dated Dec. 4, 2012, 7 pages.

Office Action for U.S. Appl. No. 13/117,124, dated Feb. 22, 2013, 7 pages.

Notice of Allowance for U.S. Appl. No. 13/117,124, dated Aug. 8, 2013, 10 pages.

Office Action for U.S. Appl. No. 14/605,957, dated Jun. 22, 2017, 6 pages.

Supplementary European Search Report for European Application No. 13809004.8, dated Apr. 14, 2016, 8 pages.

Communication Pursuant to Article 94(3) EPC for European Application No. 13809004.8, mailed Feb. 17, 2017, 5 pages.

Notice of Allowance for U.S. Appl. No. 13/927,087, dated Feb. 25, 2015, 9 pages.

Office Action for U.S. Appl. No. 13/927,087, dated Nov. 12, 2014, 14 pages.

Gurevich, S. et al. "Group Representation Design of Digital Signals and Sequences," S.W. Golomb et al. (eds.), SETA 2008, LNCS 5203, pp. 153-166, Springer-Verlag Berlin Heidelberg (2008).

International Search Report and Written Opinion for International Application No. PCT/US2013/047723, dated Oct. 29, 2013, 17 pages.

International Preliminary Report on Patentability for International Application No. PCT/US2013/047723, dated Dec. 31, 2014, 15 pages.

Notice of Allowance for U.S. Appl. No. 13/927,088, dated Feb. 18, 2015, 7 pages.

Office Action for U.S. Appl. No. 13/927,088, dated Nov. 28, 2014, 13 pages.

Notice of Allowance for U.S. Appl. No. 13/927,086, dated Dec. 26, 2014, 8 pages.

Supplemental Notice of Allowability for U.S. Appl. No. 13/927,086, dated Mar. 19, 2015, 4 pages.

Office Action for U.S. Appl. No. 13/927,086, dated Oct. 14, 2014, 10 pages.

Office Action for U.S. Appl. No. 13/927,089, dated Dec. 24, 2014, 13 pages.

Office Action for U.S. Appl. No. 13/927,089, dated Aug. 14, 2015, 7 pages.

Supplemental Notice of Allowability for U.S. Appl. No. 13/927,091, dated Jun. 11, 2015, 4 pages.

Notice of Allowance for U.S. Appl. No. 13/927,091, dated Apr. 24, 2015, 8 pages.

Office Action for U.S. Appl. No. 13/927,091, dated Jan. 27, 2015, 15 pages.

Office Action for U.S. Appl. No. 13/927,092, dated Oct. 8, 2014, 5 pages.

Notice of Allowance for U.S. Appl. No. 13/927,092, dated Oct. 24, 2014, 7 pages.

Office Action for U.S. Appl. No. 13/927,095, dated Apr. 30, 2015, 11 pages.

Office Action for U.S. Appl. No. 13/927,095, dated Nov. 4, 2015, 9 pages.

Office Action for U.S. Appl. No. 13/927,095, dated Jun. 1, 2016, 10 pages.

Office Action for U.S. Appl. No. 14/717,886, dated Apr. 19, 2016, 10 pages.

Office Action for U.S. Appl. No. 14/709,377, dated Dec. 11, 2015, 12 pages.

Office Action for U.S. Appl. No. 14/709,377, dated Jul. 13, 2016, 17 pages.

(56) References Cited

OTHER PUBLICATIONS

Examination Report No. 1 for Australian Application No. 2013239970, dated Dec. 8, 2015, 3 pages.
"AT&T Annual Report 2014," Opening Our Network [Online]. Retrieved from the Internet: Sep. 22, 2016. <URL: http://www.att.com/Investor/ATT_Annual/2014/att_introduces_new_concepts_for_telecom_network.html>, 5 pages.
Catt, "UL ACK/NACK transmission methods for LTE-A," 3GPP TSG RAN WG1 Meeting #60bis, R1-102453, Beijing, China, Apr. 12-16, 2010, 8 pages.
Toskala, A. et al., "Physical Layer," Chapter 5 In: "LTE for UMTS: OFDMA and SC-FDMA Based Radio Access," Holma, H. et al. (eds.), John Wiley & Sons, Ltd., United Kingdom, 2009, pp. 83-135.
Mecklenbrauker, W., "A Tutorial on Non-Parametric Bilinear Time-Frequency Signal Representations," In: Time and Frequency Representation of Signals and Systems, Longo, G. et al. (eds.), Springer-Verlag Wien, vol. 309, pp. 11-68 (1989).
Nehorai, A. et al., "MURI: Adaptive waveform design for full spectral dominance (2005-2010)," AFOSR FA9550-05-1-0443, Final Report, [online], Mar. 11, 2011 Retrieved on May 11, 2013, Retrieved from the Internet <URL: http://oai.dtic.mil/oai/oai?verb=getRecord&metadataPrefix=html&identifier=ADA565420>, 103 pages.
Office Action for Japanese Application No. 2015-518647, dated Jul. 7, 2015, 10 pages.
Office Action for U.S. Appl. No. 14/754,596, dated Apr. 19, 2016, 18 pages.
Office Action for U.S. Appl. No. 14/809,129, dated Jul. 19, 2016, 5 pages.
Office Action for U.S. Appl. No. 15/617,962, dated Sep. 6, 2017, 10 pages.
International Search Report and Written Opinion for International Application No. PCT/US2016/050825, dated Feb. 8, 2017, 12 pages.
International Search Report and Written Opinion for International Application No. PCT/US2016/052524, dated Dec. 20, 2016, 8 pages.
Office Action for U.S. Appl. No. 15/374,995, dated Aug. 7, 2017, 6 pages.
International Search Report and Written Opinion for International Application No. PCT/US2017/025797, dated Jun. 21, 2017, 6 pages.
International Search Report and Written Opinion for International Application No. PCT/US2016/030259, dated Aug. 4, 2016, 13 pages.
Office Action for U.S. Appl. No. 15/152,464, dated Apr. 6, 2017, 10 pages.
Examination Report No. 1 for Australian Application No. 2013280487, dated May 2, 2016, 3 pages.
International Search Report and Written Opinion for International Application No. PCT/US2016/031928, dated Oct. 7, 2016, 10 pages.
Office Action for U.S. Appl. No. 15/188,946, dated May 8, 2017, 14 pages.
International Search Report and Written Opinion for International Application No. PCT/US2016/038584, dated Sep. 26, 2016, 8 pages.
Office Action for U.S. Appl. No. 15/187,668, dated Feb. 16, 2017, 6 pages.
International Search Report and Written Opinion for International Application No. PCT/US2016/031909, dated Aug. 11, 2016, 13 pages.
Office Action for U.S. Appl. No. 15/194,494, dated May 5, 2017, 16 pages.
International Search Report and Written Opinion for International Application No. PCT/US2016/039662, dated Nov. 29, 2016, 14 pages.
Office Action for U.S. Appl. No. 15/436,653, dated Jun. 2, 2017, 10 pages.
Office Action for U.S. Appl. No. 15/208,545, dated Aug. 21, 2017, 15 pages.
International Search Report and Written Opinion for International Application No. PCT/US2016/041940, dated Oct. 20, 2016, 8 pages.
Supplementary European Search Report for European Application No. 13768150.8, dated Oct. 30, 2015, 7 pages.
International Search Report and Written Opinion for International Application No. PCT/US2013/033652, dated Jun. 12, 2013, 8 pages.
International Search Report and Written Opinion for International Application No. PCT/US2015/041417, dated Oct. 1, 2015, 7 pages.
Office Action for U.S. Appl. No. 14/805,407, dated Dec. 14, 2016, 7 pages.
International Search Report and Written Opinion for International Application No. PCT/US2015/041420, dated Oct. 1, 2015, 6 pages.
Hadani, et al. "Orthogonal Time Frequency Space Modulation" 2017 IEEE Wireless Communications and Networking Conference (WCNC), IEEE, Mar. 19, 2017, 6 pages.
EP Extended Search Report for EP 18 83 2822, dated Feb. 25, 2021, 12 pages.

* cited by examiner

DATA MODULATION SCHEMES BASED ON THE ZAK TRANSFORM

CROSS-REFERENCE TO RELATED APPLICATIONS

This patent document is a continuation of PCT Application No. PCT/US2018/041616 entitled "DATA MODULATION SCHEMES BASED ON THE ZAK TRANSFORM" filed on Jul. 11, 2018, which claims priority to and benefits of U.S. Provisional Patent Application No. 62/531,808 entitled "RADAR WAVEFORM DESIGN IN A ZAK REALIZATION" filed on Jul. 12, 2017. The entire contents of the aforementioned patent applications are incorporated by reference as part of the disclosure of this patent document.

TECHNICAL FIELD

The present document relates to wireless communication, and more particularly, to data modulations schemes used in wireless communication.

BACKGROUND

Due to an explosive growth in the number of wireless user devices and the amount of wireless data that these devices can generate or consume, current wireless communication networks are fast running out of bandwidth to accommodate such a high growth in data traffic and provide high quality of service to users.

Various efforts are underway in the telecommunication industry to come up with next generation of wireless technologies that can keep up with the demand on performance of wireless devices and networks.

SUMMARY

This document discloses techniques that can be used to implement transmitters and receivers for communicating using a modulation technique called lattice division multiplexing.

In one example aspect, wireless communication method, implementable by a wireless communication apparatus is disclosed. The method includes transforming an information signal to a discrete sequence, where the discrete sequence is a Zak transformed version of the information signal, generating a first ambiguity function corresponding to the discrete sequence, generating a second ambiguity function by pulse shaping the first ambiguity function, generating a waveform corresponding to the second ambiguity function, and transmitting the waveform over a wireless communication channel.

In another example aspect, a wireless communication method, implementable by a wireless communication apparatus is disclosed. The method includes transforming an information signal to a discrete lattice domain signal, shaping bandwidth and duration of the discrete lattice domain signal by a two-dimensional filtering procedure to generate a filtered information signal, generating, using a Zak transform, a time domain signal from the filtered information signal, and transmitting the time domain signal over a wireless communication channel.

In yet another example aspect, a wireless communication apparatus that implements the above-described methods is disclosed.

In yet another example aspect, the method may be embodied as processor-executable code and may be stored on a computer-readable program medium.

These, and other, features are described in this document.

DESCRIPTION OF THE DRAWINGS

Drawings described herein are used to provide a further understanding and constitute a part of this application. Example embodiments and illustrations thereof are used to explain the technology rather than limiting its scope.

DETAILED DESCRIPTION

Figure 1:
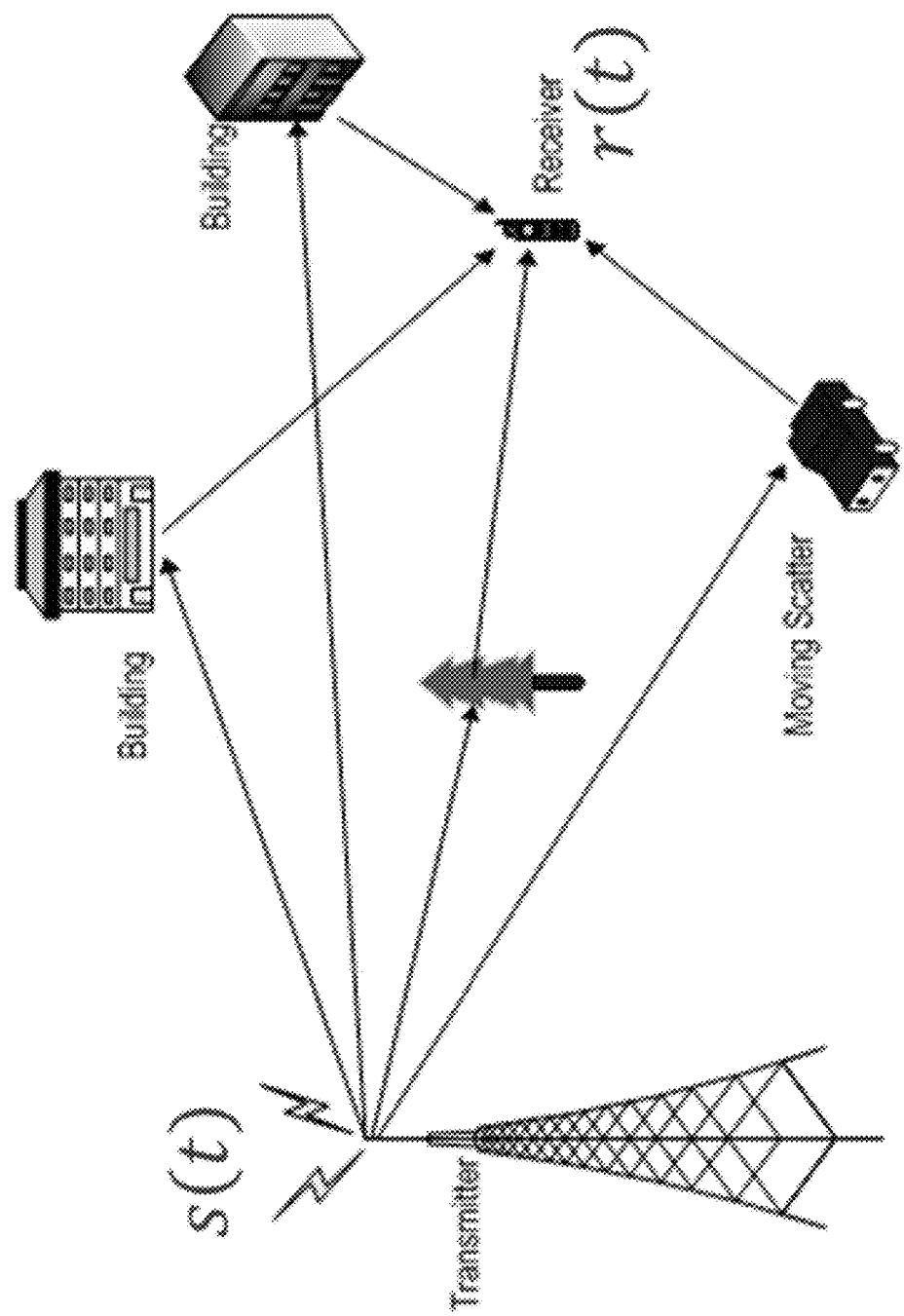
FIG. 1 shows an example of a wireless communication system.

To make the purposes, technical solutions and advantages of this disclosure more apparent, various embodiments are described in detail below with reference to the drawings. Unless otherwise noted, embodiments and features in embodiments of the present document may be combined with each other.

Section headings are used in the present document to improve readability of the description and do not in any way limit the discussion of techniques or the embodiments to the respective sections only.

Traditional multi-carrier (MC) transmissions schemes such as orthogonal frequency division multiplexing (OFDM) schemes are characterized by two parameters: symbol period (or repetition rate) and subcarrier spacing. The symbols include a cyclic prefix (CP), whose size typically depends on the delay of the wireless channel for which the OFDM modulation scheme is being used. In other words, CP size is often fixed based on channel delay and if symbols are shrunk to increase system rate, it simply results in the CP becoming a greater and greater overhead. Furthermore, closely placed subcarriers can cause inter-carrier interference and thus OFDM systems have a practical limit on how close the subcarriers can be placed to each other without causing unacceptable level of interference, which makes it harder for a receiver to successfully receive the transmitted data.

Furthermore, in traditional cellular communication networks, orthogonal codes are used by transmitting devices when attempting to join a wireless network using a random access mechanism. These orthogonal codes are selected to enable unambiguous detection of the transmitting device at a receiving base station.

Embodiments of the disclosed technology are motivated, in part, by the realization that wireless devices may attempt to join the network while the channel between the wireless device and a base station may be impaired both in delay and in Doppler domains due to the movement of the wireless device and multi-path echoes between the wireless device and the base station. In a similar manner, the theoretical framework for operation of radars in detecting objects that could be moving, also benefits from waveforms that show similar robustness properties as the random access waveforms in the wireless domain. The present patent document provides a theoretical basis for generation of waveforms for such use, and other uses, based on techniques for selecting a digital domain sequence that is filtered to produce an analog waveform and the mathematical relationship between the filter response, and the digital and analog waveforms as is applied to the situation where practical systems attempt to overcome delay and Doppler domain distortions.

The theoretical framework disclosed in the present document may be used to build signal transmission and reception equipment that can overcome the above discussed problems, among others.

This patent document discloses, among other techniques, a lattice division multiplexing technique that, in some embodiments, can be used to implement embodiments that can perform multi-carrier digital communication without having to rely on CP.

For the sake of illustration, many embodiments disclosed herein are described with reference to the Zak transform. However, one of skill in the art will understand that other transforms with similar mathematical properties may also be used by implementations. For example, such transforms may include transforms that can be represented as an infinite series in which each term is a product of a dilation of a translation by an integer of the function and an exponential function.

FIG. 1 shows an example communication network 100 in which the disclosed technologies can be implemented. The network 100 may include a base station transmitter that transmits wireless signals s(t) (e.g., downlink signals) to one or more receivers 102, the received signal being denoted as r(t), which may be located in a variety of locations, including inside or outside a building and in a moving vehicle. The receivers may transmit uplink transmissions to the base station, typically located near the wireless transmitter. The technology described herein may be implemented at a receiver 102 or at the transmitter (e.g., a base station).

Signal transmissions in a wireless network may be represented by describing the waveforms in the time domain, in the frequency domain, or in the delay-Doppler domain (e.g., Zak domain). Because these three represent three different ways of describing the signals, signal in one domain can be converted into signal in the other domain via a transform. For example, a time-Zak transform may be used to convert from Zak domain to time domain. For example, a frequency-Zak transform may be used to convert from the Zak domain to the frequency domain. For example, the Fourier transform (or its inverse) may be used to convert between the time and frequency domains.

The sections designated "A", "B" and "C" below provide additional mathematical properties and practical uses of the signal waveforms and graphs depicted in FIGS. 2 to 12.

The use of the cyclic prefix (CP) has enabled multicarrier waveforms (e.g., OFDM) to operate in frequency-selective channels (when the CP is greater than the delay spread of the channel), but as the wireless channel gets harsher, the length of the CP needs to increase, thereby adding to the overhead of the waveform. As described in Sections "A" and "B", embodiments of the disclosed technology may be used to perform multi-carrier digital communication without having to rely on CP, so as to advantageously reduce the overhead required by the waveform.

The performance of radar waveforms is particularly susceptible in channels that are affected by both a delay spread and a doppler spread (e.g., what is termed a "doubly-spread channel"). As described in Section "C", embodiments of the disclosed technology provide compressed radar waveforms that exhibit a uniform temporal power profile and a thumbtack-like ambiguity function with a clean punctured region around the origin who dimensions are free parameters, thereby providing localization in the delay-Doppler representation.

A0. Introduction to OTFS Modulation from Zak Theoretic Point

Next few sections explain the OTFS modulation from the Zak theoretic point of view. This line of exposition push to the forefront the independent status of OTFS as a novel modulation technique and reveals its unique mathematical attributes. This, in contrast to the alternative approach of presenting OTFS as a preprocessing step over MC modulation which somehow obscures the true nature of OTFS and also sacrifice some of its unique strengths. We focus our attention on the following core theoretical topics:

(1) Heisenberg theory.
(2) Zak theory.
(3) OTFS modulation.
(4) Symplectic Fourier duality relation between OTFS and Multi Carrier modulations which is a particular case of the general relation between Radar theory and communication theory.

Before proceeding into a detailed development, it is beneficial to give a brief outline. In signal processing, it is traditional to represent signals (or waveforms) either in time or in the frequency domain. Each representation reveals different attributes of the signal. The dictionary between these two realizations is the Fourier transform:

$$\text{FT}: L_2(t \in \mathbb{R}) \to L_2(f \in \mathbb{R}), \tag{0.1}$$

Interestingly, there is another domain where signals can be naturally realized. This domain is called the delay Doppler domain. For the purpose of the present discussion, this is also referred to as the Zak domain. In its simplest form, a Zak signal is a function $\varphi(\tau, \nu)$ of two variables. The variable $\tau$ is called delay and the variable $\nu$ is called Doppler. The function $\varphi(\tau, \nu)$ is assumed to be periodic along $\nu$ with period $\nu_\tau$ and quasi-periodic along $\tau$ with period $\tau_\tau$.

The quasi periodicity condition is given by:

$$\varphi(\tau+n\tau_r,\nu+m\nu_r)=\exp(j2\pi n\nu\cdot\tau_r)\varphi(\tau,\nu), \quad (0.2)$$

for every $n,m \in \mathbb{Z}$. The periods are assumed to satisfy the Nyquist condition $\tau_r \cdot \nu_r = 1$. Zak domain signals are related to time and frequency domain signals through canonical transforms $\mathcal{Z}_t$ and $\mathcal{Z}_f$ called the time and frequency Zak transforms. In more precise terms, denoting the Hilbert space of Zak signals by $\mathcal{H}_z$, the time and frequency Zak transforms are linear transformations:

$$\mathcal{Z}_t : \mathcal{H}_z \to L_2(t \in \mathbb{R}), \quad (0.3)$$

$$\mathcal{Z}_f : \mathcal{H}_z \to L_2(f \in \mathbb{R}), \quad (0.4)$$

Figure 2:
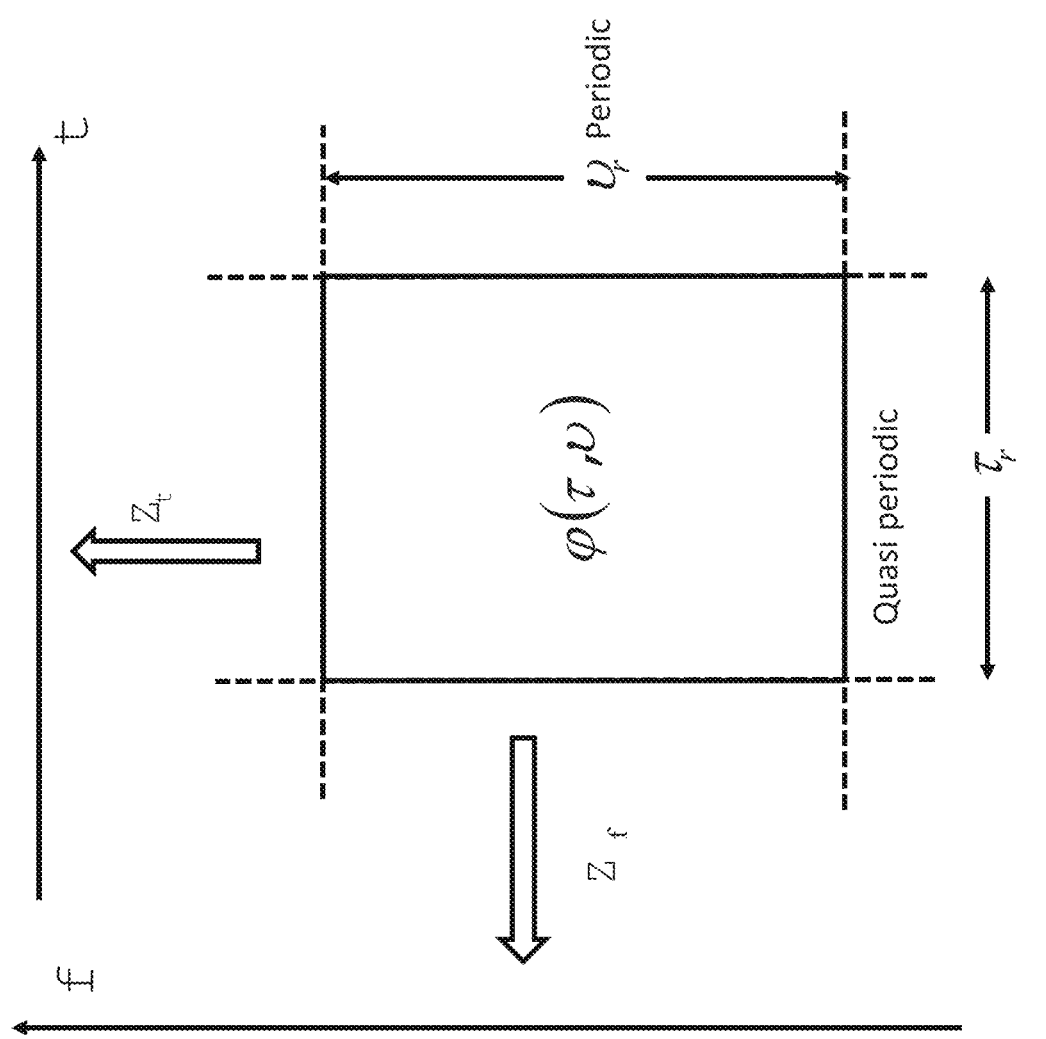
FIG. 2 pictorially depicts relationship between time, frequency and Zak domains.

The pair $\mathcal{Z}_t$ and $\mathcal{Z}_f$ establishes a factorization of the Fourier transform $FT = \mathcal{Z}_t \circ [\mathcal{Z}_f]^{-1}$. This factorization is sometimes referred to as the Zak factorization. The Zak factorization embodies the combinatorics of the fast Fourier transform algorithm. The precise formulas for the Zak transforms will be given in the sequel. At this point it is enough to say that they are principally geometric projections: the time Zak transform is integration along the Doppler variable and reciprocally the frequency Zak transform is integration along the delay variable. The different signal domains and the transformations connecting between them are depicted in FIG. 2.

We next proceed to give the outline of the OTFS modulation. The key thing to note is that the Zak transform plays for OTFS the same role the Fourier transform plays for OFDM. More specifically, in OTFS, the information bits are encoded on the delay Doppler domain as a Zak signal $x(\tau,\nu)$ and transmitted through the rule:

$$OTFS(x) = \mathcal{Z}_t(w *_\sigma x(\tau,\nu)), \quad (0.5)$$

where $w *_\sigma x(\tau,\nu)$ stands for two-dimensional filtering operation with a 2D pulse $w(\tau,\nu)$ using an operation $*_\sigma$ called twisted convolution (to be explained in the present document). The conversion to the physical time domain is done using the Zak transform. Formula (0.5) should be contrasted with the analogue formulas in case of frequency division multiple access FDMA and time division multiple access TDMA. In FDMA, the information bits are encoded on the frequency domain as a signal $x(f)$ and transmitted through the rule:

$$FDMA(x) = FT(w(f)*x(f)), \quad (0.6)$$

where the filtering is done on the frequency domain by linear convolution with a 1D pulse $w(f)$ (in case of standard OFDM $w(f)$ is equal an sinc function). The modulation mapping is the Fourier transform. In TDMA, the information bits are encoded on the time domain as a signal $x(t)$ and transmitted through the rule:

$$TDMA(x) = Id(w(t)*x(t)), \quad (0.7)$$

where the filtering is done on the time domain by linear convolution with a 1D pulse $w(t)$. The modulation mapping in this case is identity.

A1. Heisenberg Theory

In this section we introduce the Heisenberg group and the associated Heisenberg representation. These constitute the fundamental structures of signal processing. In a nutshell, signal processing can be cast as the study of various realizations of signals under Heisenberg operations of delay and phase modulation.

A1.1 the Delay Doppler Plane.

The most fundamental structure is the delay Doppler plane $V = \mathbb{R}^2$ equipped with the standard symplectic form:

$$\omega(\nu_1,\nu_2) = \nu_1\tau_2 - \tau_1\nu_2, \quad (1.1)$$

for every $\nu_1 = (\tau_1,\nu_1)$ and $\nu_2 = (\tau_2,\nu_2)$. Another way to express $w$ is to arrange the vectors $\nu_1$ and $\nu_2$ as the columns of a $2 \times 2$ matrix so that $\omega(\nu_1,\nu_2)$ is equal the additive inverse of the matrix determinant.

$$\omega(\nu_1,\nu_2) = -\det\begin{bmatrix} | & | \\ \nu_1 & \nu_2 \\ | & | \end{bmatrix},$$

The symplectic form is anti-symmetric $\omega(\nu_1,\nu_2) = -\omega(\nu_2,\nu_1)$, thus, in particular $\omega(\nu,\nu) = 0$ for every $\nu \in V$. We also consider the polarization form:

$$\beta(\nu_1,\nu_2) = \nu_1\tau_2, \quad (1.2)$$

for every $\nu_1 = (\tau_1,\nu_1)$ and $\nu_2 = (\tau_2,\nu_2)$. We have that:

$$\beta(\nu_1,\nu_2) - \beta(\nu_2,\nu_1) = \omega(\nu_1,\nu_2), \quad (1.3)$$

The form $\beta$ should be thought of as "half" of the symplectic form. Finally, we denote by $\psi(z) = \exp(2\pi i z)$ is the standard one-dimensional Fourier exponent.

A1.2 the Heisenberg Group.

The polarization form $\beta$ gives rise to a two step unipotent group called the Heisenberg group. As a set, the Heisenberg group is realized as $Heis = V \times S^1$ where the multiplication rule is given by:

$$(\nu_1, z_1) \cdot (\nu_2, z_2) = (\nu_1 + \nu_2, \exp(j2\pi\beta(\nu_1,\nu_2))z_1 z_2), \quad (1.4)$$

One can verify that indeed rule (1.4) yields a group structure: it is associative, the element $(0, 1)$ acts as unit and the inverse of the element $(\nu, z)$ is given by:

$$(\nu,z)^{-1} = (-\nu, \exp(j2\pi\beta(\nu,\nu))z^{-1})$$

Most importantly, the Heisenberg group is not commutative. In general, $(\nu_1,z_1)(\nu_2,z_2) \neq (\nu_2,z_2) \cdot (\nu_1,z_1)$. The center consists of all elements of the form $(0,z)$, $z \in S^1$. The multiplication rule gives rise to a group convolution operation between functions:

$$h_1 *_\sigma h_2(\nu) = \int_{\nu_1+\nu_2=\nu} \exp(j2\pi\beta(\nu_1,\nu_2))/h_1(\nu_1)h_2(\nu_2) \quad (1.5)$$

$$= \int_{\nu'} \exp(j2\pi\beta(\nu',\nu-\nu'))h_1(\nu')h_2(\nu-\nu')d\nu',$$

for every pair of functions $h_1, h_2 \in \mathcal{C}(V)$. We refer to (1.5) as Heisenberg convolution or twisted convolution. We note that a twisted convolution differs from linear convolution through the additional phase factor $\exp j2\pi\beta(\nu_1,\nu_2))$.

A1.3 the Heisenberg Representation

The representation theory of the Heisenberg group is relatively simple. In a nutshell, fixing the action of the center, there is a unique (up-to isomorphism) irreducible representation. This uniqueness is referred to as the Stone-von Neumann property. The precise statement is summarized in the following theorem:

Theorem 1.1 (Stone-von-Neumann Theorem). There is a unique (up to isomorphism) irreducible Unitary representation $\pi$: $Heis \to U(\mathcal{H})$ such that $\pi(0,z) = z Id \mathcal{H}$.

In concrete terms, the Heisenberg representation is a collection of unitary operators $\pi(v) \in U(\mathcal{H})$, for every $v \in V$ satisfying the multiplicativity relation:

$$\pi(v_1) \circ \pi(v_2) = \exp(j2\pi\beta(v_1,v_2))\pi(v_1+v_2), \quad (1.6)$$

for every $v_1, v_2 \in V$. In other words, the relations between the various operators in the family are encoded in the structure of the Heisenberg group. An equivalent way to view the Heisenberg representation is as a linear transform $\Pi: \mathcal{C}(V) \to Op(\mathcal{H})$, taking a function $h \in \mathcal{C}(V)$ and sending it to the operator $\Pi(h) \in Op(\mathcal{H})$ given by:

$$\prod h = \int_{v \in V} h(v) dv, \quad (1.7)$$

The multiplicativity relation (1.6) translates to the fact that $\Pi$ interchanges between Heisenberg convolution of functions and composition of linear transformations, i.e., $$\Pi(h_1 *_\sigma h_2) = \Pi(h_1) \circ \Pi(h_2), \quad (1.8)$$

for every $h_1, h_2 \in \mathcal{C}(V)$. Interestingly, the representation $\pi$, although is unique, admits multitude of realizations. Particularly well known are the time and frequency realizations, both defined on the Hilbert space of complex valued functions on the real line $\mathcal{H} = L_2(\mathbb{R})$. For every $x \in \mathbb{R}$, we define two basic unitary transforms:

$$L_x(\varphi)(y) = \varphi(y-x), \quad (1.9)$$

$$M_x(\varphi)(y) = \exp(j2\pi xy)\varphi(y), \quad (1.10)$$

for every $\varphi \in \mathcal{H}$. The transform $L_x$ is called delay by x and the transform $M_x$ is called modulation by x. Given a point $v = (\tau, \nu) \in V$ we define the time realization of the Heisenberg representation by:

$$\pi_t(v) \triangleright \varphi = L_\tau \circ M_\nu(\varphi), \quad (1.11)$$

where we use the notation $\triangleright$ to designate the application of an operator on a vector. It is usual in this context to denote the basic coordinate function by t (time). Under this convention, the right-hand side of (1.11) takes the explicit form $\exp(j2\pi\nu(t-\tau))\varphi(t-\tau)$. Reciprocally, we define the frequency realization of the Heisenberg representation by:

$$\pi_f(v) \triangleright \varphi = M_{-\tau} \circ L_\nu(\varphi), \quad (1.12)$$

In this context, it is accustom to denote the basic coordinate function by f (frequency). Under this convention, the right-hand side of (1.12) takes the explicit form $\exp(-j2\pi\tau f)\varphi(f-\nu)$. By Theorem 1.1, the time and frequency realizations are isomorphic in the sense that there is an intertwining transform translating between the time and frequency Heisenberg actions. The intertwining transform in this case is the Fourier transform:

$$FT(\varphi)(f) = \int_t \exp(-j2\pi ft)\varphi(t)dt, \quad (1.13)$$

for every $\varphi \in \mathcal{H}$. The time and frequency Heisenberg operators $\pi_t(v,z)$ and $\pi_f(v,z)$ are interchanged via the Fourier transform in the sense that:

$$FT \circ \pi_t(v) = \pi_f(v) \circ FT, \quad (1.14)$$

for every $v \in V$. We stress that from the point of view of representation theory the characteristic property of the Fourier transform is the interchanging equation (1.14).

A2. Zak Theory

In this section we describe the Zak realization of the signal space. A Zak realization depends on a choice of a parameter. This parameter is a critically sampled lattice in the delay Doppler plane. Hence, first we devote some time to get some familiarity with the basic theory of lattices. For simplicity, we focus our attention on rectangular lattices.

A2.1 Delay Doppler Lattices.

A delay Doppler lattice is an integral span of a pair of linear independent vectors $g_1, g_2 \in V$. In more details, given such a pair, the associated lattice is the set:

$$\Lambda = \{a_1 g_1 + a_2 g_2 : a_1, a_2 \in \mathbb{Z}\}, \quad (2.1)$$

The vectors $g_1$ and $g_2$ are called the lattice basis vectors. It is convenient to arrange the basis vectors as the first and second columns of a matrix G, i.e.:

$$G = \begin{bmatrix} | & | \\ g_1 & g_2 \\ | & | \end{bmatrix}, \quad (2.2)$$

referred to as the basis matrix. In this way the lattice $\Lambda = G(\mathbb{Z}^2)$, that is, the image of the standard lattice under the matrix G. The volume of the lattice is by definition the area of the fundamental domain which is equal to the absolute value of the determinant of G. Every lattice admits a symplectic reciprocal lattice, aka orthogonal complement lattice that we denote by $\Lambda^\perp$. The definition of $\Lambda^\perp$ is:

$$\Lambda^\perp = \{v \in V : \omega(v,\lambda) \in \mathbb{Z} \text{ for every } \lambda \in \Lambda\}, \quad (2.3)$$

We say that $\Lambda$ is under-sampled if $\Lambda \subset \Lambda^\perp$. we say that $\Lambda$ is critically sampled if $\Lambda = \Lambda^\perp$. Alternatively, an under-sampled lattice is such that the volume of its fundamental domain is $\geq 1$. From this point on we consider only under-sampled lattices. Given a lattice $\Lambda$, we define its maximal rectangular sub-lattice as $\Lambda_r = \mathbb{Z}\tau_r \oplus \mathbb{Z}\nu_r$ where:

$$\tau_r = \arg\min\{\tau > 0 : (\tau, 0) \in \Lambda\}, \quad (2.4)$$

$$\nu_r = \arg\min\{\nu > 0 : (0, \nu) \in \Lambda\}, \quad (2.5)$$

When either $\tau_r$ or $\nu_r$ are infinite, we define $\Lambda_r = \{0\}$. We say a lattice $\Lambda$ is rectangular if $\Lambda = \Lambda_r$. Evidently, a sub-lattice of a rectangular lattice is also rectangular. A rectangular lattice is under-sampled if $\tau_r \nu_r \geq 1$. The standard example of a critically sampled rectangular lattice is $\Lambda_{rec} = \mathbb{Z} \oplus \mathbb{Z}$, generated by the unit matrix:

$$G_{rec} = \begin{bmatrix} 1 & 0 \\ 0 & 1 \end{bmatrix}, \quad (2.6)$$

Figure 3:
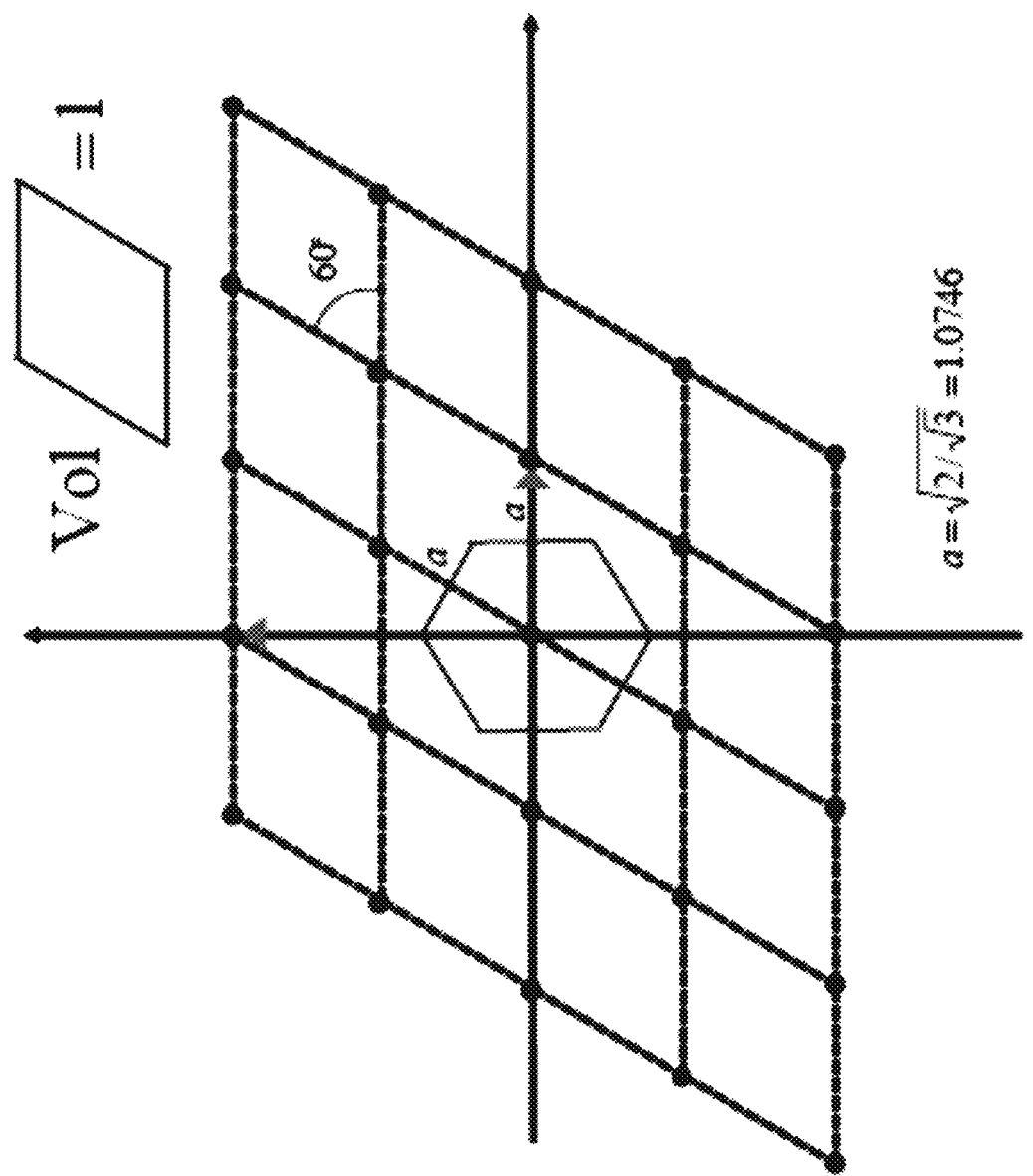
FIG. 3 shows an example of a hexagonal lattice. The hexagon at the center region encloses Voronoi region around the zero lattice point. The two lattice points with arrow decoration are the basis of the maximal rectangular sublattice.

An important example of critically sampled lattice that is not rectangular is the hexagonal lattice $\Lambda_{hex}$, see FIG. 3, generated by the basis matrix:

$$G_{hex} \begin{bmatrix} a & a/2 \\ 0 & a^{-1} \end{bmatrix}, \quad (2.7)$$

where $$a = \sqrt{2/\sqrt{3}}$$

The interesting attribute of the hexagonal lattice is that among all critically sampled lattices it has the longest distance between neighboring points. The maximal rectangular sub-lattice of $\Lambda_{hex}$ is generated by $g_1$ and $2g_2 - g_1$, see the two lattice points decorated with arrow heads in FIG. 3. From this point on we consider only rectangular lattices.

A2.2 Zak Waveforms

A Zak realization is parametrized by a choice of a critically sampled lattice:

$$\Lambda = \mathbb{Z}(\tau_r, 0) \oplus \mathbb{Z}(0, \nu_r), \quad (2.8)$$

where $\tau_r \cdot \nu_r = 1$. The signals in a Zak realization are called Zak signals. Fixing the lattice $\Lambda$, a Zak signal is a function $\varphi: V \to \mathbb{C}$ that satisfies the following quasi periodicity condition:

$$\varphi(\nu + \lambda) = \exp(j2\pi\beta(\nu, \lambda))\varphi(\nu), \quad (2.9)$$

for every $\nu \in V$ and $\lambda \in \Lambda$. Writing $\lambda = (k\tau_r, l\nu_r)$, condition (2.9) takes the concrete form:

$$\varphi(\tau + k\tau_r, \nu + l\nu_r) = \exp(j2\pi\nu k\tau_r)\varphi(\tau, \nu), \quad (2.10)$$

that is to say that $\varphi$ is periodic function along the Doppler dimension with period $\nu_r$ and quasi-periodic function along the delay dimension with quasi period $\tau_r$. In conclusion, we denote the Hilbert space of Zak signals by $\mathcal{H}_z$.

A2.3 Heisenberg Action

The Hilbert space of Zak signals supports a realization of the Heisenberg representation. Given an element $u \in V$, the corresponding Heisenberg operator $\pi_z(u)$ is given by:

$$\{\pi_z(u) \triangleright \varphi\}(\nu) = \exp(j2\pi\beta(u, \nu - u))\varphi(\nu - u), \quad (2.11)$$

for every $\varphi \in \mathcal{H}_z$. In words, the element u acts through two-dimensional shift in combination with modulation by a linear phase. The Heisenberg action simplifies in case the element u belongs to the lattice. A direct computation reveals that in this case the action of $u = \lambda \in \Lambda$ takes the form:

$$\{\pi_z(\lambda) \triangleright \varphi\}(\nu) = \exp(j2\pi\omega(\lambda, \nu))\varphi(\nu), \quad (2.12)$$

In words, the operator $\pi_z(\lambda)$ is multiplication with the symplectic Fourier exponent associated with the point $\lambda$. Consequently, the extended action of an impulse function $h \in \mathcal{C}(V)$ is given by:

$$\{\prod_z(h) \triangleright \varphi\}(\nu) = \int_{u \in V} h(u)\{\pi_z(u) \triangleright \varphi\}(\nu)du \quad (2.13)$$

$$= \int_{u \in V} \psi(j2\pi\beta(u, \nu - u))h(u)\varphi(\nu - u)du,$$

for every $\varphi \in \mathcal{H}_z$. In fact, $\Pi_z(h) \triangleright \varphi = h *_\sigma \varphi$, that is to say that the extended action is given by twisted convolution of the impulse h with the waveform $\varphi$.

A2.4 Zak Transforms

There are canonical intertwining transforms converting between Zak signals and time/frequency signals, referred to in the literature as the time/frequency Zak transforms. We denote them by:

$$\mathcal{Z}_t : \mathcal{H}_z \to L_2(t \in \mathbb{R}), \quad (2.14)$$

$$\mathcal{Z}_f : H_z \to L_2(f \in \mathbb{R}), \quad (2.15)$$

Figure 4:
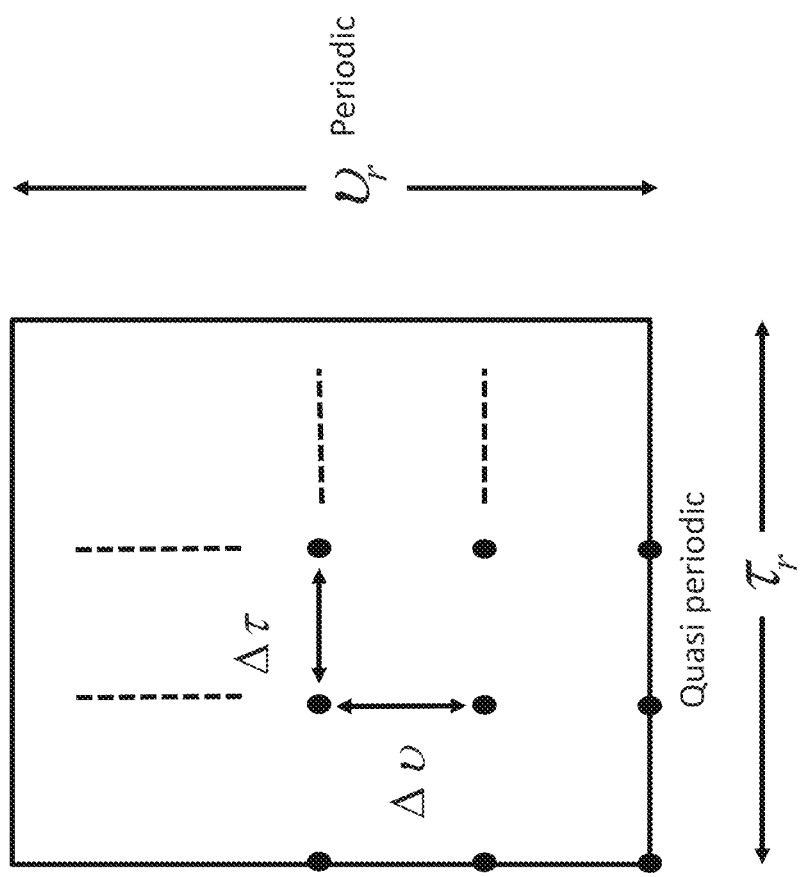
FIG. 4 pictorially depicts the periodic and quasi-periodic nature of an information grid in the Zak domain.

As it turns out, the time/frequency Zak transforms are basically geometric projections along the reciprocal dimensions, see FIG. 4. The formulas of the transforms are as follows:

$$\mathcal{Z}_t(\varphi)(t) = \int_0^{\nu_r} \varphi(t, \nu)d\nu, \quad (2.16)$$

$$\mathcal{Z}_f(\varphi)(f) = \int_0^{\tau_r} \exp(-j2\pi f \tau)\varphi(\tau, f)d\tau, \quad (2.17)$$

for every $\varphi \in \mathcal{H}_z$. In words, the time Zak transform is integration along the Doppler dimension (taking the DC component) for every point of time. Reciprocally, the frequency Zak transform is Fourier transform along the delay dimension. The formulas of the inverse transforms are as follows:

$$\mathcal{Z}_t^{-1}(\varphi)(\tau, \nu) = \sum_{n \in \mathbb{Z}} \exp(-j2\pi\nu\tau_r n)\varphi(\tau + n\tau_r), \quad (2.18)$$

$$\mathcal{Z}_f^{-1}(\varphi)(\tau, \nu) = \sum_{n \in \mathbb{Z}} \exp(j2\pi\tau(\nu_r n + \nu))\varphi(\nu + n\nu_r), \quad (2.19)$$

for every $\varphi \in L_2(\mathbb{R})$. From this point on we will focus only on the time Zak transform and we will denote it by $\mathcal{Z} = \mathcal{Z}_{t_r}$. As an intertwining transform $\mathcal{Z}$ interchanges between the two Heisenberg operators $\pi_z(\nu, z)$ and $\pi_t(\nu, z)$, i.e.:

$$\mathcal{Z} \circ \pi_z(\nu) = \pi_t(\nu) \circ \mathcal{Z} \quad (2.20)$$

for every $\nu \in V$. From the point of view of representation theory the characteristic property of the Zak transform is the interchanging equation (2.20).

A2.5 Standard Zak Signal

Our goal is to describe the Zak representation of the window function:

$$p(t) = \begin{cases} 1 & 0 \leq t < \tau_r \\ 0 & \text{otherwise} \end{cases}, \quad (2.21)$$

This function is typically used as the generator waveform in multi-carrier modulations (without CP). A direct application of formula (2.18) reveals that $P = \mathcal{Z}^{-1}(p)$ is given by:

$$P(\tau, \nu) = \sum_{n \in \mathbb{Z}} \psi(\nu n \tau_r) p(\tau - n\tau_r), \quad (2.22)$$

One can show that $P(a\tau_r, b\nu_r) = 1$ for every $a, b \in [0, 1)$, which means that it is of constant modulo 1 with phase given by a regular step function along $\tau$ with constant step given by the Doppler coordinate $\nu$. Note the discontinuity of P as it jumps in phase at every integer point along delay. This phase discontinuity is the Zak domain manifestation of the discontinuity of the rectangular window p at the boundaries.

A3. OTFS

The OTFS transceiver structure depends on the choice of the following parameters: a critically sampled lattice $\Lambda = \mathbb{Z}(\tau_r, 0) \oplus \mathbb{Z}(0, \nu_r)$, a filter function $w \in \mathcal{C}(V)$ and an information grid specified by $N, M \in \mathbb{N}$. We assume that the filter function factorizes as $w(\tau, \nu) = w_\tau(\tau)w_\nu(\nu)$ where the delay and Doppler factors are square root Nyquist with respect to $\Delta\tau = \tau_r/N$ and $\Delta\nu = \nu_r/M$ respectively. We encode the information bits as a periodic 2D sequence of QAM symbols $x = x[n\Delta\tau, m\Delta\nu]$ with periods (N, M). Multiplying x by the standard Zak signal P we obtain a Zak signal x P. A concrete way to think of x P is as the unique quasi periodic extension of the finite sequence $x[n\Delta\tau, m\Delta\nu]$ where $n = 0, \ldots, N-1$ and $m = 0, \ldots, M-1$. We define the modulated transmit waveform as:

$$M(x) = \mathcal{Z}\left(\prod_z(w) *_\sigma x \cdot P\right) \quad (3.1)$$

$$= \mathcal{Z}(w *_\sigma x \cdot P),$$

To summarize: the modulation rule proceeds in three steps. In the first step the information block x is quasi-periodized thus transformed into a discrete Zak signal. In the second step, the bandwidth and duration of the signal are shaped through a 2D filtering procedure defined by twisted convolution with the pulse w. In the third step, the filtered signal is transformed to the time domain through application of the Zak transform. To better understand the structure of the transmit waveform we apply few simple algebraic manipulations to (3.1). First, we note that, being an inter-twiner (Formula (2.20)), the Zak transform obeys the relation:

$$\mathcal{Z}(\Pi_t(w)*_\sigma x \cdot P) = \Pi_t(w) \mathcal{Z} \mathcal{Z}(x \cdot P), \quad (3.2)$$

Second, we note that the factorization $w(\tau,v) = w_\tau(\tau)w_v(v)$ can be expressed as twisted convolution $w = w_\tau *_\sigma w_v$. Hence, we can write:

$$\prod_t(w) \triangleright \mathcal{Z}(x \cdot P) = \prod_t(w_\tau *_\sigma w_v) \triangleright \mathcal{Z}(x \cdot P) \quad (3.3)$$
$$= \prod_t(w_\tau) \triangleright \{\prod_t(w_v) \triangleright \mathcal{Z}(x \cdot P)\}$$
$$= w_\tau * \{W_t \cdot \mathcal{Z}(x \cdot P)\},$$

where $W_t = FT^{-1}(w_v)$ and * stands for linear convolution in time. We refer to the waveform $\mathcal{Z}(x \cdot P)$ as the bare OTFS waveform. We see from Formula (3.3) that the transmit waveform is obtained from the bare waveform through windowing in time followed by convolution with a pulse. This cascade of operations is the time representation of 2D filtering in the Zak domain. It is beneficial to study the structure of the bare OTFS waveform in the case x is supported on a single grid point (aka consists of a single QAM symbol), i.e., $x = \delta(n\Delta\tau, m\Delta v)$. In this case, one can show that the bare waveform takes the form:

$$\mathcal{Z}(x \cdot P) = \sum_K \exp(j2\pi m(K+n/N)/M)\delta(K\tau_r + n\Delta\tau), \quad (3.4)$$

Figure 5:
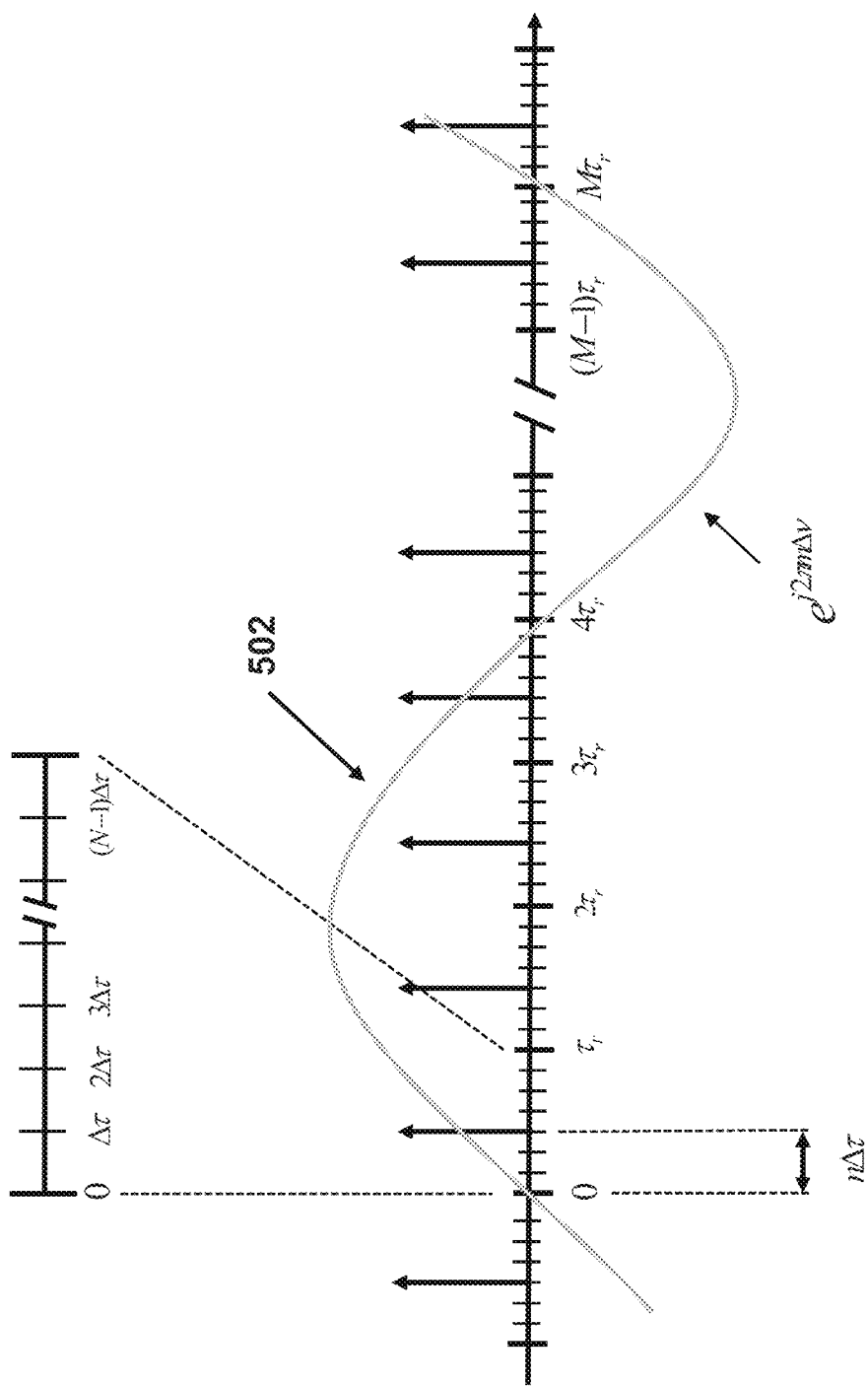
FIG. 5 is a graphical representation of an OTFS waveform.
Figure 6:
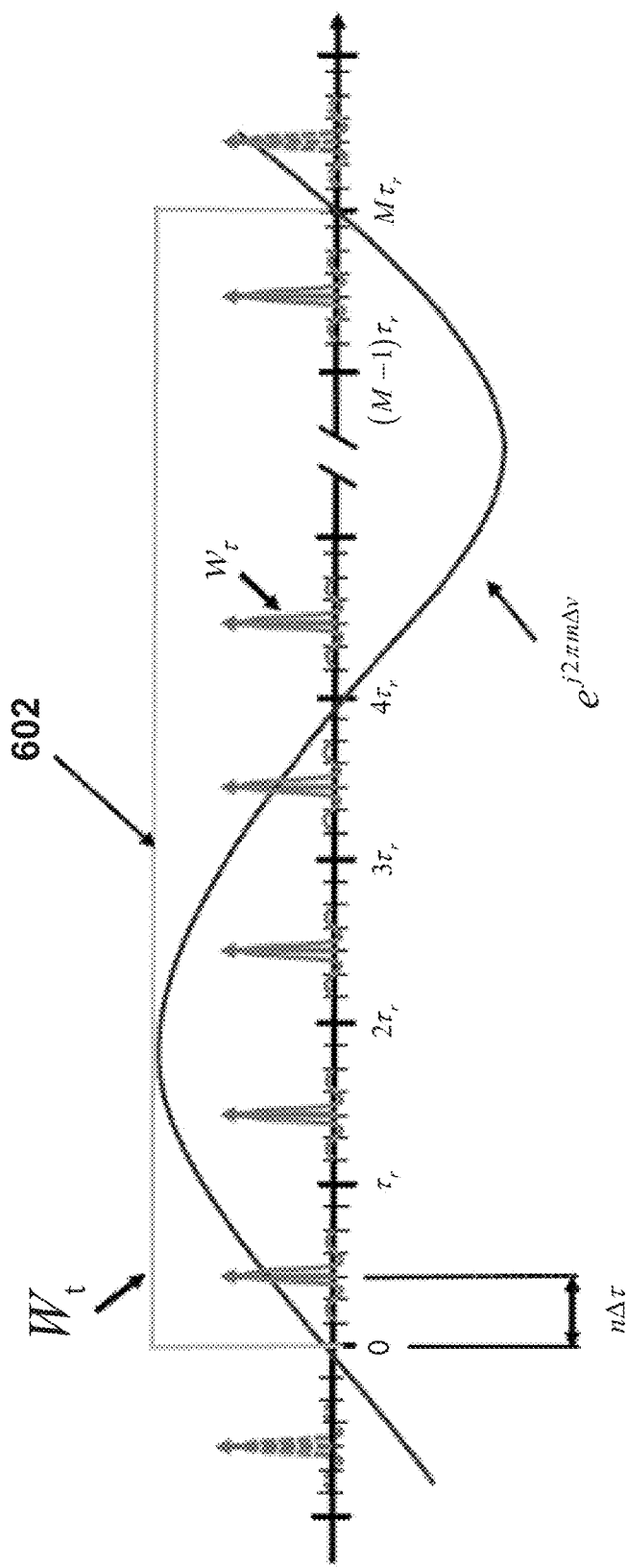
FIG. 6 is a graphical representation of filtered OTFS waveform.

In words, the bare waveform is a shifted and phase modulated infinite delta pulse train of pulse rate $v_\tau = \tau_\tau^{-1}$ where the shift is determined by the delay parameter n and the modulation is determined by the Doppler parameter m. Bare and filtered OTFS waveforms corresponding to a single QAM symbol are depicted in FIG. 5 and FIG. 6 respectively. We next proceed to describe the de-modulation mapping. Given a received waveform $\varphi_{rx}$, its de-modulated image $y = \mathcal{D}(\varphi_{rx})$ is defined through the rule:

$$\mathcal{D}(\varphi_{rx}) = *_\sigma \mathcal{Z}^{-1}(\varphi_{rx}), \quad (3.5)$$

where w* is the matched filter given by $w^*(v) = \exp(-j2\pi\beta(v,v))\overline{w(-v)}$. We often incorporate an additional step of sampling y at $(n\Delta\tau, m\Delta v)$ for $n=0, \ldots, N-1$ and $m=0, \ldots, M-1$.

A3.1 OTFS Channel Model

The OTFS channel model is the explicit relation between the input variable x and the output variable y in the presence of a channel H. We assume the channel transformation is defined as $H = \Pi_t(h)$ where $h = h(\tau, v)$ is the delay Doppler impulse response. This means that given a transmit waveform $\omega_{tx}$, the received waveform $\varphi_{rx} = H(\varphi_{tx})$ is given by:

$$\varphi_{rx}(t) = \int_{\tau,v} h(\tau,v)\exp(j2\pi v(t-\tau))\varphi_{tx}(t)d\tau dv, \quad (3.6)$$

If we take the transmit waveform to be $\varphi_{tx} = \mathcal{M}(x)$ then direct computation reveals that:

$$y = \mathcal{D} \circ H \circ \mathcal{M}(x) \quad (3.7)$$
$$= w \star *_\sigma \mathcal{Z}^{-1}(\prod_t(h) \triangleright \mathcal{Z}(w *_\sigma x \cdot P))$$
$$= w \star *_\sigma h *_\sigma \mathcal{Z}^{-1} o \mathcal{Z}(w *_\sigma x \cdot P)$$
$$= w \star *_\sigma h *_\sigma w *_\sigma x \cdot P,$$

If we denote $h_w = w^{\star *}_\sigma h^*_\sigma w$ then we can write the input-output relation in the form:

$$y = h_w *_\sigma x \cdot P, \quad (3.8)$$

The delay Doppler impulse $h_w$ represents the filtered channel that interacts with the QAM symbols when those are modulated and de-modulated through the OTFS transceiver cycle. One can show that under some mild assumptions $h_w$ is well approximated by $h*w^{(2)}$ where * stands for linear convolution and $w^{(2)} = w^{\star *}w$ is the linear auto-correlation function. In case the channel is trivial, that is $h = \delta(0,0)$, we get that $h_w = w^{\star *}_\sigma w \sim w^{(2)}$, thus after sampling we get (an approximate) perfect reconstruction relation:

$$y[n\Delta\tau, m\Delta v] \sim x[n\Delta\tau, m\Delta v], \quad (3.9)$$

for every $n=0, \ldots, N-1$ and $m=0, \ldots, M-1$.

A4. Symplectic Fourier Duality

In this section we describe a variant of the OTFS modulation that can be expressed by means of symplectic Fourier duality as a pre-processing step over critically sampled MC modulation. We refer to this variant as OTFS-MC. For the sake of concreteness, we develop explicit formulas only for the case of OFDM without a CP.

A4.1 Symplectic Fourier Transform

We denote by $L_2(V)$ the Hilbert space of square integrable functions on the vector space V. For every $v \in V$ we define the symplectic exponential (wave function) parametrized by v as the function $\psi_v : V \to \mathbb{C}$ given by:

$$\psi_v(u) = \exp(j2\pi\omega(v,u)), \quad (4.1)$$

for every $u \in V$. Concretely, if $v = (\tau,v)$ and $u = (\tau',v')$ then $\psi_v(u) = \exp(j2\pi(v\tau' - \tau v'))$. Using symplectic exponents we define the symplectic Fourier transform as the unitary transformation $SF: L_2(V) \to L_2(V)$ given by:

$$SF(g)(v) = \int_{v'} \overline{\psi_v(v')}g(v')dv' \quad (4.2)$$
$$= \int_{v'} \exp(-j2\pi\omega(v,v'))g(v')dv',$$

The symplectic Fourier transform satisfies various interesting properties (much in analogy with the standard Euclidean Fourier transform). The symplectic Fourier transform converts between linear convolution and multiplication of functions, that is:

$$SF(g_1 * g_2) = SF(g_1) \cdot SF(g_2), \quad (4.3)$$

for every $g_1, g_2 \in L_2(V)$. Given a lattice $\Lambda \subset V$, the symplectic Fourier transform maps sampled functions on $\Lambda$ to periodic function with respect to the symplectic reciprocal lattice $\Lambda^\perp$. That is, if g is sampled and $G = SF(g)$ then $G(v+\lambda^\perp) = G(v)$ for every $v \in V$ and $\lambda^\perp \in \Lambda^\perp$. This relation takes a simpler form in case $\Lambda$ is critically sampled since $\Lambda^\perp = \Lambda$. Finally, unlike its Euclidean counterpart, the symplectic Fourier transform is equal to its inverse, that is $SF = SF^{-1}$.

A4.2 OTFS-MC.

The main point of departure is the definition of the filtering pulse w and the way it applies to the QAM symbols. To define the MC filtering pulse we consider sampled window function W: $\Lambda \to \mathbb{C}$ on the lattice $\Lambda = \mathbb{Z}\tau_r \oplus \mathbb{Z}\nu_r$. We define w to be the symplectic Fourier dual to W:

$$w = SF(W), \quad (4.4)$$

By definition, w is a periodic function on V satisfying w $(\nu + \lambda) = w(\nu)$ for every $\nu \in V$ and $\lambda \in \Lambda$. Typically, W is taken to be a square window with 0/1 values spanning over a certain bandwidth $B = M \cdot \nu_r$ and duration $T = N \cdot \tau_r$. In such a case, w will turn to be a Dirichlet sinc function that is Nyquist with respect to the grid $\lambda_{N,M} = \mathbb{Z}\Delta\tau \oplus \mathbb{Z}\Delta\nu$, where:

$$\Delta\tau = \tau_r/N, \quad (4.5)$$

$$\Delta\nu = \nu_r/M, \quad (4.6)$$

More sophisticated windows designs can include tapering along the boundaries and also include pseudo-random scrambling phase values. As before, the bits are encoded as a 2D periodic sequence of QAM symbols $x = x[n\Delta\tau, m\Delta\nu]$ with period (N, M). The transmit waveform is defined through the rule:

$$\mathcal{M}_{MC}(x) = \mathcal{Z}((w*x) \cdot P) \quad (4.7)$$

In words, the OTFS-MC modulation proceeds in three steps. First step, the periodic sequence is filtered by means of periodic convolution with the periodic pulse w. Second step, the filtered function is converted to a Zak signal by multiplication with the Zak signal P. Third step, the Zak signal is converted into the physical time domain by means of the Zak transform. We stress the differences from Formula (3.1) where the sequence is first multiplied by P and then filtered by twisted convolution with a non-periodic pulse. The point is that unlike (3.1), Formula (4.7) is related through symplectic Fourier duality to MC modulation. To see this, we first note that $w*x = SF(W \cdot X)$ where $X = SF(x)$. This means that we can write:

$$(w*x) \cdot P = \sum_{\lambda \in \Lambda} W(\lambda) X(\lambda) \psi_\lambda \cdot P \quad (4.8)$$

$$= \sum_{\lambda \in \Lambda} W(\lambda) X(\lambda) \pi_z(\lambda) \triangleright P,$$

where the first equality is by definition of the Symplectic Fourier transform and the second equality is by Formula (2.12). We denote $X_W = W \cdot X$. Having established this relation we can develop (4.7) into the form:

$$\mathcal{M}_{MC}(x) = \mathcal{Z}\left(\sum_{\lambda \in \Lambda} X_W(\lambda) \pi_z(\lambda) \triangleright P\right) \quad (4.9)$$

$$= \sum_{\lambda \in \Lambda} X_W(\lambda) \mathcal{Z}(\pi_z(\lambda) \triangleright P)$$

$$= \sum_{\lambda \in \Lambda} X_W(\lambda) \pi_t(\lambda) \triangleright \mathcal{Z}(P)$$

$$= \sum_{\lambda \in \Lambda} X_W(\lambda) \pi_t(\lambda) \triangleright p,$$

where the third equality is the intertwining property of the Zak transform and the forth equality is by definition $p = \mathcal{Z}(P)$. In case of OFDM without CP, the pulse p is given by the square window along the interval $[0, \tau_r]$. Consequently, the last expression in (4.9) can be written explicitly as:

$$\mathcal{M}_{MC}(x) = \sum_{k,l} X_W(k\tau_r, l\nu_r) \pi_t(k\tau_r, l\nu_r) \triangleright 1_{[0,\tau_r]} \quad (4.10)$$

$$= \sum_{k,l} X_W(k\tau_r, l\nu_r) L_{k\tau_r} M_{l\nu_r} \triangleright 1_{[0,\tau_r]}$$

$$= \sum_{k,l} X_W(k\tau_r, l\nu_r) \exp(j2\pi l\nu_r(t - k\tau_r)) 1_{[k\tau_r,(k+1)\tau_r]},$$

Figure 7:
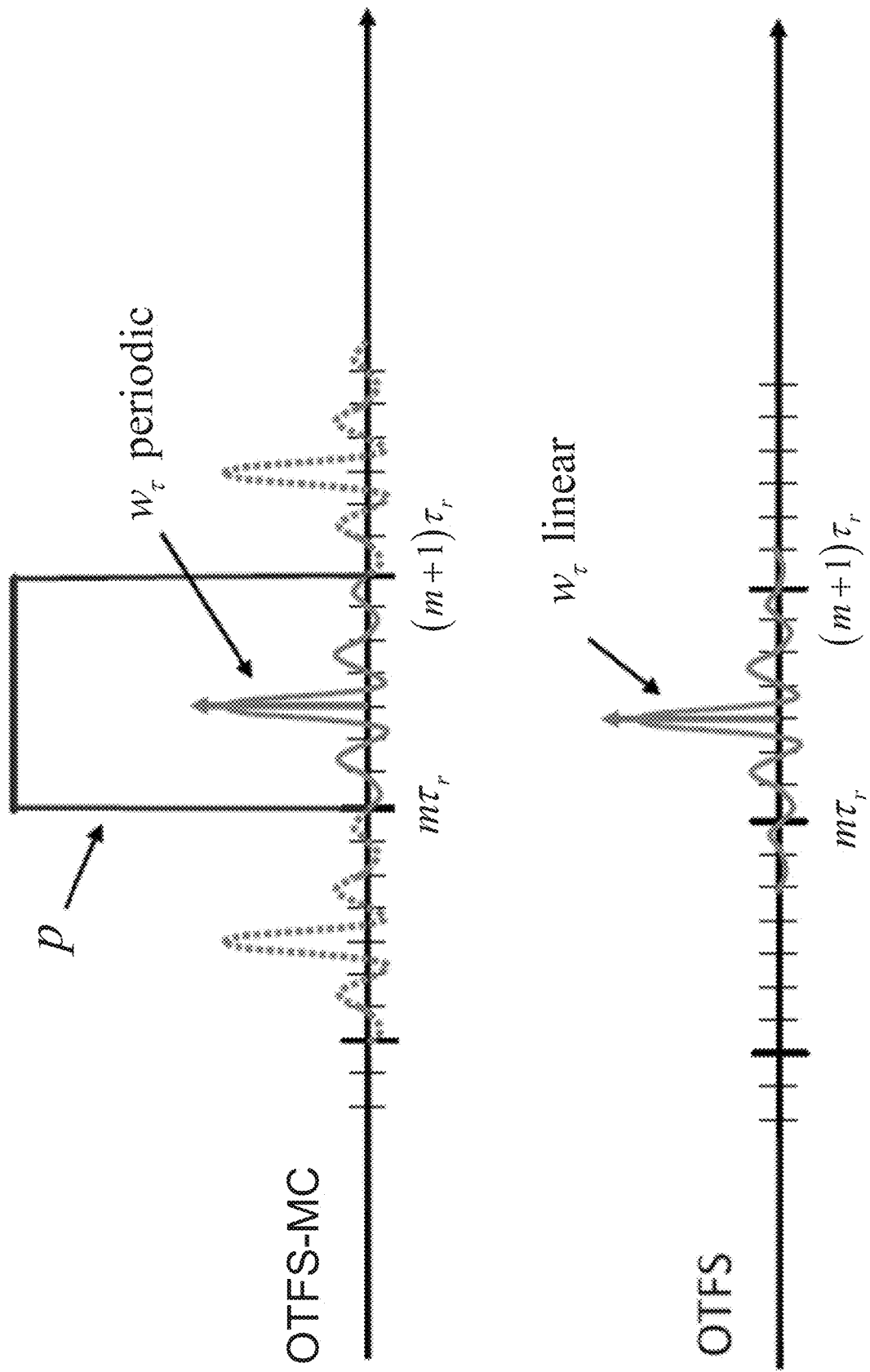
FIG. 7 is a graphical comparison of transmit waveforms of a single QAM symbol using OTFS and OTFS-MC (multicarrier).

The last expression of (4.10) can be recognized as MC modulation of the (windowed) sequence of Fourier coefficients $X_W$. It is interesting to compare the transmit waveforms of OTFS and OTFS-MC corresponding to single QAM symbols. The two structures are depicted in FIG. 7. The main structural difference is the presence of discontinuities at the grid points $\mathbb{Z}\tau_r$ in the case of OTFS-MC.

B0. Introduction to OTFS Transceiver Operations from Realization Theory Perspective In the subsequent sections, we introduce yet another mathematical interpretation of the OTFS transceiver from the point of view of realization theory. In a nutshell, in this approach one considers the signal space of waveforms as a representation space of the Heisenberg group or equivalently as a Hilbert space equipped with collection of Heisenberg operators, each associated with a different point in the delay Doppler plane. This representation space admits multitude of realizations. The two standard ones are the time and frequency realizations and they are related through the one-dimensional Fourier transform. In communication theory the TDMA transceiver structure is naturally adapted to the time realization as QAM symbols are multiplexed along the time coordinate while the OFDM transceiver structure is naturally adapted to the frequency realization as the QAM symbols are multiplexed along the frequency coordinate. The main observation is that, there is a canonical realization lying in between the time and frequency realizations, called the Zak realization. Interestingly, waveforms in Zak realization are represented as functions on a two-dimensional delay Doppler domain satisfying certain quasi-periodicity condition. The main message of this note is that the Zak realization is naturally adapted to the OTFS transceiver. Viewing the OTFS transceiver from this perspective extenuates its novel and independent standing among the other existing transceiver structures. For convenience, we summarize in the following table the main formulas presented in this note:

| (0.1) | | |
|---|---|---|
| | QP | $\varphi(\nu + \lambda) = \psi(\beta(\nu, \lambda)) \pi_e(\lambda)^{-1} \triangleright \varphi(\nu)$ |
| | Z-Heis | $\pi^e(\nu_0) \triangleright \varphi(\nu) = \psi(-\beta(\nu_0, \nu_0)) \psi(\beta(\nu_0, \nu)) \varphi(\nu - \nu_0)$ |
| | Z-Heis (lattice) | $\pi^e(\lambda, \epsilon(\lambda)) \triangleright \varphi(\nu) = \psi(\omega(\lambda, \nu)) \varphi(\nu)$ |
| | Zak to time | $\mathcal{Z}_{time,\epsilon}(\varphi)(t) = \int_0^{\nu_r} \varphi(t, \nu) d\nu$ |
| | time to Zak | $\mathcal{Z}_{\epsilon,time}(\varphi)(\tau, \nu) = \Sigma_n \psi(-\nu\tau_r n) f(\tau + n\tau_r)$ |
| | Zak to freq | $\mathcal{Z}_{freq,\epsilon}(\varphi)(f) = \int_0^{\tau_r} \psi(-f\tau) \varphi(\tau, f) d\tau$ |
| | freq to Zak | $\mathcal{Z}_{\epsilon,freq}(\varphi)(\tau, \nu) = \psi(\tau\nu) \Sigma_n \psi(\tau\nu_r n) \varphi(f + n\nu_r)$ |
| | N-Zak to Zak | $\mathcal{Z}_{\epsilon,\epsilon'}(\varphi)(\tau, \nu) = \varphi_0(\tau, \nu)$ |
| | Zak to N-Zak | $\mathcal{Z}_{\epsilon',\epsilon}(\varphi)_i(\tau, \nu) = \psi(-\nu \cdot i/N) \varphi(\tau + i/N, \nu)$ |
| | Z-std window | $P_{std}(\tau, \nu) = \Sigma_n \psi(\nu\tau_r n) 1_{(n,n+1)}(\tau/\tau_r)$ | where the Q abbreviate Quasi and Z abbreviate Zak.

B1. Mathematical Preliminaries
B1.1 the Delay Doppler Plane

Let $V=\mathbb{R}^2$ be the delay Doppler plane equipped with the standard symplectic bilinear form $\omega:V\times V\to\mathbb{R}$ given by:

$$\omega(v_1,v_2)=v_1\tau_2-\tau_1 v_2, \quad (1.1)$$

for every $v_1=(\tau_1,v_1)$ and $v_2=(\tau_2,v_2)$. Another way to express $\omega$ is to arrange the vectors $v_1$ and $v_2$ as the columns of a 2×2 matrix. The symplectic pairing to $(v_1,v_2)$ is equal the additive inverse of the determinant of this matrix, i.e.:

$$\omega(v_1, v_2) = -\det\begin{bmatrix} | & | \\ v_1 & v_2 \\ | & | \end{bmatrix}.$$

We note that the symplectic form is anti-symmetric, i.e., $\omega(v_1,v_2)=-\omega(v_2,v_1)$ thus, in particular $\omega(v,v)=0$ for every $v\in V$. In addition, we consider the polarization form $\beta:V\times V\to\mathbb{R}$ given by:

$$\beta(v_1,v_2)=v_1\tau_2, \quad (1.2)$$

for every $v_1=(\tau_1,v_1)$ and $v_2=(\tau_2,v_2)$. We have that:

$$\beta(v_1,v_2)-\beta(v_2,v_1)=\omega(v_1,v_2), \quad (1.3)$$

The form $\beta$ should be thought of as "half" of the symplectic form. Finally, we denote by $\psi(z)=\exp(2iz)$ is the standard one-dimensional Fourier exponent.

B1.2 Delay Doppler Lattices
Refer to Section A2.1 above.

B1.3 the Heisenberg Group

The polarization form $\beta:V\times V\to\mathbb{R}$ gives rise to a two-step unipotent group called the Heisenberg group. As a set, the Heisenberg group is realized as Heis=$V\times S^1$ where the multiplication rule is given by:

$$\beta(v_1,z_1)\cdot(v_2,z_2)=(v_1+v_2,\psi(\beta(v_1,v_2))z_1 z_2), \quad (1.11)$$

One can verify that indeed the rule (1.11) induces a group structure, i.e., it is associative, the element (0, 1) acts as unit and the inverse of $(v,z)$ is $(-v,\psi(\beta(v,v))z^{-1})$. We note that the Heisenberg group is not commutative, i.e., $\tilde{v}_1\cdot\tilde{v}_2$ is not necessarily equal to $\tilde{v}_2\cdot\tilde{v}_1$. The center of the group consists of all elements of the form $(0,z)$, $z\in S^1$. The multiplication rule gives rise to a group convolution operation between functions:

$$f_1 \circledast f_2(\tilde{v}) = \int_{\tilde{v}_1\cdot\tilde{v}_2=\tilde{v}} f_1(\tilde{v}_1)f_2(\tilde{v}_2), \quad (1.12)$$

for every pair of functions $f_1, f_2\in\mathbb{C}$ (Heis). We refer to the convolution operation $\circledast$ as Heisenberg convolution or twisted convolution.

The Heisenberg group admits multitude of finite subquotient groups. Each such group is associated with a choice of a pair $(\Lambda, \epsilon)$ where $\Lambda\subset V$ is an under-sampled lattice and $\epsilon:\Lambda\to S^1$ is a map satisfying the following condition:

$$\epsilon(\lambda_1+\lambda_2)=\epsilon(\lambda_1)\epsilon(\lambda_2)\psi(\beta(\lambda_1,\lambda_2)), \quad (1.13)$$

Using $\epsilon$ we define a section map $\hat{\epsilon}:\Lambda\to$Heis given by $\hat{\epsilon}(\lambda)=(\lambda,\epsilon(\lambda))$. One can verify that (1.13) implies that $\hat{\epsilon}$ is a group homomorphism, that is $\hat{\epsilon}(\lambda_1+\lambda_2)=\hat{\epsilon}(\lambda_1)\cdot\hat{\epsilon}(\lambda_2)$. To summarize, the map $\epsilon$ defines a sectional homomorphic embedding of $\Lambda$ as a subgroup of the Heisenberg group. We refer to $\epsilon$ as a Heisenberg character and to the pair $(\Lambda,\epsilon)$ as a Heisenberg lattice. A simple example is when the lattice $\Lambda$ is rectangular, i.e., $\Lambda=\Lambda_\tau$. In this situation $\beta|\Lambda=0$ thus we can take $\epsilon=1$, corresponding to the trivial embedding $\hat{\epsilon}(\lambda)=(\lambda,1)$. A more complicated example is the hexagonal lattice $\Lambda=\Lambda_{hex}$ equipped with $\epsilon_{hex}:\Lambda_{hex}\to S^1$, given by:

$$\epsilon_{hex}(ng_1+mg_2)=\psi(m^2/4), \quad (1.14)$$

for every $n,m\in\mathbb{Z}$. An Heisenberg lattice defines a commutative subgroup $\lambda_\epsilon\subset$Heis consisting of all elements of the form $(\lambda,\epsilon(\lambda)),\lambda\in\Lambda$. The centralizer subgroup of Im$\hat{\epsilon}$ is the subgroup $\Lambda^\perp\times S^1$. We define the finite subqotient group:

$$\text{Heis}(\Lambda,\epsilon)=\Lambda^\perp\times S^1/\text{Im}\hat{\epsilon}, \quad (1.15)$$

The group Heis $(\lambda,\epsilon)$ is a central extension of the finite commutative group $\Lambda^\perp/\Lambda$ by the unit circle $S^1$, that is, it fits in the following exact sequence:

$$S^1\text{Heis}(\Lambda,\epsilon)\to\Lambda^\perp/\Lambda, \quad (1.16)$$

We refer to Heis $(\Lambda,\epsilon)$ as the finite Heisenberg group associated with the Heisenberg lattice $(\Lambda,\epsilon)$. The finite Heisenberg group takes a more concrete from in the rectangular case. Specifically, when $\Lambda=\Lambda_\tau$ and $\epsilon=1$, we have Heis $(\Lambda,1)=\Lambda^\perp/\Lambda\times S^1\simeq\mathbb{Z}/N\times\mathbb{Z}/N\times S^1$ with multiplication rule given by:

$$(k_1,l_1,z_1)\cdot(k_2,l_2,z_2)=(k_1+k_2,l_1+l_2,\psi(l_1k_2/N)z_1z_2), \quad (1.17)$$

B1.4 the Heisenberg Representation

The representation theory of the Heisenberg group is relatively simple. In a nutshell, fixing the action of the center, there is a unique (up-to isomorphism) irreducible representation. This uniqueness is referred to as the Stone-von Neumann property. The precise statement is summarized in Section A1.3:

The fact that $\pi$ is a representation, aka multiplicative, translates to the fact that $\Pi$ interchanges between group convolution of functions and composition of linear transformations, i.e., $\Pi(f_1 \circledast f_2)=\Pi(f_1)\circ\Pi(f_2)$. Since $\pi(0,z)=z\text{Id}_\mathcal{H}$, by Fourier theory, its enough to consider only functions $f$ that satisfy the condition $f(v, z)=z^{-1}f(v,1)$. Identifying such functions with their restriction to $V=V\times\{1\}$ we can write the group convolution in the form:

$$f_1 \circledast f_2(v) = \int_{v_1+v_2=v} \psi(\beta(v_1, v_2))f_1(v_1)f_2(v_2), \quad (1.19)$$

Interestingly, the representation $\pi$, although is unique, admits multitude of realizations. Particularly well known are the time and frequency realizations which are omnipresent in signal processing. We consider the Hilbert space of complex valued functions on the real line $\mathcal{H}=\mathbb{C}(\mathbb{R})$. To describe them, we introduce two basic unitary operations on such functions—one called delay and the other modulation, defined as follows:

$$\text{Delay}: L_x(\varphi)(y)=\varphi(y-x), \quad (1.20)$$

$$\text{Modulation}: M_x(\varphi)(y)=\psi(xy)\varphi(y), \quad (1.21)$$

for any value of the parameter $x\in\mathbb{R}$ and every function $\varphi\in\mathcal{H}$. Given a point $v=(\tau,v)$ we define the time realization of the Heisenberg representation by:

$$\pi^{time}(v,z)\triangleright \varphi=z\cdot L_\tau\circ M_v(\varphi) \quad (1.22)$$

where we use the notation $\triangleright$ to designate the application of an operator on a vector. It is accustom in this context to denote the basic coordinate function by t (time). Under this convention, the right hand side of (1.22) takes the explicit form $z\psi(\nu(t-\tau))\varphi(t-\tau)$. Reciprocally, we define the frequency realization of the Heisenberg representation by:

$$\pi^{freq}(\nu, z) \triangleright \varphi = z \cdot M_{-\tau} \circ L_\nu(\varphi), \qquad (1.23)$$

In this context, it is accustom to denote the basic coordinate function by $f$ (frequency). Under this convention, the right hand side of (1.23) takes the explicit form $z\psi(-\tau f)\varphi(f-\nu)$. By Theorem 1.1, the time and frequency realizations are isomorphic. The isomorphism is given by the Fourier transform:

$$FT(\varphi)(f) = \int_t \exp(-2\pi i f t) \varphi(t) dt, \qquad (1.24)$$

for every $\varphi \in \mathcal{H}$. As an intertwining transform FT interchanges between the two Heisenberg operators $\pi_t(\nu,z)$ and $\pi_f(\nu,z)$, i.e.:

$$FT \circ \pi^{time}(\nu,z) = \pi^{freq}(\nu,z) \circ FT, \qquad (1.25)$$

for every $(\nu, z)$. From the point of view of representation theory the characteristic property of the Fourier transform is the interchanging equation (1.25). Finally, we note that from communication theory perspective, the time domain realization is adapted to modulation techniques where QAM symbols are arranged along a regular lattice of the time domain. Reciprocally, the frequency realization is adapted to modulation techniques (line OFDM) where QAM symbols are arranged along a regular lattice on the frequency domain. We will see in the sequel that there exists other, more exotic, realizations of the signal space which give rise to a family of completely new modulation techniques which we call ZDMA.

The finite Heisenberg representation. It is nice to observe that the theory of the Heisenberg group carry over word for word to the finite set-up. In particular, given an Heisenberg lattice $(\Lambda,\epsilon)$, the associated finite Heisenberg group Heis $(\Lambda,\epsilon)$ admits a unique up to isomorphism irreducible representation after fixing the action of the center. This is summarized in the following theorem.

Theorem 1.2 (Finite dimensional Stone-von Neumann theorem). There is a unique (up to isomorphism) irreducible unitary representation $\pi_\epsilon$: Heis $(\Lambda,\epsilon) \to U(\mathcal{H})$ such that $\pi_\epsilon(0,z) = z \text{Id}_\mathcal{H}$. Moreover $\pi_\epsilon$ is finite dimensional with dim $\mathcal{H} = N$ where $N^2 = \#\Lambda^\perp/\Lambda$.

For the sake of simplicity, we focus our attention on the particular case where $\Lambda = \mathbb{Z}(\tau_\tau, 0) \oplus \mathbb{Z}(0, \nu_\tau)$ is rectangular and $\epsilon = 1$ and proceed to describe the finite dimensional counterparts of the time and frequency realizations of $\pi_\epsilon$. To this end, we consider the finite dimensional Hilbert space $\mathcal{H}_N = \mathbb{C}(\mathcal{Z}_t/N)$ of complex valued functions on the ring $\mathbb{Z}/N$, aka—the finite line. Vectors in $\mathcal{H}_N$ can be viewed of as uniformly sampled functions on the unit circle. As in the continuous case, we introduce the operations of (cyclic) delay and modulation:

$$L_n(\varphi)(m) = \varphi(m-n), \qquad (1.26)$$

$$M_n(\varphi)(m) = \psi(nm/N)\varphi(m), \qquad (1.27)$$

for every $\varphi \in \mathcal{H}_N$ and $n \in \mathbb{Z}/N$ noting that the operation m-n is carried in the cyclic ring $\mathbb{Z}/N$. Given a point $(k/\nu_\tau, l/\tau_\tau, z) \in \Lambda^\perp$ we define the finite time realization by:

$$\pi_\epsilon^{time}(k/\nu_\tau, l/\tau_\tau, z) \triangleright \varphi = z \cdot L_k \circ M_l(\varphi) \qquad (1.28)$$

Denoting the basic coordinate function by n we can write the right hand side of (1.28) in the explicit form $z\psi(l(n-k)/N)\varphi(n-k)$. Reciprocally, we define the finite frequency realization by:

$$\pi_\epsilon^{freq}(k/\nu_\tau, l/\tau_\tau, z) \triangleright \varphi = z \cdot M_{-k} \circ L_l(\varphi), \qquad (1.29)$$

Denoting the basic coordinate function by m the right hand side of (1.29) can be written in the explicit form $z\psi(-km/N)\varphi(m-l)$. By Theorem 1.2, the discrete time and frequency realizations are isomorphic and the isomorphism is realized by the finite Fourier transform:

$$FFT(\varphi)(m) = \sum_{n=0}^{N-1} \exp(-2\pi i m n/N) \varphi(n), \qquad (1.30)$$

As an intertwining transform the FFT interchanges between the two Heisenberg operators $\pi_\epsilon^{time}(\nu,z)$ and $\pi_\epsilon^{freq}(\nu,z)$, i.e.:

$$FFT \circ \pi_\epsilon^{time}(\nu,z) = \pi_\epsilon^{freq}(\nu,z) \circ FFT, \qquad (1.31)$$

for every $(\nu,z) \in \text{Heis}(\Lambda,\epsilon)$.

B2. The Zak Realization

B2.1 Zak Waveforms

See previous discussion in A2.2. In this section we describe a family of realizations of the Heisenberg representation that simultaneously combine attributes of both time and frequency. These are known in the literature as Zak type or lattice type realizations. A particular Zak realization is parametrized by a choice of an Heisenberg lattice $(\Lambda, \epsilon)$ where $\Lambda$ is critically sampled. A Zak waveform is a function $\varphi: V \to \mathbb{C}$ that satisfies the following quasi periodicity condition:

$$\varphi(\nu+\lambda) = \epsilon(\lambda)\psi(\beta(\nu,\lambda))\varphi(\nu) \qquad (2.1)$$

There is an alternative formulation of condition (2.1) that is better suited when considering generalizations. The basic observation is that the map E defines a one dimensional representation $\pi_\epsilon: \Lambda \times S^1 \to (U(\mathbb{C})$ satisfying the extra condition that $\pi_\epsilon(0,z) = z$. This representation is given by $\pi_\epsilon(\lambda, z) = \epsilon(\lambda)^{-1} z$. Indeed, verify that:

$$\begin{aligned}\pi_\epsilon(\lambda_1, z_1) \cdot \pi_\epsilon(\lambda_2, z_2) &= \epsilon(\lambda_1)^{-1} \epsilon(\lambda_2)^{-1} z_1 z_2 \qquad (2.2)\\ &= \epsilon(\lambda_1 + \lambda_2)^{-1} \psi(\beta(\lambda_1, \lambda_2)) z_1 z_2 \\ &= \pi_\epsilon((\lambda_1, z_1) \cdot (\lambda_2, z_2)),\end{aligned}$$

In addition, we have that $\pi_\epsilon(\lambda,\epsilon(\lambda)) = 1$ implying the relation $\text{Im}\hat{\epsilon} \subset \ker \pi_\epsilon$. Hence $\pi_\epsilon$ is in fact a representation of the finite Heisenberg group Heis $(\Lambda,\epsilon) = \Lambda \times S^1/\text{Im}\hat{\epsilon}$. Using the representation $\pi\epsilon$, we can express (2.1) in the form:

$$\varphi(\nu+\lambda) = \psi(\beta(\nu,\lambda))\{\pi_\epsilon(\lambda)^{-1} \triangleright \varphi(\nu)\}, \qquad (2.3)$$

We denote the Hilbert space of Zak waveforms by $\mathcal{H}(V, \pi_\epsilon)$ or sometimes for short by $0.15 \mathcal{H}_\epsilon$. For example, in the rectangular situation where $\Lambda = \Lambda_\tau$ and $\epsilon = 1$, condition (2.1) takes the concrete form $\varphi(\tau+k\tau_\tau, \nu+l\nu_\tau) = \psi(\nu k\tau_\tau)\varphi(\tau,\nu)$, that is, $\varphi$ is periodic function along the Doppler dimension (with period $\nu_\tau$) and quasi-periodic function along the delay dimension. Next, we describe the action of the Heisenberg group on the Hilbert space of Zak waveforms. Given a Zak waveform $\varphi \in \mathcal{H}_\epsilon$, and an element $(u,z) \in \text{Heis}$, the action of the element on the waveform is given by:

$$\{\pi^\epsilon(u,z) \triangleright \varphi\}(\nu) = z \cdot \psi(\beta(u, \nu-u))\varphi(\nu-u), \qquad (2.4)$$

In addition, given a lattice point $\lambda \in \Lambda$, the action of the element $\hat{\epsilon}(\lambda)=(\lambda,\epsilon(\lambda))$ takes the simple form:

$$\{\pi^\epsilon(\lambda, \epsilon(\lambda)) \triangleright \varphi\}(v) = \epsilon(\lambda)\psi(\beta(\lambda, v - \lambda))\varphi(v - \lambda) \quad (2.5)$$
$$= \epsilon(\lambda)\epsilon(-\lambda)\psi(\beta(\lambda, -\lambda))\psi(\omega(\lambda, v))\varphi(v)$$
$$= \psi(\omega(\lambda, v))\varphi(v),$$

where in the first equality we use (2.4), in the second equality we use (2.1) and the polarization equation (1.3) and in the third equality we use (1.13). To conclude, we see that $\pi^\epsilon(\hat{\epsilon}(\lambda))$ is given by multiplication with the symplectic Fourier exponent associated with the point $\lambda$. As usual, the representation gives rise to an extended action by functions on V. Given a function $h \in \mathbb{C}(V)$, its action on a Zak waveform $$\{\Pi^\epsilon(h) \triangleright \varphi\}(v) = \int_{u \in V} h(u)\{\pi^\epsilon(u) \triangleright \varphi\}(v)du \quad (2.6)$$
$$= \int_{u \in V} \psi(\beta(u, v - u))h(u)\varphi(v - u)du,$$

From the last expression we conclude that $\Pi^\epsilon(h) \triangleright \varphi = h \circledast \varphi$, namely, the extended action is realized by twisted convolution of the impulse h with the waveform $\varphi$.

B2.2 Zak Transforms

See also section A2.4. By Theorem 1.1, the Zak realization is isomorphic both to the time and frequency realizations. Hence there are intertwining transforms interchanging between the corresponding Heisenberg group actions. These intertwining transforms are usually referred to in the literature as the time/frequency Zak transforms and we denote them by:

$$\mathcal{Z}_{time,\epsilon}: \mathcal{H}_\epsilon \to \mathcal{H}_{time} = \mathbb{C}(t \in \mathbb{R}), \quad (2.7)$$

$$\mathcal{Z}_{freq,\epsilon}: \mathcal{H}_\epsilon \to \mathcal{H}_{freq} = \mathbb{C}(f \in \mathbb{R}), \quad (2.8)$$

As it turns out, the time/frequency Zak transforms are basically geometric projections along the reciprocal dimensions, see FIG. 2. Formally, this assertion is true only when the maximal rectangular sublattice $\Lambda_r = \mathbb{Z}(\tau_r, 0) \oplus \mathbb{Z}(0, \nu_r)$ is non-trivial, i.e., when the rectangular parameters $\tau_r, \nu_r < \infty$. Assuming this condition holds, let $N = \tau_r \cdot \nu_r$ denote the index of the rectangular sublattice $\Lambda_r$ with respect to the full lattice $\Lambda$, i.e., $N = [\Lambda_r : \Lambda]$. For example, when $\Lambda = \Lambda_{rec}$ we have $\tau_r = \nu_r = 1$ and $N = 1$. When $\Lambda = \Lambda_{hex}$, we have $\tau_r = a$ and $\nu_r = 2/a$ and consequently $N = 2$. Without loss of generality, we assume that $\epsilon|\Lambda_r = 1$.

Granting this assumption, we have the following formulas:

$$\mathcal{Z}_{time,\epsilon}(\varphi)(t) = \int_0^{\nu_r} \varphi(t, v)dv, \quad (2.9)$$

$$\mathcal{Z}_{freq,\epsilon}(\varphi)(f) = \int_0^{\tau_r} \psi(-f\tau)\varphi(\tau, f)d\tau, \quad (2.10)$$

We now proceed describe the intertwining transforms in the opposite direction, which we denote by:

$$\mathcal{Z}_{\epsilon,time}: \mathcal{H}_{time} \to \mathcal{H}_\epsilon, \quad (2.11)$$

$$\mathcal{Z}_{\epsilon,freq}: \mathcal{H}_{freq} \to \mathcal{H}_\epsilon, \quad (2.12)$$

To describe these we need to introduce some terminology. Let $\pi_r^{time}$ and $b^{freq}$ denote the time and frequency realizations of the Heisenberg representation of the group Heis $(\Lambda_r, 1)$ $b^{time}$, $b^{freq} \in \mathbb{C}^N$ are the unique (up to multiplication by scalar) invariant vectors under the action of $\Lambda_\epsilon$ through $\pi_r^{time}$ and $\pi_r^{freq}$ respectively. The formulas of (2.11) and (2.12) are:

$$\mathcal{Z}_{\epsilon,time}(\varphi)(\tau, v) = \quad (2.13)$$
$$\sum_{k=0}^{N-1} \sum_{n \in \mathbb{Z}} b^{time}[k]\psi(-v\tau_r(k/N + n))\varphi(\tau + \tau_r(k/N + n)),$$

$$\mathcal{Z}_{\epsilon,freq}(\varphi)(\tau, v) = \quad (2.14)$$
$$\psi(\tau v)\sum_{k=0}^{N-1} \sum_{n \in \mathbb{Z}} b^{freq}[k]\psi(\tau\nu_r(k/N + n))\varphi(v + \nu_r(k/N + n)),$$

In the rectangular situation where $\Lambda = \Lambda_r$, and $\epsilon = 1$, we have $N = 1$ and $b^{time} = b^{freq} = 1$. Substituting these values in (2.13) and (2.14) we get:

$$\mathcal{Z}_{\epsilon,time}(\varphi)(\tau, v) = \sum_{n \in \mathbb{Z}} \psi(-v\tau_r n)\varphi(\tau + n\tau_r), \quad (2.15)$$

$$\mathcal{Z}_{\epsilon,freq}(\varphi)(\tau, v) = \psi(\tau v)\sum_{n \in \mathbb{Z}} \psi(\tau\nu_r n)\varphi(v + n\nu_r), \quad (2.16)$$

In addition, in the hexagonal situation where $\Lambda = \Lambda_{hex}$ and $\epsilon = \epsilon_{hex}$, we have $N = 2$, $\tau_r = a$, $\nu_r = 2a^{-1}$ and $b^{time} = (1, i)$, $b^{freq} = (1, -i)$. Substituting these values in (2.11) and (2.12) we get:

$$\mathcal{Z}_{\epsilon,time}(\varphi)(\tau, v) = \sum_{n \in \mathbb{Z}} \psi(-van)\varphi(\tau + an) + \quad (2.17)$$
$$i\sum_{n \in \mathbb{Z}} \psi(-va(1/2 + n))\varphi(\tau + a(1/2 + n)),$$

$$\mathcal{Z}_{\epsilon,freq}(\varphi)(\tau, v) = \psi(\tau v)\sum_{n \in \mathbb{Z}} \psi(2\tau a^{-1} n)\varphi(v + 2a^{-1}n) - \quad (2.18)$$
$$i\psi(\tau v)\sum_{n \in \mathbb{Z}} \psi(2\tau a^{-1}(n + 1/2))\varphi(v + 2a^{-1}(n + 1/2))$$

Figure 8:
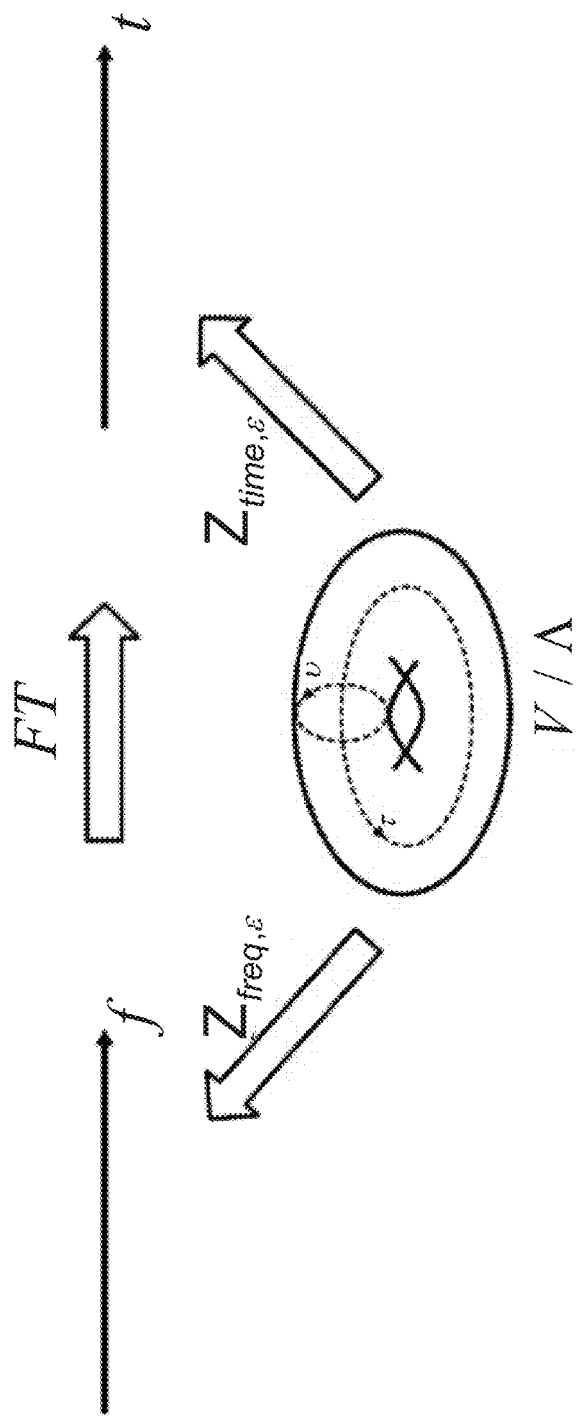
FIG. 8 pictorially depicts an example in which the Zak domain and the time/frequency Zak transforms realizing the signal space realization lying in between time and frequency realizations.
Figure 9:
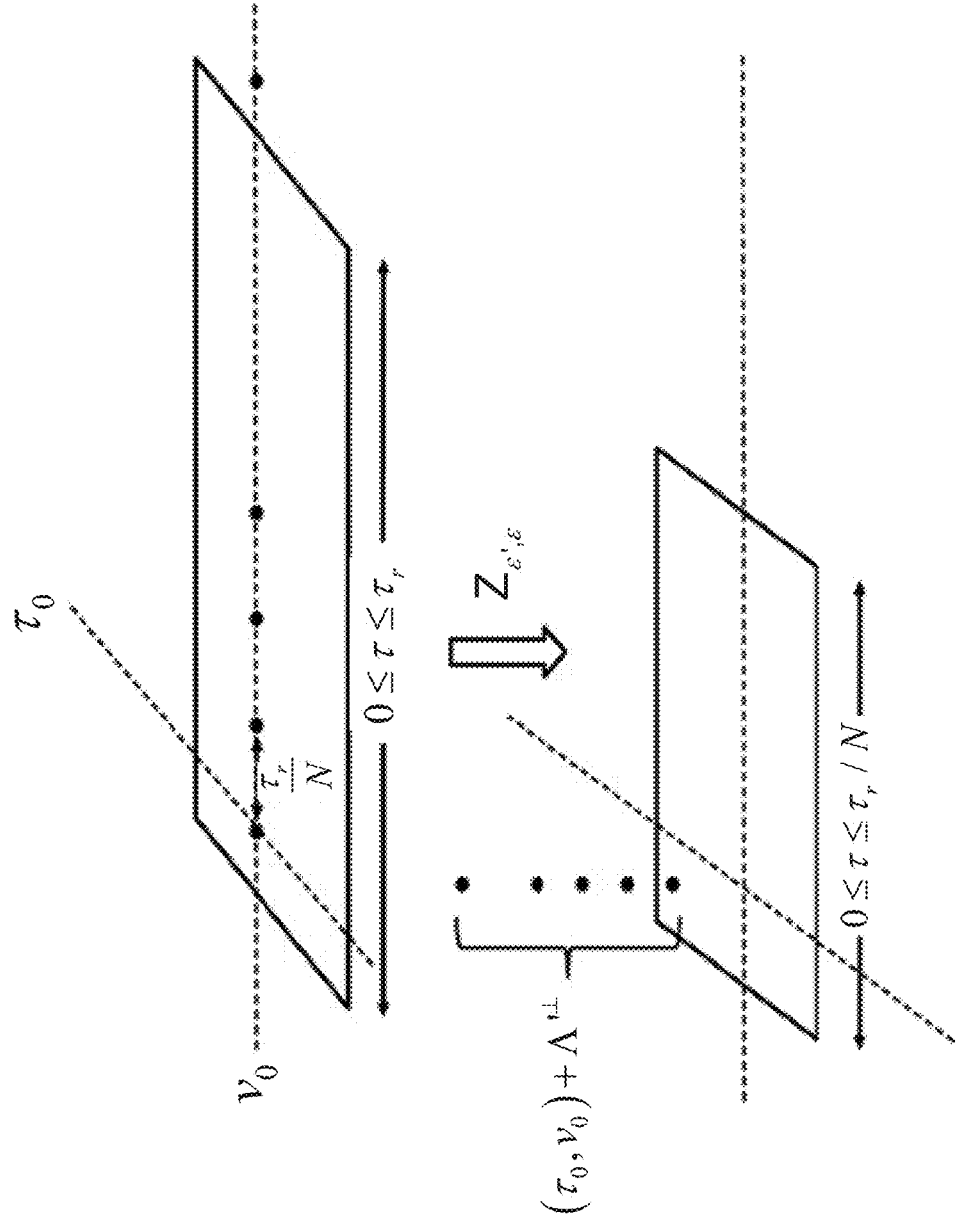
FIG. 9 shows a depiction of the Zak to generalized Zak interwining transformation.
Figure 10:
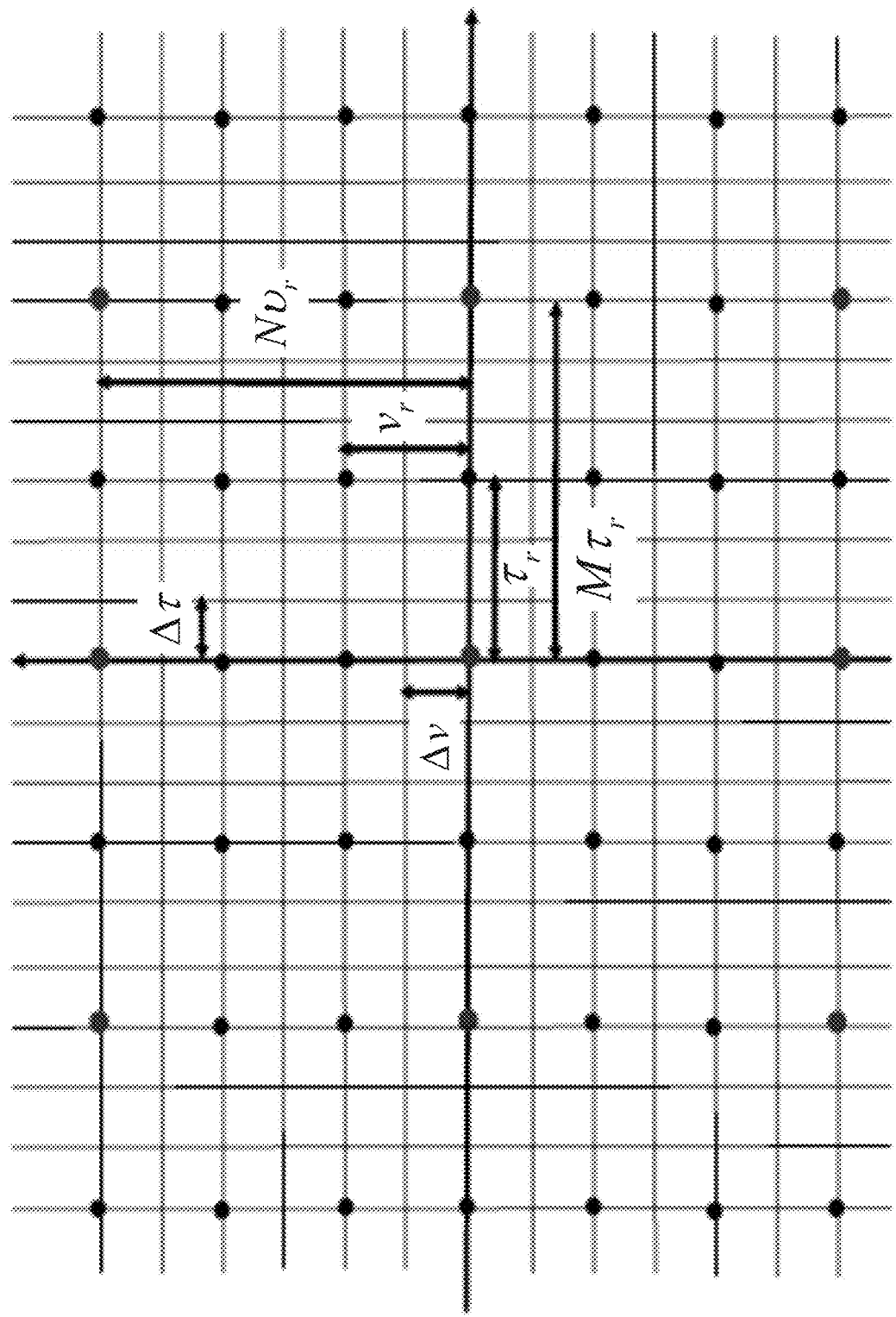
FIG. 10 shows an example of a nested system of lattices with N=3 and M=2.
Figure 11:
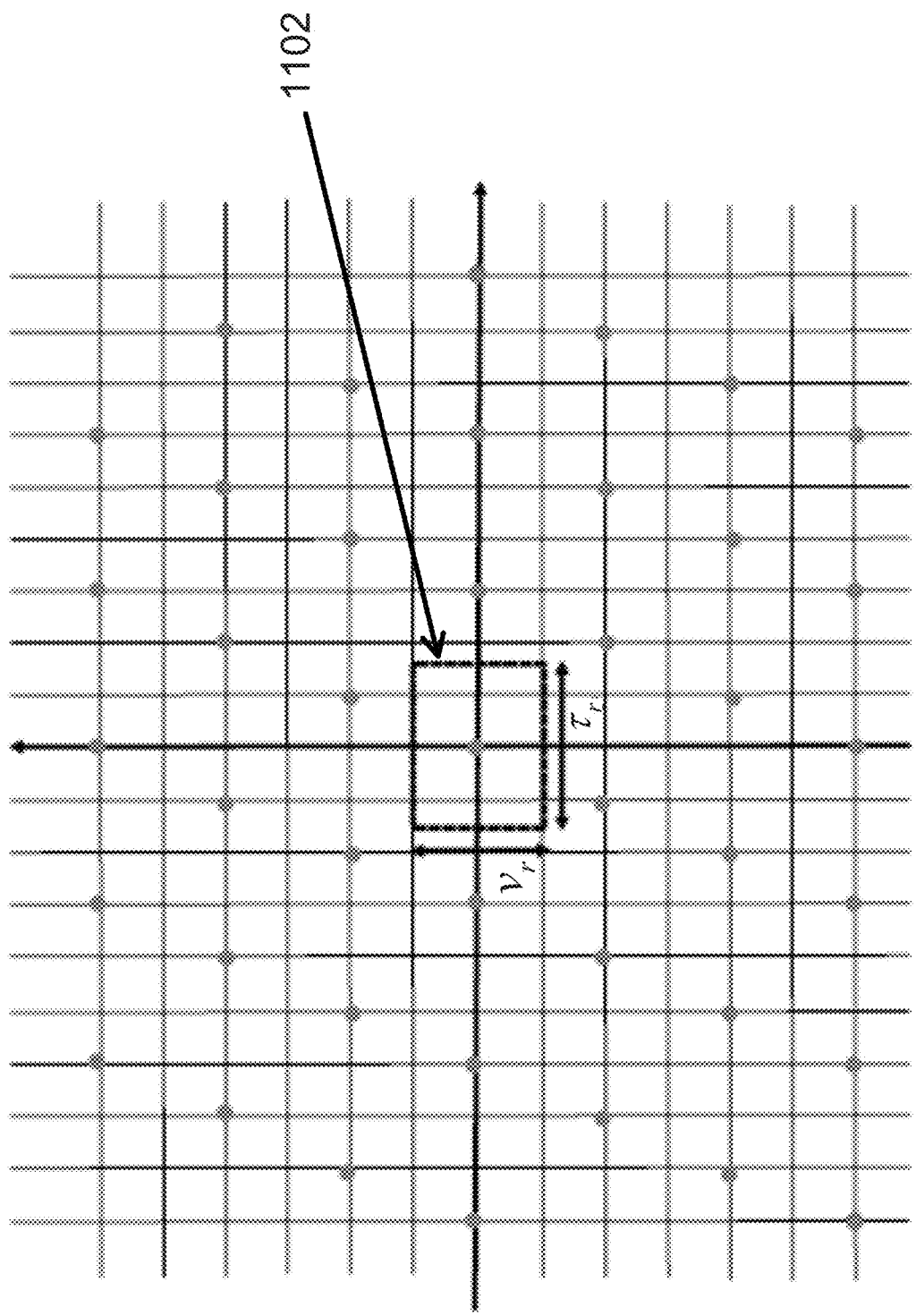
FIG. 11 is a graphical depiction of an example of a chirp lattice corresponding to N=3, M=2, a=1. The dashed square designated clear region around zero.
Figure 12:
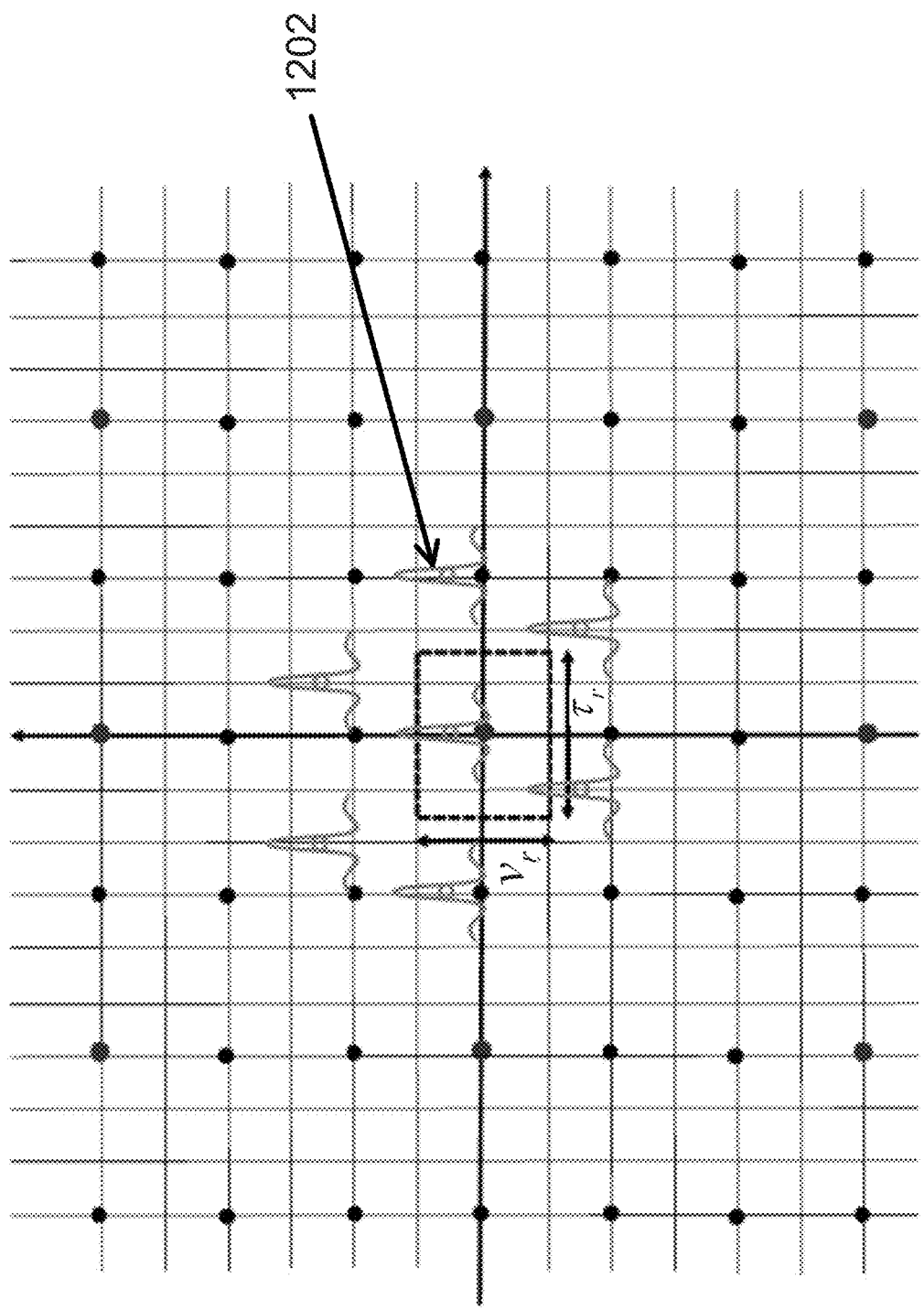
FIG. 12 is a depiction of an example of an ambiguity function of a continuous Zak chirp corresponding to slope a=1.

Furthermore, one can show that $\mathcal{Z}_{time,\epsilon} \circ \mathcal{Z}_{\epsilon,freq} \propto \text{FT}$ hence the pair of Zak transforms constitute a square root decomposition of the Fourier transform, reinforcing the interpretation of the Zak realization as residing between the time and the frequency (see FIG. 8). As mentioned before, the characteristic property of the Zak transform is that it interchanges between the Heisenberg group actions:

Proposition 2.1. We have:

$$\mathcal{Z}_{time,\epsilon}(\pi^\epsilon(v,z) \triangleright \varphi) = \pi^{time}(v,z) \triangleright \mathcal{Z}_{time,\epsilon}(\varphi), \quad (2.19)$$

$$\mathcal{Z}_{freq,\epsilon}(\pi^\epsilon(v,z) \triangleright \varphi) = \pi^{freq}(v,z) \triangleright \mathcal{Z}_{freq,\epsilon}(\varphi), \quad (2.20)$$

for every $\varphi \in \mathcal{H}_\epsilon$ and $(v,z) \in \text{Heis}$.

Example 2.2. As an example we consider the rectangular lattice $\Lambda_r = \mathbb{Z}(\tau_r, 0) \oplus \mathbb{Z}(0, 1/\tau_r)$ and the trivial Heisenberg character $\epsilon = 1$. Under these choices, we describe the Zak realization of the window function:

$$p(t) = \begin{cases} 1 & 0 \le t < \tau_r \\ 0 & \text{otherwise} \end{cases}, \quad (2.21)$$

This function is typically used as the generator filter in multi-carrier modulations (without CP). A direct application of formula (2.15) reveals that $P = \mathcal{Z}_{\epsilon,time}(p)$ is given by:

$$P(\tau, \nu) = \sum_{n \in \mathbb{Z}} \psi(\nu n \tau_r) p(\tau - n \tau_r), \quad (2.22)$$

One can show that $P(a\tau_\tau, b/\tau_\tau) = 1$ for every $a, b \in [0,1)$, which means that it is of constant modulo 1 with phase given by a regular step function along $\tau$ with constant step given by the Doppler coordinate $\nu$. Note the discontinuity of P as it jumps in phase at every integer point along delay. This phase discontinuity is the Zak domain manifestation of the discontinuity of the rectangular window p at the boundaries.

B3. The Generalized Zak Realization

For various computational reasons that arise in the context of channel equalization we need to extend the scope and consider also higher dimensional generalizations of the standard scalar Zak realization. Specifically, a generalized Zak realization is a parametrized by an under-sampled Heisenberg lattice $(\Lambda, \epsilon)$. Given this choice, we fix the following structures:

Let Heis$(\Lambda, \epsilon) = \Lambda^\perp \times S^1 / \Lambda_\epsilon$, be the finite Heisenberg group associated with $(\Lambda, \epsilon)$, see Formula (1.15). Let $N^2 = [\Lambda : \Lambda^\perp]$ be the index of $\Lambda$ inside $\Lambda^\perp$. Finally, let $\pi_\epsilon$ be the finite dimensional Heisenberg representation of Heis $(\Lambda, \epsilon)$. At this point we are not interested in any specific realization of the representation $\pi_\epsilon$.

A generalized Zak waveform is a vector valued function $\varphi: V \to \mathbb{C}^N$ that satisfy the following $\pi_\epsilon$ quasi-periodicity condition:

$$\varphi(\nu + \lambda) = \psi(\beta(\nu, \lambda)) \{\pi_\epsilon(\lambda)^{-1} \triangleright \varphi(\nu)\}, \quad (3.1)$$

for every $\nu \in V$ and $\lambda \in \Lambda^\perp$. Observe that when the lattice $\Lambda$ is critically sampled, we have N=1 and condition (3.1) reduces to (2.3). In the rectangular situation where $\Lambda = \Lambda_\tau$, $\epsilon = 1$ we can take $\pi_\epsilon = \pi_\epsilon^{time}$, thus the quasi-periodicity condition (3.1) takes the explicit form:

$$\varphi(\tau + k/\nu_\tau, \nu + l/\tau_\tau) = \psi(\nu k/\nu_\tau) \{\psi(kl/N) M_{-l} L_{-l^P} \varphi(\tau, \nu)\}, \quad (3.2)$$

where we substitute $\nu = (\tau, \nu)$ and $\lambda = (k/\nu_\tau, l/\tau_\tau)$. In particular, we see from (3.2) that the nth coordinate of $\varphi$ satisfies the following condition along Doppler:

$$\varphi_n(\tau, \nu + l/\tau_\tau) = \psi(-nl/N)\varphi_n(\tau, \nu), \quad (3.3)$$

for every $(\tau, \nu) \in V$ and $l \in \mathbb{Z}$. We denote by $\mathcal{H}_\epsilon = \mathcal{H}(V, \pi_\epsilon)$ the Hilbert space of generalized Zak waveforms. We now proceed to define the action of Heisenberg group on $\mathcal{H}_\epsilon$. The action formula is similar to (2.4) and is given by:

$$\{\pi^\epsilon(\nu, z) \triangleright \varphi\}(\nu') = z \cdot \psi(\beta(\nu, \nu' - \nu))\varphi(\nu' - \nu), \quad (3.4)$$

for every $\varphi \in \mathcal{H}_\epsilon$ and $(\nu, z) \in$ Heis. Similarly, we have $\{\pi^\epsilon(\lambda, \epsilon(\lambda)) \triangleright \varphi\}(\nu) = \psi(\varphi(\lambda, \nu))\varphi(\nu)$, for every $\lambda \in \Lambda$.

3.1 Zak to Zak Intertwining Transforms

The standard and the generalized Zak realizations of the Heisenberg representation are isomorphic in the sense that there exists a non-zero intertwining transform commuting between the corresponding Heisenberg actions. To describe it, we consider the following setup. We fix a critically sampled Heisenberg lattice $(\Lambda, \epsilon)$ and a sub-lattice $\Lambda' \subset \Lambda$ of index N. We denote by $\epsilon'$ the restriction of $\epsilon$ to the sub-lattice $\Lambda'$. Our goal is to describe the intertwining transforms (See FIG. 9):

$$\mathcal{Z}_{\epsilon,\epsilon'}: \mathcal{H}_\epsilon \to \mathcal{H}_{\epsilon'}, \quad (3.5)$$

$$\mathcal{Z}_{\epsilon',\epsilon}: \mathcal{H}_\epsilon \to \mathcal{H}_{\epsilon'}, \quad (3.6)$$

We begin with the description of $\mathcal{Z}_{\epsilon,\epsilon'}$. Let $\zeta \in \mathbb{C}^N$ be the unique (up-to multiplication by scalar) invariant vector under the action of the subgroup $V^\epsilon = \hat{\epsilon}(V) \subset$ Heis $(\Lambda', \epsilon')$ through the representation $\pi_{\epsilon'}$, namely, $\zeta$ satisfies the condition:

$$\pi_{\epsilon'}(\lambda, \epsilon(\lambda)) \triangleright \zeta = \zeta,$$

for every $\lambda \in \Lambda$. Given a generalized Zak waveform $\varphi \in \mathcal{H}_{\epsilon'}$, the transformed waveform $\mathcal{Z}_{\epsilon,\epsilon'}(\varphi)$ is given by:

$$\mathcal{Z}_{\epsilon,\epsilon'}(\varphi)(\nu) = \langle \zeta, \varphi(\nu) \rangle, \quad (3.7)$$

for every $\nu \in V$. In words, the transformed waveform is defined pointwise by taking the inner product with the invariant vector $\zeta$. We proceed with the description of $\mathcal{Z}_{\epsilon',\epsilon}$. To this end, we define the Hilbert space of sampled Zak waveforms. A sampled Zak waveform is a function $\phi: \Lambda'^\perp \to \mathbb{C}$ satisfying the following discrete version of the quasi-periodicity condition (2.3):

$$\phi(\delta + \lambda) = \psi(\beta(\delta, \lambda))\pi_\epsilon(\lambda)^{-1} \triangleright \phi(\delta), \quad (3.8)$$

for every $\delta \in \Lambda'^\perp$ and $\lambda \in \Lambda$. We denote the Hilbert space of sampled Zak waveforms by $\mathcal{H}(\Lambda'^\perp, \pi_\epsilon)$. One can show that $\mathcal{H}(\Lambda'^\perp, \pi_\epsilon)$ is a finite dimensional vector space of dimension $[\Lambda : \Lambda'^\perp] = [\Lambda' : \Lambda] = N$. The Hilbert space of sampled Zak waveforms admits an action of the finite Heisenberg group Heis $(\Lambda', \epsilon')$. This action is a discrete version of 2.4) given by:

$$\{\pi_\epsilon(\delta, z) \triangleright \phi\}(\delta') = z\psi(\beta(\delta, \delta' - \delta))\phi(\delta' - \delta), \quad (3.9)$$

for every $\phi \in \mathcal{H}(\Lambda'^\perp, \pi_\epsilon)$, and points $\delta, \delta' \in \Lambda'^\perp$. We can now define the intertwining transform $\mathcal{Z}_{\epsilon',\epsilon}$. Given a Zak waveform $\varphi \in \mathcal{H}_\epsilon$ the transformed generalized waveform $\varphi' = \mathcal{Z}_{\epsilon',\epsilon}(\varphi)$ is a function on V taking values in the N dimensional Hilbert space $\mathcal{H}(\Lambda'^\perp, \pi_\epsilon) \simeq \mathbb{C}^N$, defined by:

$$\varphi'(\nu)(\delta) = \psi(-\beta(\nu, \delta))\varphi(\nu + \delta), \quad (3.10)$$

for every $\nu \in V$ and $\delta \in \Lambda'^\perp$. For the sake of concreteness, it is beneficial to describe in detail the rectangular situation. We consider a rectangular lattice $\Lambda = \Lambda_\tau$ with trivial embedding $\epsilon = 1$ and the sublattice $\Lambda' = \mathbb{Z}(\tau_\tau, 0) \oplus \mathbb{Z}(0, N\nu_\tau)$. Evidently, we have $[\Lambda' : \Lambda] = N$. For these particular choices, the structures described above take the following concrete form:

The finite Heisenberg group associated with $(\Lambda, \epsilon)$ is given by:

$$\text{Heis}(\Lambda, \epsilon) = \Lambda^\perp / \Lambda \times S^1 \simeq S^1,$$

The finite Heisenberg representation of Heis $(\Lambda, \epsilon)$, is given by:

$$\pi_\epsilon(z) = z,$$

The orthogonal complement lattice of $\Lambda'$ is given by:

$$\Lambda'^\perp = \mathbb{Z}(\tau_\tau/N, 0) \oplus \mathbb{Z}(0, \nu_\tau),$$

The finite Heisenberg group associated with $(\Lambda', \epsilon')$ is given by:

$$\text{Heis}(\Lambda', \epsilon') = \Lambda'^\perp / \Lambda \times S^1 \simeq \mathbb{Z}/N \times \mathbb{Z}/N \times S^1,$$

The finite Heisenberg representation of Heis $(\Lambda', \epsilon')$, is given by $\pi_{\epsilon'} = \pi_{\epsilon'}^{time}$, where:

$$\pi_{\epsilon'}^{time}(k\tau_\tau/N, l\nu_\tau, z) = zL_k M_l,$$

The invariant vector under $\pi_\epsilon(\lambda, \epsilon'(\lambda)) = \pi_\epsilon(\lambda, \epsilon'(\lambda))$, $\lambda \in \Lambda$ is given by:

$$\zeta = \delta(0),$$

Substituting in Formula (3.7), we get:

$$\mathcal{Z}_{\epsilon,\epsilon'}(\varphi)(v) = \langle \delta(0), \varphi(v) \rangle \qquad (3.11)$$

$$= \varphi_0(v)$$

In words, the conversion from generalized to standard Zak waveforms is "simply" to take the zero coordinate at each point $v \in V$. In the opposite direction, given a Zak waveform $\varphi \in \mathcal{H}(V, \pi_\epsilon)$ its restriction to the lattice $\Lambda'^\perp$ is periodic with respect to translations by elements of $\Lambda$, hence is a function on the quotient group $\Lambda'^\perp/\Lambda = \mathbb{Z}/N$, i.e., a vector in $\mathbb{C}(\mathbb{Z}/N)$. Substituting in Formula (3.10), we get that:

$$\mathcal{Z}_{\epsilon',\epsilon}(\varphi)(\tau, v) = \begin{bmatrix} \psi(-v\tau_r, 0/N)\varphi(\tau, v) \\ \psi(-v\tau_r/N)\varphi(\tau+\tau_r/N, v) \\ \vdots \\ \psi(-v\tau_r(1-1/N))\varphi(\tau+\tau_r(1-1/N), v) \end{bmatrix},$$

for every $\varphi \in \mathcal{H}(V, \pi_\epsilon)$ and $(\tau, v) \in V$.

B4. ZDMA Transceiver Embodiments

In this section we describe the structure of the ZDMA transceiver incorporating the Zak realization formalism. In addition, we describe a weaker version that can be implemented as a preprocessing step over multi-carrier modulation.

B4.1 Transceiver Parameters

The ZDMA transceiver structure is based on the following parameters:

(1) An Heisenberg critically sampled lattice $(\Lambda, \epsilon)$ giving rise to the Hilbert space of Zak waveforms $\mathcal{H}(V, \pi_\epsilon)$.
(2) A transmit and receive filter functions $w_{tx}, w_{rx} \in \mathbb{C}(V)$.
(3) A non-degenerate pulse waveform $\varphi \in \mathcal{H}(V, \pi_\epsilon)$ satisfying $P(v) \neq 0$ for every $v \in V$.

The transmit function $w_{tx}$ is a function on the delay Doppler plane that plays the role of a two dimensional filter, shaping the transmitted signal to a specific bandwidth and specific time duration. The receive function $w_{rx}$ is principally the matched filter to $w_{tx}$. We will assume, henceforth that it is defined as $w_{rx} = w_{tx}^\star$:

$$w_{rx}(v) = w_{tx}^\star(v) \qquad (4.1)$$

$$= \psi(-\beta(v, v))\overline{w_{tx}(-v)},$$

for every $v \in V$. In addition, we assume that the function $w = w_{tx}$ can be decomposed as a twisted/Heisenberg convolution $w = w_\tau \circledast w_v$ where $w_\tau$ is a one dimensional function supported on the delay axis and $w_v$ is one dimensional function supported on the Doppler axis. One can verify that:

$$w(\tau, v) = w_\tau(\tau) w_v(v), \qquad (4.2)$$

for every $(\tau, v) \in \mathbb{R}^2 = V$. The benefit in considering such decomposable filters is that most of their attributes can be expressed in terms of simple analysis of the two factors. In particular, in this situation the received matched function is given by $w_{rx}^\star = w_v^\star \circledast w_\tau^\star$ where $w_\tau^\star$ and $w_v^\star$ are the respected one dimensional conjugate functions familiar from standard signal processing, i.e.:

$$w_\tau^\star(\tau) = \overline{w_\tau(-\tau)}, \qquad (4.3)$$

$$w_v^\star(v) = \overline{w_v(-v)}, \qquad (4.4)$$

for every $\tau \in \mathbb{R}$ and $v \in \mathbb{R}$ respectively. In typical situation, we require the one dimensional filter $w_\tau$ to be a square root Nyquist with respect to a bandwidth B>0, i.e., $w_\tau^\star \ast w_\tau(k/B) = 0$ for every non-zero integer k, and, reciprocally, we require the one dimensional filter $w_v$ to be square root Nyquist with respect to a duration T>0, i.e., $w_v^\star \ast w_v(l/T) \neq 0$ for every non-zero integer l. To proceed further we need to choose a basis of the lattice $\Lambda$:

$$\Lambda = \mathbb{Z}g_1 \oplus \mathbb{Z}g_2, \qquad (4.5)$$

Granting such a choice we can define the pulse P to be the unique quasi-periodic function that satisfy $P(ag_1 + bg_2)$ for every $0 \leq a, b \leq 1$. Note that when the lattice is rectangular and the basis is the standard one, such pulse is described in Example 2.2. Before describing the transceiver structure we need to explain how to encode the information bits. These are encoded into a periodic function $x \in \mathbb{C}(V)$ with respect to the lattice $\Lambda$. In typical situations we assume that x is a sampled $\Lambda$-periodic function of the form:

$$x = \sum_{n,m} x[n, m] \delta(ng_1/N + mg_2/M), \qquad (4.6)$$

where $N, M \in \mathbb{N}^{\geq 1}$ are fixed parameters defining the density of the delay Doppler information lattice $\Lambda_{N,M} = \mathbb{Z}g_1/N \oplus \mathbb{Z}g_2/M$. In more canonical terms, x is a function on the information lattice $\Lambda_{N,M}$ that is periodic with respect to the sub-lattice $\Lambda \subset \Lambda_{N,M}$. The expression for x is particularly simple when the lattice is rectangular. In this case it takes the form:

$$x = \sum_{n,m} x[n, m] \delta(n\tau_r/N) \delta(mv_r/M), \qquad (4.7)$$

B4.2 Transceiver Structure

Having specified the underlying structures and parameters we are now ready to describe the ZDMA modulation and de-modulation transforms. Given a periodic function $x \in \mathbb{C}(V/\Lambda)$ encoding the information bits, we define the modulated waveform $\varphi_{tx} = \mathcal{M}(x)$ through the rule:

$$\mathcal{M}(x) = \mathcal{Z}_{time,\epsilon}(\Pi^\epsilon(w_{tx}) \triangleright (x \cdot P)) \qquad (4.8)$$

$$= \mathcal{Z}_{time,\epsilon}(w_{tx} \circledast (x \cdot P))$$

where $\mathcal{Z}_{time,\epsilon}$ is the Zak transform converting between Zak and time domain waveforms, see (2.7). In words, the modulation first transforms the information function into a Zak waveform through multiplication by multiplication with P. Next, it shapes the bandwidth and duration of the waveform through twisted convolution with the two dimensional filter w. Last, it transforms the tamed Zak waveform into a time domain waveform through application of the Zak transform. To get a better understanding of the structure of the transmit waveform and the actual effect of two dimensional filtering we apply several algebraic manipulations to get more concrete expressions. First, we note that $\mathcal{Z}_{time,\epsilon}$ is an intertwining transform thus obeying the relation:

$$\mathcal{Z}_{time,\epsilon}(\Pi^\epsilon(w_{tx}) \triangleright (x \cdot P)) = \Pi^{time}(w_{tx}) \triangleright \mathcal{Z}_{time,\epsilon}(x \cdot P), \qquad (4.9)$$

Second, assuming $w_{tx} = w_\tau \circledast w_v$, we can write $\Pi^{time}(w_\tau \circledast w_v)$ as the composition time $\Pi^{time}(w_\tau) \circ \Pi^{time}$ ($w_\nu$), thus expressing the two dimensional filtering operation as cascade of two consecutive one dimensional operations:

$$\mathcal{M}(x) = \Pi^{time}(w_\tau \circledS w_\nu) \triangleright \mathcal{Z}_{time,\epsilon}(x \cdot P) \quad (4.10)$$

$$= \Pi_{time}(w_\tau) \triangleright \Pi^{time}(w_\nu) \triangleright \mathcal{Z}_{time,\epsilon}(x \cdot P)$$

$$= w_\tau * \{W_t \cdot \mathcal{Z}_{time,\epsilon}(x \cdot P)\},$$

where * stands for linear convolution on $\mathbb{R}$ and $W_t = FT^{-1}(w_\nu)$. We refer to the waveform $\mathcal{Z}_{time,\epsilon}(x \cdot P)$ as the bare ZDMA waveform. We see from Formula (4.10) that the transmit waveform is obtained from the bare waveform by applying the time window $W_t$ followed by a convolution with the pulse $w_\tau$. In addition, one can verify that when x is sampled on the lattice $\Lambda_{N,M} \subset V$, see (4.6), the bare waveform is an infinite delta pulse train along the lattice:

$$\Lambda_{N,M}^{time} = \{n/Ng_1[1] + m/Mg_2[1]: n,m \in \mathbb{Z}\}, \quad (4.11)$$

where the lattice $\Lambda_{N,M}^{time}$ is the projection of the lattice $\Lambda_{N,M}$ on the delay axis. The projected lattice takes a particularly simple form when $\Lambda = \Lambda_\tau$ is rectangular. In this case we have:

$$\Lambda_{N,M}^{time} = \mathbb{Z}\tau_r/N, \quad (4.12)$$

We now proceed to describe the de-modulation mapping. Given a received waveform $\varphi_{rx}$ we define its de-modulated image $y = \mathcal{D}(\varphi_{rx})$ through the rule:

$$\mathcal{D}(\varphi_{rx}) = \Pi^\epsilon(w_{rx}) \triangleright \mathcal{Z}_{\epsilon,time}(\varphi_{rx}), \quad (4.13)$$

We stress the fact that y is a Zak waveform (to be distinguished from a periodic function). We often incorporate as part of the de-modulation mapping another step of sampling y on the lattice $\Lambda_{N,M}$, thus obtaining a sampled Zak waveform $y_s \in \mathcal{H}(\Lambda_{N,M}, \pi_\epsilon)$ which is a function on $\Lambda_{N,M}$ satisfying the quasi periodicity condition:

$$y_s(\delta + \lambda) = \psi(\beta(\delta, \lambda))\pi_\epsilon(\lambda)^{-1} \triangleright y_s(\delta), \quad (4.14)$$

To conclude, assuming $x = x_s \in \mathcal{C}(\Lambda_{N,M}/\Lambda)$ is a sampled periodic function, the ZDMA transceiver chain converts it into a sampled Zak waveform $y_s \in \mathcal{H}(\Lambda_{N,M}, \pi_\epsilon)$. Overall, the composition transform $\mathcal{D} \circ \mathcal{M}$ is a linear transformation:

$$\mathcal{D} \circ \mathcal{M}: \mathcal{C}(\Lambda_{N,M}/\Lambda) \to \mathcal{H}(\Lambda_{N,M}, \pi_\epsilon), \quad (4.15)$$

taking sampled periodic functions to sampled Zak waveforms. In particular, we have that both the domain and range of $\mathcal{D} \circ \mathcal{M}$ are finite dimensional vector spaces of dimension N·M. In the next subsection we will analyze in more detail the exact relation between the input variable x and the output variable y.

B4.3 Input Output Relation

We first assume the channel between the transmitter and receiver is trivial. Furthermore, we assume the received filter is matched to the transmit filter, i.e., $w_{rx} = w_{tx}^\star$. For simplicity we denote $w = w_{tx}$ and assume w is decomposable, i.e., $w = w_\tau \circledS w_\nu$. At this stage we do not assume anything about the specific structure of the one dimensional filters $w_\tau$ and $w_\nu$. Given an input function $X \in \mathcal{C}(V/\Lambda)$, a direct computation reveals that $y = \mathcal{D} \circ \mathcal{M}(x)$ is given by:

$$y = \Pi^\epsilon(w^\star) \triangleright \Pi^\epsilon(w) \triangleright (x \cdot P) \quad (4.16)$$

$$= \Pi^\epsilon(w^\star \circledS w) \triangleright (x \cdot P)$$

$$= (w^\star \circledS w) \circledS (x \cdot P),$$

So we see that y is given by the twisted convolution of $x \cdot P$ by the auto-correlation filter $w^\star \circledS w$. Our goal is to calculate an explicit formula for $w^\star \circledS w$. First we note that since $w^\star = w_\nu^\star \circledS w_\tau^\star$, we can write:

$$w^\star \otimes w = w_\nu^\star \circledS w_\tau^\star \circledS w_\tau \circledS w_\nu \quad (4.17)$$

$$= w_\nu^\star \circledS w_\tau^{(2)} \circledS w_\nu,$$

where $w_\tau^{(2)} = w_\tau^\star \circledS w_\tau = w_\tau^\star * w_\tau$ is the one dimensional auto-correlation function of the delay filter $w_\tau$. In addition, since $w_\tau^{(2)}$ is supported on the $\tau$ axis and $w_\nu^\star$ is supported on $\nu$ axis, we have the following simple relation:

$$w_\nu^\star \circledS w_\tau^{(2)}(\tau, \nu) = w_\tau^{(2)}(\tau) \circledS \psi(\tau\nu) w_\nu^\star(\nu) \quad (4.18)$$

$$= w_\tau^{(2)}(\tau) \circledS M_\tau[w_\nu^\star](\nu),$$

Thus, for any given point $(\tau, \nu)$, we can write $w^\star \circledS w(\tau, \nu)$ in the form:

$$w^\star \circledS w(\tau,\nu) = w_\tau^{(2)}(\tau) \otimes \tilde{w}_\nu^{(2)}(\nu), \quad (4.19)$$

where $\tilde{w}_\nu^{(2)} = M_\tau[w_\nu^\star] \circledS w_\nu$. We note that the definition of $\tilde{w}_\nu^{(2)}$ depends on the point $\tau$ which is not apparent from the notation we use. Formula (4.19) is always true and is pivotal to get approximations of $w^\star \circledS w$ under various assumptions on the filters $w_\tau$ and $w_\nu$. The case of interest for us is when $w_\tau$ and $w_\nu$ are square root Nyquist with respect to a bandwidth B and a duration $T \in \mathbb{R}^{\geq 0}$ respectively and, in addition, $B \cdot T \gg 1$. In this case we can approximate $\tilde{w}_\nu^\star(\nu) = \psi(\tau\nu)w_\nu^\star(\nu) \sim w_\nu^\star(\nu)$, thus $\tilde{w}_\nu^{(2)} \sim w_\nu^{(2)}$, which in turns imply that:

$$w^\star \circledS w \sim w_\tau^{(2)} \circledS w_\nu^{(2)}, \quad (4.20)$$

In particular, in the rectangular situation where $\Lambda = \Lambda_\tau$, $B = N\nu_\tau$ and $T = M\tau_r$ such that $NM \gg 1$, placing the QAM symbols on the lattice $\Lambda_{N,M} = \mathbb{Z}(\tau_r/N, 0) \oplus \mathbb{Z}(0, \nu_\tau/M)$ yields:

$$y = \Pi^\epsilon(w^\star \circledS w) \triangleright (x \cdot P) \quad (4.21)$$

$$\sim x \cdot P,$$

thus allowing perfect reconstruction without equalization when the channel is AWGN. Next, we describe the input-output relation in the presence of a non-trivial channel $H = \Pi^{time}(h)$ where $h = h(\tau, \nu)$ is the delay Doppler impulse response. For the sake of the analysis, it is sufficient to assume that h is a single reflector, i.e., $h(\tau, \nu) = \delta(\tau - \tau_0, \nu - \nu_0) = \delta(\tau - \tau_0) \circledS \delta(\nu - \nu_0)$. In the following computation we use the short notations $\delta\tau_0 = \delta(\tau - \tau_0)$ and $\delta\nu_0 = \delta(\nu - \nu_0)$ Given an input $x \in \mathcal{C}(V/\Lambda)$, a direct computation reveals that the transmit-receive image $y = \mathcal{D} \circ H \circ \mathcal{M}(x)$ is given by:

$$y = \Pi^\epsilon(w^\star \circledS h \circledS w) \triangleright (x \cdot P), \quad (4.22)$$

Our goal is to calculate an explicit formula for $w^\star \circledast h \circledast w$. To do that, we first write:

$$w^\star \circledast h \circledast w = w_v^\star \circledast w_\tau^\star \circledast \delta_{\tau_0} \circledast \delta_{v_0} \circledast w_\tau \circledast w_v \quad (4.23)$$

$$= w_v^\star \circledast L_{\tau_0}[w_\tau^\star] \circledast M_{v_0}[w_\tau] \circledast L_{v_0}[w_v]$$

$$= w_v^\star \circledast L_{\tau_0}[\tilde{w}_\tau^{(2)}] \circledast L_{v_0}[w_v],$$

where $\tilde{w}_\tau^{(2)} = w_\tau^\star \circledast M_{v_0}[w_\tau]$. In addition, we have:

$$w_v^\star \circledast L_{\tau_0}[\tilde{w}_\tau^{(2)}](\tau, v) = L_{\tau_0}[\tilde{w}_\tau^{(2)}](\tau) \otimes \psi(\tau v) w_v^\star(v) \quad (4.24)$$

$$= L_{\tau_0}[\tilde{w}_\tau^{(2)}](\tau) \otimes M_\tau[w_v^\star](v),$$

Hence, overall we can write:

$$w^\star \circledast h \circledast w(\tau,v) = L_{\tau_0}[\tilde{w}_\tau^{(2)}](\tau) \otimes L_{v_0}[\tilde{w}_v^{(2)}](v), \quad (4.25)$$

where $\tilde{w}_v^{(2)} = M_\tau[w_v^\star] \circledast w_v$. If we assume that $w_\tau$ and $w_v$ are Nyquist with respect to a bandwidth B and a duration T respectively, and, in addition have $B \cdot T \gg 1$ and $v_0 \ll B$ then we can approximate $\tilde{w}_\tau^{(2)} \sim w_\tau^{(2)}$ and $\tilde{w}_v^{(2)} \sim w_v^{(2)}$, which, in turns, imply:

$$w^\star \circledast h \circledast w = h * w_\tau^{(2)} * w_v^{(2)}, \quad (4.26)$$

B4.4 Channel Acquisition

Looking back at the input output relation $y = h_w \circledast (x \cdot P)$ where $h_w = w^\star \circledast h \circledast w$, we proceed to derive a simple acquisition scheme of the filtered channel impulse response $h_w$. To this end, we fix a point $v_0 \in V$ and consider the standard pulse structure $P(a g_1 + b g_2) = 1$ for $0 \le a, b \le 1$. Given these choices, we define the pilot structure as the Zak waveform $\varphi$.

B4.5 Weak ZDMA

In this subsection, we describe a weak variant of the ZDMA transceiver that can be architected as a pre-processing layer over multi-carrier transceiver. We refer to this transceiver as w-ZDMA. The definition of the w-ZDMA transceiver depends on similar parameters as the ZDMA transceiver we described before however, with few additional assumptions. First assumption is that the transmit and receive filters are periodic with period $\Lambda$, i.e., $w_{tx}, w_{rx} \in \mathbb{C}(V/\Lambda)$. in other words, $w_{tx/rx} = SF(W_{tx/rx})$ where $w_{tx}, w_{rx} \in \mathbb{C}(V/\Lambda)$ are discrete window functions and SF is the symplectic Fourier transform. The support of the window $W_{tx}$ determines the bandwidth and duration of the transmission packet. Typically, we take the receive filter to be matched $W_{rx} = \overline{W}_{tx}$ or, equivalently, that $w_{rx} = w_{tx}^\star$. Another assumption is that the generator signal $P \in \mathcal{H}(V, \pi_\epsilon)$ satisfy the orthogonality condition:

$$P \cdot \overline{P} = 1, \quad (4.27)$$

We note that condition (4.27) is equivalent to Gabor orthogonality condition of the waveform $p = \mathcal{Z}_{time,\epsilon}(P)$ with respect to the Heisenberg lattice $\text{Im}\, \hat{\epsilon} = \{(\lambda, \epsilon(\lambda)) : \lambda \in \Lambda\}$. To see this, let $\lambda \in \Lambda$ and consider the inner product $\langle p, \pi^{time}(\lambda, \epsilon(\lambda)) \triangleright p \rangle$.

Now write:

$$\langle p, \pi^{time}(\lambda, \epsilon(\lambda)) \triangleright p \rangle = \langle \mathcal{Z}_{time,\epsilon}(P), \pi^{time}(\lambda, \epsilon(\lambda)) \triangleright \mathcal{Z}_{time,\epsilon}(P) \rangle \quad (4.28)$$

$$= \langle \mathcal{Z}_{time,\epsilon}(P), \mathcal{Z}_{time,\epsilon}(\pi^\epsilon(\lambda, \epsilon(\lambda)) \triangleright P) \rangle_t$$

-continued $$= \int_{V/\Lambda} \overline{P}(v) \{\pi^\epsilon(\lambda, \epsilon(\lambda)) \triangleright P\}(v) dv$$

$$= \int_{V/\Lambda} \psi(\omega(\lambda, v)) \overline{P}(v) P(v) dv$$

$$= \int_{V/\Lambda} \psi(\omega(\lambda, v)) \cdot 1 \, dv$$

$$= \begin{cases} 1 & \lambda = 0 \\ 0 & \lambda \ne 0 \end{cases},$$

where in the second equality we use the fact $\mathcal{Z}_{time,\epsilon}$ is an intertwining transform and in the fourth equality we use (2.5). Given an input function $x \in \mathbb{C}(V/\Lambda)$ encoding the information bits, we shape the band and duration of the transmitted waveform through periodic convolution with $w_{tx}$, i.e., $x \mapsto w_{tx} \circledast x$. Overall, the signal x is modulated according to the following rule:

$$\mathcal{M}(x) = \mathcal{Z}_{time,\epsilon}((w_{tx} * x) \cdot P), \quad (4.29)$$

It is illuminating to compare Formula (4.29) with Formula (4.8). One observes that the main difference is in the way the shaping filter is applied where in ZDMA it is applied through the operation of twisted convolution $x \mapsto w_{tx} \circledast (x \cdot P)$ and in w-ZDMA through the operation of periodic convolution $x \mapsto (w_{tx} * x) \cdot P$. We next explain how the modulation rule (4.29) can be expressed as a layer over multi-carrier modulation scheme. To this end, let us write $w * x$ in the form $w * x = SF(W \cdot X)$ where $x = SF(X)$, that is:

$$w * x(v) = \sum_{\lambda \in \Lambda} \psi(-\omega(v, \lambda)) W(\lambda) \cdot X(\lambda), \quad (4.30)$$

For every $v \in V$. Hence:

$$\mathcal{Z}_{time,\epsilon}((w * x) \cdot P) = \sum_{\lambda \in \Lambda} W(\lambda) \cdot X(\lambda) \mathcal{Z}_{time,\epsilon}(\psi(-\omega(v, \lambda)) P) \quad (4.31)$$

$$= \sum_{\lambda \in \Lambda} W(\lambda) \cdot X(\lambda) \mathcal{Z}_{time,\epsilon}(\psi(\omega(v, \lambda)) P)$$

$$= \sum_{\lambda \in \Lambda} W(\lambda) \cdot X(\lambda) \mathcal{Z}_{time,\epsilon}(\pi^\epsilon(\lambda, \epsilon(\lambda)) \triangleright P)$$

$$= \sum_{\lambda \in \Lambda} W(\lambda) \cdot X(\lambda) \pi^{time}(\lambda, \epsilon(\lambda)) \triangleright \mathcal{Z}_{time,\epsilon}(P)$$

$$= \sum_{\lambda \in \Lambda} W(\lambda) \cdot X(\lambda) \pi^{time}(\lambda, \epsilon(\lambda)) \triangleright p$$

$$= \Pi^{time}(\hat{\epsilon}_{pf}(W \cdot SF(x))) \triangleright p,$$

In case the Heisenberg character $\epsilon = 1$, e.g., when $\Lambda = \Lambda_\tau$ is rectangular, the modulation formula becomes $\mathcal{M}(x) = \Pi^{time}(W \cdot SF(x)) \triangleright p$. We now proceed to describe the de-modulation rule implemented at the receiver side. Given a time domain waveform $\varphi_{rx}$, the receiver demodulates it according to the following formula:

$$\mathcal{D}(\varphi_{rx}) = \mathcal{Z}_{\epsilon,time}(\varphi_{rx}) \cdot \overline{P}, \quad (4.32)$$

Observe that when the channel is identity, due to the orthogonality condition (4.27), we obtain perfect reconstruction after composing modulation and demodulation:

$$\mathcal{D} \circ \mathcal{M}(x) = x \cdot P\overline{P} \quad (4.33)$$
$$= x \cdot 1$$
$$= x,$$

We further note that the orthogonality condition is not essential for achieving perfect reconstruction. In fact, one needs to impose is that P is non-degenerate, that is, that $P\overline{P}$ is nowhere vanishing. For non-degenerate P one can reconstruct the input x as:

$$x = \mathcal{D} \circ \mathcal{M}(x)/P\overline{P},$$

The use of general non-degenerate generator functions give rise to non-orthogonal variants of the w-ZDMA transceiver. For a non-trivial channel transformation of the form $H = \pi^{time}(v_0)$ where $v_0 = (\tau_0, v_0)$ we get:

$$y = \mathcal{D} \circ H \circ \mathcal{M}(x) = \mathcal{D}(\pi^{time}(v_0) \triangleright \mathcal{M}(x)) \quad (4.34)$$
$$= \mathcal{Z}_{c,time}(\pi^{time}(v_0) \triangleright \mathcal{M}(x)) \cdot \overline{P}$$
$$= \{\pi^c(v_0) \triangleright \mathcal{Z}_{c,time}(\mathcal{M}(x))\} \cdot \overline{P}$$
$$= \{\pi^c(v_0) \triangleright x \cdot P\}\overline{P},$$

where the second equality is the definition of $\mathcal{D}$, the third equality is the intertwining property of the Zak transform and the last equality is the definition of $\mathcal{M}$. Finally, let $v = (\tau, v)$ where $0 \leq \tau, v < 1$ and evaluate y at $v$:

$$y(v) = \psi(-\beta(v_0, v_0))\psi(\beta(v_0, v))x(v - v_0)P(v - v_0)\overline{P}(v) \quad (4.35)$$

Assuming $v_0$ is small compared to the lattice dimensions and that P is a continuous function we get the approximation (The continuity assumption of G does not always hold, for example in the most common case when $G = \mathcal{Z}(1_{[0,T]})$—the case of the standard window function.)

$$y(v) \simeq x(v - v_0)P(v)\overline{P}(v) \quad (4.36)$$
$$= x(v - v_0),$$

where for the approximation we used the fact that $\psi(\beta(v_0,v))$, $\psi(-\beta(v_0,v_0)) \simeq 1$ and that $P(v - v_0) \simeq P(v)$ by continuity. Note that when P corresponds to the standard window (see Example 2.2) the approximation (4.36) is no longer valid since P is not continuous at the boundaries of the fundamental cell.

C0. Introduction to Radar Waveform Design in the Zak Realization

In the subsequent sections, a general systematic method for radar waveform design that is based on the Zak representation of discrete sequences and continuous signals (aka waveforms) is described. Along the way we develop the theory of sampling and filtering using the formalism of the Heisenberg group. We conclude with an example of a particular family of compressed radar waveforms based on discrete Zak sequences. These waveforms enjoy uniform temporal power profile and thumb-tack like ambiguity function with a clean punctured region around the origin whose dimensions are free parameters.

C1. Set-Up for Radar Waveform Design

Let $V = \mathbb{R}^2$ be the delay Doppler plane equipped with the standard symplectic form $\omega$:

$$\omega(v_1, v_2) = v_1 \tau_2 - v_2 \tau_1,$$

for every $v_1 = (\tau_1, v_1)$ and $v_2 = (\tau_2, v_2)$. Let $\beta$ be the polarization form:

$$\beta(v_1, v_2) = v_1 \tau_2.$$

Using the form $\beta$ we introduce a binary operation between functions on V called twisted convolution. To simplify notations, we denote by $\psi(z) = \exp(j2\pi z)$ the standard Fourier exponent. Given a pair of functions $h_1, h_2 \in \mathbb{C}(V)$, we define their twisted convolution to be:

$$h_1 *_\sigma h_2(v) = \int_{v_1 + v_2 = v} \psi(\beta(v_1, v_2)) h_1(v_1) h_2(v_2),$$

We fix a critically sampled lattice $\Lambda_1 \subset V$. We assume $\Lambda_1$ is rectangular of the form:

$$\Lambda_1 = \mathbb{Z}\tau_r \oplus \mathbb{Z}v_r,$$

such that $\tau_r \cdot v_r = 1$. We fix a rectangular super-lattice $\Lambda \supset \Lambda_1$ of the form:

$$\Lambda = \mathbb{Z}\Delta\tau \oplus \mathbb{Z}\Delta v,$$

where $\Delta\tau = \tau_r/N$ and $\Delta v = v_r/M$. We denote by $L = [\Lambda : \Lambda_1]$ the index of $\Lambda_1$ as a sub-lattice of $\Lambda$. It is easy to verify that $L = N \cdot M$. This number also counts the number of points in the finite quotient group $\Lambda/\Lambda_1$. In addition, we denote by $\Lambda^\perp$ the symplectic orthogonal complement of $\Lambda$ defined by:

$$\Lambda^\perp = \{v \in V : \omega(v, \lambda) \in \mathbb{Z} \text{ for every } \lambda \in \Lambda\},$$

We have $\Lambda^\perp \subset \Lambda_1$. Overall, we defined a nested family of lattices (see FIG. 10):

$$\Lambda^\perp \subset \Lambda_1 \subset \Lambda,$$

We note that $[\Lambda : \Lambda^\perp] = L^2$ or, equivalently, the number of points in the quotient group $\Lambda/\Lambda^\perp$ is equal to $L^2$. Finally, we introduce a discrete variant of the twisted convolution operation between functions on the lattice $\Lambda$. Given a pair of functions $h_1, h_2 \in \mathbb{C}(\Lambda)$, we define their twisted convolution to be:

$$h_1 *_\sigma h_2(\lambda) = \sum_{\lambda_1 + \lambda_2 = \lambda} \psi(\beta(\lambda_1, \lambda_2)) h_1(\lambda_1) h_2(\lambda_2).$$

C2. Continuous Zak Signals

In classical signal processing there are two fundamental domains of signal realizations: the time domain and the frequency domain. Each of these domains reveals complementary attributes and the conversion between these two realizations is carried through the Fourier transform. As it turns out, there is another fundamental domain called the Zak domain. A continuous Zak signal is a function $\Phi : V \to \mathbb{C}$ that satisfies the quasi-periodicity condition:

$$\Phi(v + \lambda_1) = \psi(\beta(v, \lambda_1))\Phi(v),$$

for every $v \in V$ and $\lambda_1 \in \Lambda_1$, Concretely, if we take $v = (\tau, v)$ and $\lambda_1 = (k\tau_r, lv_r)$ then condition (2.1) takes the form:

$$\Phi(\tau + k\tau_r, v + lv_r) = \psi(kv\tau_r)\Phi(\tau, v),$$

Given a pair of Zak signals $\Phi_1, \Phi_2 \in \mathcal{H}$ we define their inner product as:

$$\langle \Phi_1, \Phi_2 \rangle = \int_{V/\Lambda_1} \overline{\Phi_1(v)} \cdot \Phi_2(v) dv,$$

We denote the Hilbert space of continuous Zak signals by $\mathcal{H} = \mathbb{C}(V/\Lambda_1, \beta)$. We equip $\mathcal{H}$ with an Heisenberg action defined by the operator valued transform $\Pi: \mathbb{C}(V) \to \text{End}(\mathcal{H})$ defined by:

$$\Pi(h) \triangleright \Phi = h *_\sigma \Phi,$$

for every $\Phi \in \mathcal{H}$ and $h \in \mathbb{C}(V)$. We refer to $\Pi$ as the Heisenberg transform. The Heisenberg transform admits an inverse called the Wigner transform. Given a pair of Zak signals $\Phi_1, \Phi_2 \in \mathcal{H}$, the Wigner transform of the rank one operator $|\Phi_2\rangle\langle\Phi_1|$ is the function $\mathcal{A}_{\Phi_1,\Phi_2}: V \to \mathbb{C}$ given by:

$$\mathcal{A}_{\Phi_1,\Phi_2}(v) = \langle \pi(v)\Phi_1, \Phi_2 \rangle,$$

for every $v \in V$, where $\pi(v) = \Pi(\delta(v))$. The function (2.5) is called the cross-ambiguity function of the signals $\Phi_1$ and $\Phi_2$. In case $\Phi_1 = \Phi_2 = \Phi$, we denote the cross-ambiguity function simply by $\mathcal{A}_\Phi$ and refer to it as the ambiguity function of the signal $\Phi$. The conversion between the Zak domain to the time domain is carried through the Zak transform $\mathcal{Z}: \mathcal{H} \to L^2$ ($t \in \mathbb{R}$), given by:

$$\mathcal{Z}(\Phi) = \int_0^{v_r} \Phi(\tau, v) dv,$$

for every $\Phi \in \mathcal{H}$. We conclude this section with an example of an explicit Zak signal and its time domain realization. Let $\Phi_{n,m}$ be the unique quasi-periodic extension of the delta function supported on the lattice point $(n\Delta\tau, m\Delta v)$, for $0 \leq n \leq N-1$ and $0 \leq m \leq M-1$, i.e.:

$$\Phi_{n,m} = \sum_{k,l} \psi(m\Delta v \cdot k\tau_r) \delta(n\Delta\tau + k\tau_r, m\Delta v + lv_r)$$
$$= \sum_{k,l} \psi(mkv_r \cdot \tau_r/M) \delta(n\Delta\tau + k\tau_r, m\Delta v + lv_r)$$
$$= \sum_{k,l} \psi(mk/M) \delta(n\Delta\tau + k\tau_r, m\Delta v + lv_r),$$

Direct calculation reveals that the Zak transform of $\Phi_{n,m}$ is a time shifted, phase modulated, infinite delta pulse train (see FIG. 5), given by:

$$\mathcal{Z}(\Phi_{n,m}) = \sum_{k \in \mathbb{Z}} \psi(mk/M) \delta(n\Delta\tau + k\tau_r),$$

C3. Discrete Zak Signals

The continuous Zak theory admits a (finite) discrete counterpart which we proceed to describe. The development follows the same lines as in the previous section. We use lower case letters to denote discrete Zak signals. A discrete Zak signal is a function $\phi: \Lambda \to \mathbb{C}$ that satisfies the following quasi-periodicity condition:

$$\phi(\lambda + \lambda_1) = \psi(\beta(\lambda, \lambda_1)) \phi(\lambda),$$

for every $\lambda \in \Lambda$ and $\lambda_1 \in \Lambda_1$. Concretely, if we take $\lambda = (n\Delta\tau, m\Delta v)$ and $\lambda_1 = (k\tau_r, lv_r)$ then condition (3.1) takes the form:

$$\phi(n\Delta\tau + k\tau_r, m\Delta v + lv_r) = \psi(mk\Delta v\tau_r) \phi(n\Delta\tau, m\Delta v)$$
$$= \psi(mkv_r\tau_r/M) \phi(n\Delta\tau, m\Delta v)$$
$$= \psi(mk/M) \phi(n\Delta\tau, m\Delta v),$$

Given a pair of discrete Zak signals $\phi_1, \phi_2 \in \mathcal{H}_L$ we define their inner product as:

$$\langle \Phi_1, \Phi_2 \rangle_L = \sum_{\lambda \in \Lambda/\Lambda_1} \overline{\phi_1(\lambda)} \cdot \phi_2(\lambda),$$

We denote the Hilbert space of discrete Zak signals by $\mathcal{H}_L = \mathbb{C}(\Lambda/\Lambda_1, \beta)$. One can show that $\dim \mathcal{H}_L = L$. We equip $\mathcal{H}_L$ with an action of the finite Heisenberg group, expressed through the transform $\Pi_L: F(\Lambda) \to \text{End}(\mathcal{H}_L)$, given by:

$$\Pi_L(h) \triangleright \phi = h *_\sigma \phi,$$

for every $\phi \in \mathcal{H}_L$ and $h \in \mathbb{C}(\Lambda)$. We refer to $\Pi_L$ as the discrete Heisenberg transform. The discrete Heisenberg transform admits an inverse called the discrete Wigner transform. Given a pair of discrete Zak signals $\phi_1, \phi_2 \in \mathcal{H}_L$, the discrete Wigner transform of the rank one operator $|\phi_2\rangle\langle\phi_1|$ is the function $\mathcal{A}_{\phi_1,\phi_2}: \Lambda \to \mathbb{C}$ given by:

$$\mathcal{A}_{\phi_1,\phi_2}(\lambda) = \langle \pi_L(\lambda) \triangleright \phi_1, \phi_2 \rangle_L,$$

for every $\lambda \in \Lambda$, where $\pi_L(\lambda) = \Pi_L(\delta(\lambda))$. The function (3.5) is called the discrete cross-ambiguity function of the signals $\phi_1$ and $\phi_2$. Since $\pi_L(\lambda + \lambda^\perp) = \pi_L(\lambda)$ for every $\lambda \in \Lambda$ and $\lambda^\perp \in \Lambda^\perp$, it follows that $\mathcal{A}_{\phi_1,\phi_2}$ is a periodic with respect to the sub-lattice $\Lambda^\perp$, i.e.:

$$\mathcal{A}_{\phi_1,\phi_2}(\lambda + \lambda^\perp) = \mathcal{A}_{\phi_1,\phi_2}(\lambda),$$

for every $\lambda \in \Lambda$ and $\lambda^\perp \in \Lambda^\perp$. When $\phi_1 = \phi_2 = \phi$ we denote the discrete cross-ambiguity function by $\mathcal{A}_\phi$ and refer to it as the discrete ambiguity function of $\phi$.

C4. Sampling Theory on the Zak Domain

The focus of sampling theory is to describe the relation between the continuous and discrete cross-ambiguity functions. To this end, we denote by $\mathbb{C}'(V)$ the vector space of generalized functions on V. The main assertions are stated in terms of two basic transforms:

$$s: \mathbb{C}(V) \to \mathbb{C}(\Lambda),$$

$$\iota: \mathbb{C}(\Lambda) \to \mathbb{C}'(V),$$

The transform s is called sampling and it sends a function on V to its samples on the lattice $\Lambda$. The transform $\iota$ is called embedding and it sends a discrete function $\phi: \Lambda \to \mathbb{C}$ to the generalized function (distribution) on V given by the following super-position of delta functions:

$$\iota(\phi) = \sum_{\lambda \in \Lambda} \phi(\lambda) \delta(\lambda),$$

The sampling and embedding transforms give rise to induced transforms between the corresponding Hilbert spaces of continuous and discrete Zak signals. We denote the induced transforms by the same names, i.e.:

$$s: \mathcal{H} \to \mathcal{H}_L,$$

$$\iota: \mathcal{H}_L \to \mathcal{H}',$$

where $\mathcal{H}' = \mathbb{C}'(V/\Lambda_1, \beta)$ denotes the vector space of generalized Zak signals (distributions). Given a function $h \in \mathbb{C}(\Lambda)$, we denote by $h_{\Lambda^\perp}$ its periodization with respect to the sub-lattice $\Lambda^\perp \subset \Lambda$, i.e.:

$$h_{\Lambda^\perp}(\lambda) = \sum_{\lambda^\perp \in \Lambda^\perp} h(\lambda + \lambda^\perp),$$

for every $\lambda \in \Lambda$. The main technical statement is summarized in the following theorem.

Theorem 4.1 (Main Theorem of Sampling Theory). The following two relations hold:

(1) Sampling relation. For every $\Phi_1, \Phi_2 \in \mathcal{H}$ we have:

$$\mathcal{A}_{s(\Phi_1), s(\Phi_2)} = s(\mathcal{A}_{\Phi_1, \Phi_2})_{\Lambda^\perp},$$

(2) Embedding relation. For every $\phi_1, \phi_2 \in \mathcal{H}_L$ we have:

$$\mathcal{A}_{\iota(\phi_1), \iota(\phi_2)} = \iota(\mathcal{A}_{\phi_1, \phi_2}),$$

In plain language, the sampling relation asserts that the discrete cross-ambiguity function of sampled continuous signals is the sampled (and periodized) cross-ambiguity function of the continuous signals. The embedding relation asserts that the continuous cross-ambiguity function of embedded discrete signals is the embedding of the cross-ambiguity function of the discrete signals.

C5. Filter Theory

Filter theory gives means to convert a discrete sequences to continuous waveforms. We define an Heisenberg filter to be a function $w \in \mathbb{C}(V)$. We say the filter w is factorizable if it can be written as $w = w_\tau^* \circ w_\nu$ where $w_\tau$ is a distribution supported on the delay axis and $w_\nu$ is a distribution supported on the Doppler axis. Note that such a function takes the form:

$$w(\tau, \nu) = w_\tau(\tau) w_\nu(\nu),$$

for every $\tau, \nu \in \mathbb{R}$. The manner of operation of a filter w on a Zak signal $\Phi$ is carried through the Heisenberg transform, i.e.:

$$\Phi_w = \Pi(w) \triangleright \Phi = w *_\circ \Phi,$$

The above equation shows a relationship between Zak signal and the Heisenberg transform. While the relationship is described as a sequence of mathematical steps, in general, implementations need not explicitly perform these steps, but may use numerical methods to compute end results without having to compute and store any intermediate results.

Time Domain Interpretation of Effects of Heisenberg Transform

To get some intuition, it is beneficial to interpret the effect of Heisenberg filtering in the time domain by exploring the structure of $\mathcal{Z}(\Phi_w)$. Assuming w is factorizable, one can show that:

$$\mathcal{Z}(\Phi_w) = w_\tau * \{W_t \cdot \mathcal{Z}(\Phi)\},$$

where $W_t = FT^{-1}(w_\nu)$ and * stands for linear convolution. We see that Heisenberg filtering amounts to a cascade of first applying a window in time followed by a window in frequency, aka, convolution with a pulse (see FIG. 6). The main technical statement of this section describes the relation between the discrete and continuous ambiguity functions. The result will follow from the following general proposition.

Proposition 5.1. Given a pair of Zak signals $\Phi_1, \Phi_2 \in \mathcal{H}$ and corresponding pair of Heisenberg filters $w_1, w_2 \in \mathbb{C}(V)$, the following relation holds:

$$\mathcal{A}_{\Phi_1, w_1 \Phi_2, w_2} = w_1 *_\sigma \mathcal{A}_{\Phi_1, \Phi_2} *_\sigma w_2^\star,$$

where $w_2^\star(\nu) = \psi(\beta(\nu, \nu)) \overline{w_2(-\nu)}$ is the Heisenberg conjugate function.

In the case $\Phi_1 = \Phi_2 = \Phi$ where $\Phi = \iota(\phi)$ and $w_1 = w_2 = w$ the statement of the proposition describes the relation between the discrete ambiguity function of the sequence $\phi$ and the continuous ambiguity function of the waveform $\Phi_w$. The result is summarized in the following theorem.

Theorem 5.2 (Main theorem of filter theory). Given a discrete Zak signal $\phi \in \mathcal{H}_L$ and a Heisenberg filter $w \in \mathbb{C}(V)$, the following relation holds:

$$\mathcal{A}_{\Phi_w} = \sum_{\lambda \in \Lambda} \mathcal{A}_\phi(\lambda) \cdot P_\lambda,$$

where $P_\nu = w^* \circ \delta(\nu) *_\circ w^\star$ for every $\nu \in V$.

In plain language, the theorem asserts that the ambiguity function of the waveform $\Phi_w$ is obtained from the ambiguity function of the sequence $\phi$ through shaping with a pulse $P_\lambda$ (whose shape depends on the particular value of $\lambda$). In a sense, the design of an optimal Radar waveform involves two aspects. The first concerns the design of a finite sequence of a desired discrete ambiguity function and the second concerns the design of a Heisenberg filter w of a desired pulse shape $P_\lambda$ for various values of $\lambda$.

C6. Zak Theoretic Chirp Waveforms

In this section we describe a particular family of compressed Radar waveforms based on discrete chirp sequences in the Zak domain. These waveforms enjoy uniform temporal power profile and thumbtack like ambiguity function. The construction assumes the following set-up. We assume N, M $\in \mathbb{N}$ are coprime odd integers. We let $a \in (\mathbb{Z}/N)^\times$ be an invertible element in the ring of integers modulo N. We denote by $\psi_N: \mathbb{Z}/N \to \mathbb{C}$ the finite Fourier exponent $\psi_N(n) = \psi(n/N)$.

We define the discrete Zak signal $ch = ch_a \in \mathcal{H}_L$ as:

$$ch(n\Delta\tau, m\Delta\nu) = \begin{cases} \psi_N\left(\frac{1}{2}an^2\right) & m = 0 \mod M \\ 0 & \text{otherwise} \end{cases},$$

for every $n, m \in \mathbb{Z}$. We refer to ch as the discrete Zak chirp of order N and slope a. We next explore the structure of the discrete ambiguity function $\mathcal{A}_{ch}$. To that end, we introduce the sub-lattice $\Lambda_a \subset \Lambda$ (see FIG. 11), given by:

$$\Lambda_a = \{(n\Delta\tau, kM\Delta\nu) : k = a \cdot n \mod N\},$$

Theorem 6.1. The discrete ambiguity function $\mathcal{A}_{ch}$ is supported on the lattice $\Lambda_a$. Moreover:

$$\mathcal{A}_{ch}(n\Delta\tau, kM\Delta\nu) = \psi_N(\tfrac{1}{2}an^2)N,$$

for every (n,k) such that $k = a \cdot n \mod N$.

A direct consequence of Theorem 6.1 is that $\mathcal{A}_{ch}$ vanishes on the non-zero points of the interval $I_\tau = [-\tau_r/2, \tau_r/2] \times [-\nu_r/2, \nu_r/2]$, which we refer to as the "clean" region. Next, we fix a filter function $w \in \mathcal{C}(V)$ and define the continuous Zak chirp $Ch=Ch_{a,w} \in \mathcal{H}$ as:

$$Ch = w *_o \iota(ch),$$

By the main theorem of filter theory (Theorem 5.2) we know that the continuous ambiguity function $\mathcal{A}_{Ch}$ is related to the discrete ambiguity function $\mathcal{A}_{ch}$ through the equation:

$$\mathcal{A}_{Ch} = \sum_{\lambda \in \Lambda} \mathcal{A}_{ch}(\lambda) P_\lambda$$
$$= \sum_{\lambda \in \Lambda_a} \mathcal{A}_{ch}(\lambda) P_\lambda,$$

where $P_v = w*_o \delta(v)*_o w^*$ for every $v \in V$. Assuming the pulses $P_\lambda$ are well localized for every $\lambda \in \Lambda_a \cap 2I_\tau$, the continuous ambiguity function $\mathcal{A}_{Ch}$ will have a thumbtack shape with a clean region around zero coinciding with the interval $I_\tau$ (see FIG. 12). In case the numbers N,M>>1, choosing the filter function w to be square root Nyquist with respect to the lattice $\Lambda$ ensures $P_\lambda$ is well localized for every $\lambda \in \Lambda \cap 2I_\tau$.

Exemplary Methods Based on the Disclosed Technology

Figure 13:
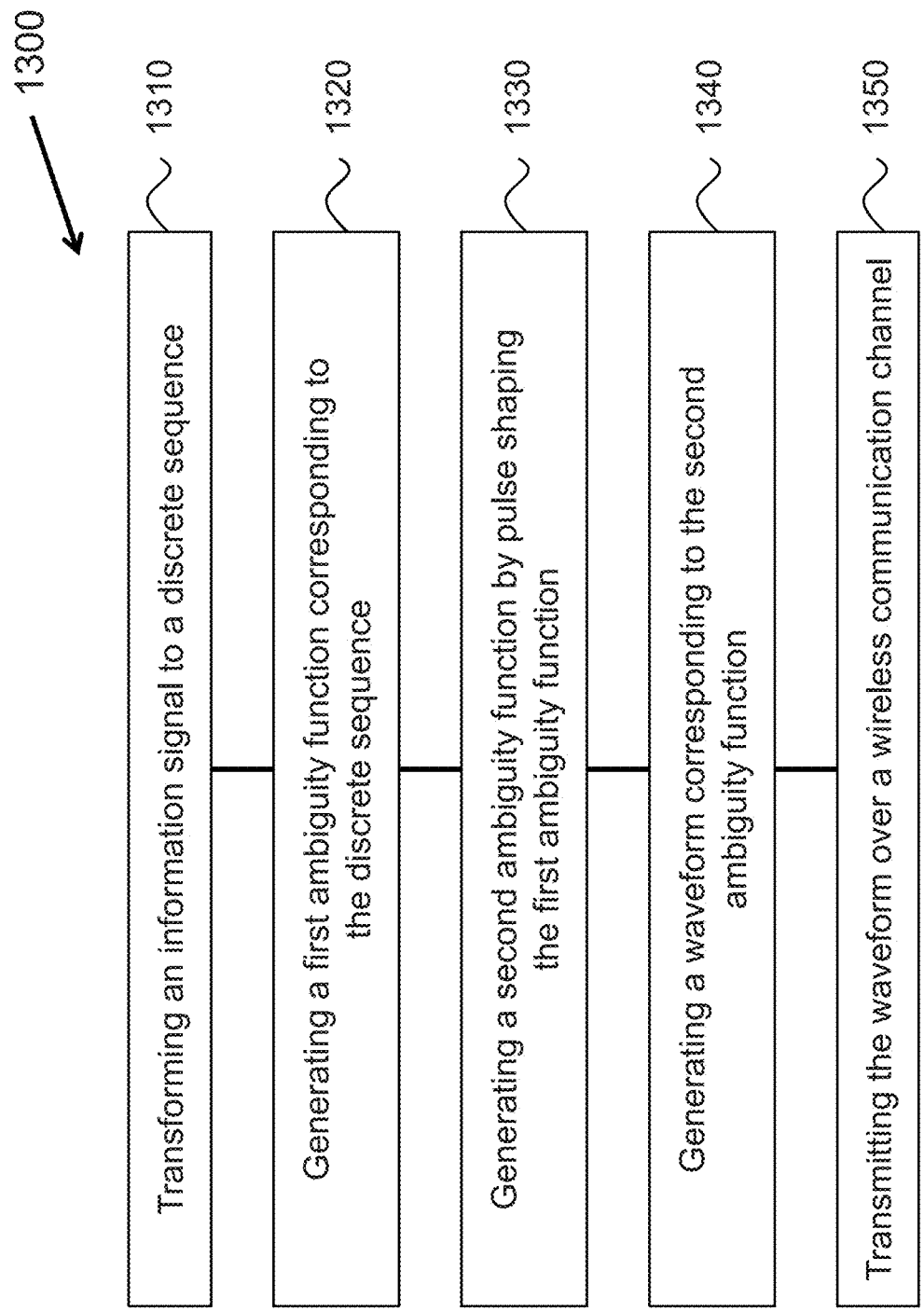
FIG. 13 is a flowchart of an example of a wireless communication method.

FIG. 13 is a flowchart of an example of a wireless communication method, and is described in the context of Section "C". The method 1300 includes, at step 1310, transforming an information signal to a discrete sequence, where the discrete sequence is a Zak transformed version of the information signal. In some embodiments, the discrete sequence is quasi-periodic.

The method 1300 includes, at step 1320, generating a first ambiguity function corresponding to the discrete sequence. In some embodiments, the first ambiguity function is a discrete ambiguity function supported on a discrete lattice.

The method 1300 includes, at step 1330, generating a second ambiguity function by pulse shaping the first ambiguity function. In some embodiments, the second ambiguity function is a continuous ambiguity function, and the pulse shaping is based on a pulse that is localized on the discrete lattice.

The method 1300 includes, at step 1340, generating a waveform corresponding to the second ambiguity function. In some embodiments, the waveform includes a uniform temporal power profile.

The method 1300 includes, at step 1350, transmitting the waveform over a wireless communication channel. While the processing performed in the method 1300 is described as a number of steps, in general, it may be possible to implement the input-to-output transformation without generating any intermediate signals explicitly. For example, the waveform corresponding to the second ambiguity function may be directly generated from the information signal, without generating the intermediate discrete sequence or the first ambiguity function.

Accordingly, in another method for wireless communication, which is described in the context of Section "C", includes obtaining a waveform from an information signal, wherein the waveform corresponds to a second ambiguity function that is a pulse shaped version of a first ambiguity function, wherein the first ambiguity function corresponds to a discrete sequence, and wherein the discrete sequence is a Zak transformed version of the information signal, and transmitting the waveform over a wireless channel.

Figure 14:
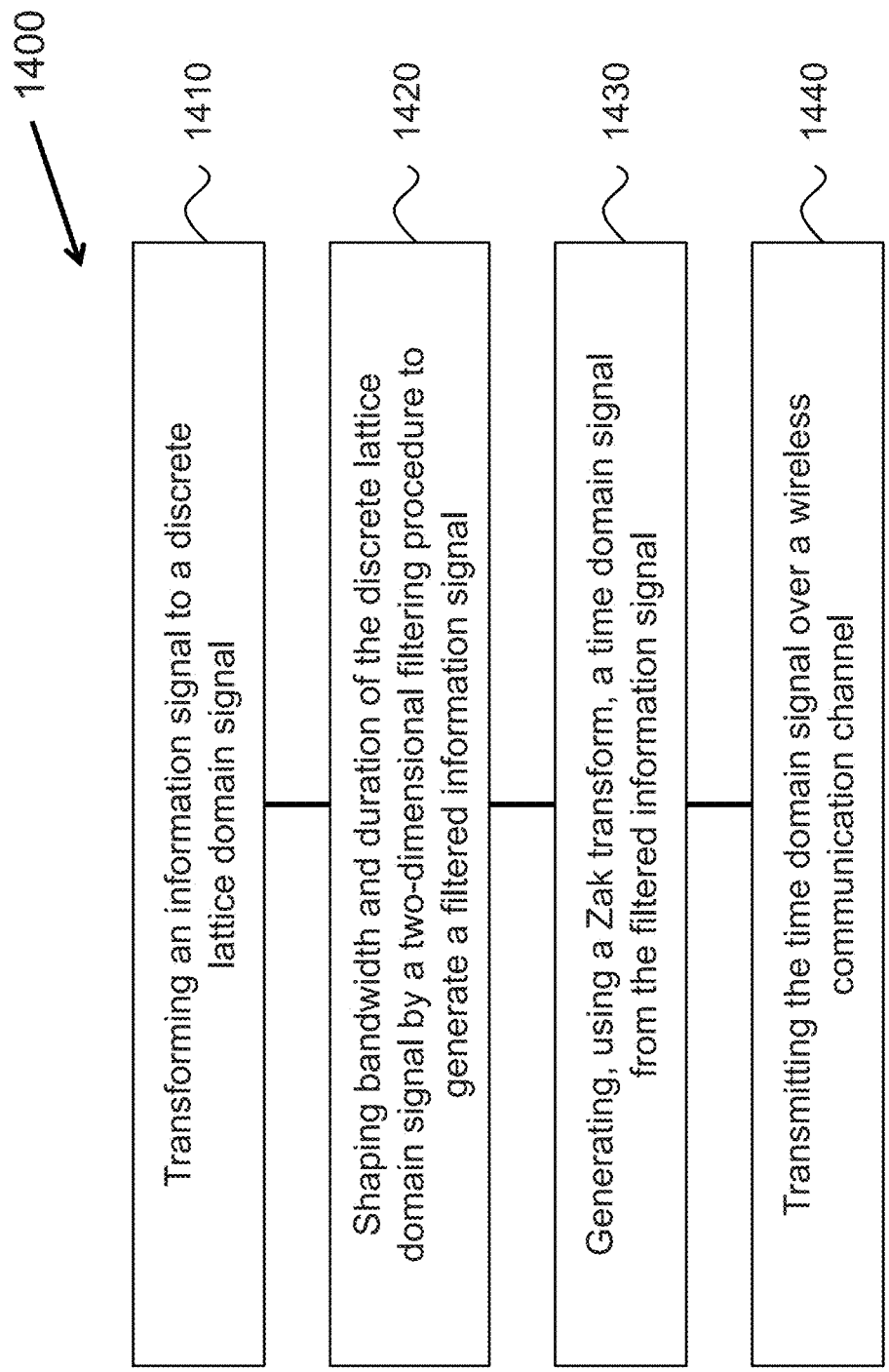
FIG. 14 is a flowchart of another example of a wireless communication method.

FIG. 14 is a flowchart of another example of a wireless communication method, and is described in the context of Sections "A" and "B". The method 1400 includes, at step 1410, transforming an information signal to a discrete lattice domain signal. In some embodiments, the discrete lattice domain includes a Zak domain.

The method 1400 includes, at step 1420, shaping bandwidth and duration of the discrete lattice domain signal by a two-dimensional filtering procedure to generate a filtered information signal. In some embodiments, the two-dimensional filtering procedure includes a twisted convolution with a pulse. In other embodiments, the pulse is a separable function of each dimension of the two-dimensional filtering.

The method 1400 includes, at step 1430, generating, using a Zak transform, a time domain signal from the filtered information signal. In some embodiments, the time domain signal includes modulated information signal without an intervening cyclic prefix.

The method 1400 includes, at step 1440, transmitting the time domain signal over a wireless communication channel. For example, a processor may implement the method 1400 and, at step 1440, may cause a transmitter circuit to transmit the generated waveform.

Figure 15:
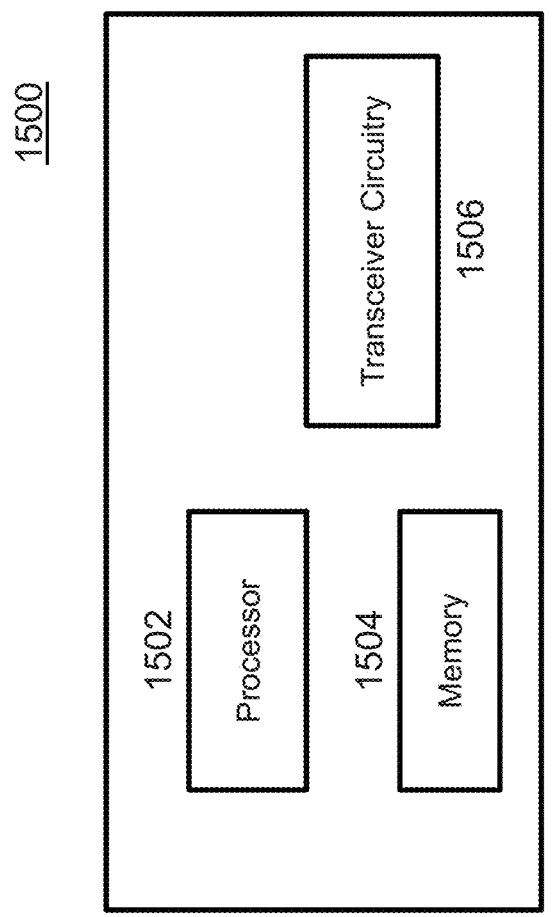
FIG. 15 shows an example of a wireless transceiver apparatus.

FIG. 15 shows an example of a wireless transceiver apparatus 1500. The apparatus 1500 may be used to implement various techniques described herein. The apparatus 1500 includes a processor 1502, a memory 1504 that stores processor-executable instructions and data during computations performed by the processor. The apparatus 1500 includes reception and/or transmission circuitry 1506, e.g., including radio frequency operations for receiving or transmitting signal and/or receiving data or information bits for transmission over a wireless network.

It will be appreciated that techniques for data modulation are disclosed in which information signal can be transmitted using multiple QAM subcarriers without using a cyclic prefix. In some embodiments, a modulation technique, called OFDM-MultiCarrier (MC) may be used in which QAM symbols are convolved with a periodic pulse function. In some embodiments, a Zak domain representation of a signal is used for shaping bandwidth and duration of a modulated information signal.

Exemplary Implementations of the Disclosed Technology

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A method for wireless communication, comprising:
    transforming an information signal to a discrete sequence, wherein the discrete sequence is a Zak transformed version of the information signal;
    generating a first ambiguity function corresponding to the discrete sequence;
    generating a second ambiguity function by pulse shaping the first ambiguity function;
    generating a waveform corresponding to the second ambiguity function; and
    generating the waveform for transmission over a wireless communication channel.

2. The method of claim 1, wherein the waveform comprises a uniform temporal power profile.

3. The method of claim 1, wherein the first ambiguity function is a discrete ambiguity function supported on a discrete lattice.

4. The method of claim 3, wherein the second ambiguity function is a continuous ambiguity function, and wherein the pulse shaping is based on a pulse that is localized on the discrete lattice.

5. A method for wireless communication, comprising:
    obtaining a waveform from an information signal, wherein the waveform corresponds to a second ambiguity function that is a pulse shaped version of a first ambiguity function, wherein the first ambiguity function corresponds to a discrete sequence, and wherein the discrete sequence is a Zak transformed version of the information signal; and
    transmitting the waveform over a wireless channel.

6. The method of claim 5, wherein the waveform comprises a uniform temporal power profile.

7. The method of claim 5, wherein the first ambiguity function is a discrete ambiguity function supported on a discrete lattice.

8. The method of claim 7, wherein the second ambiguity function is a continuous ambiguity function, and wherein the pulse shaping is based on a pulse that is localized on the discrete lattice.

9. The method of claim 5, wherein the discrete sequence is quasi-periodic.

10. A wireless communication apparatus comprising a processor configured to:
    transform an information signal to a discrete sequence, wherein the discrete sequence is a Zak transformed version of the information signal;
    generate a first ambiguity function corresponding to the discrete sequence;
    generate a second ambiguity function by pulse shaping the first ambiguity function;
    generate a waveform corresponding to the second ambiguity function; and
    generate the waveform for transmission over a wireless communication channel.

11. The wireless communication apparatus of claim 10, wherein the waveform comprises a uniform temporal power profile.

12. The wireless communication apparatus of claim 10, wherein the first ambiguity function is a discrete ambiguity function supported on a discrete lattice.

13. The wireless communication apparatus of claim 12, wherein the second ambiguity function is a continuous ambiguity function, and wherein the pulse shaping is based on a pulse that is localized on the discrete lattice.

\* \* \* \* \*